US009792644B1

(12) United States Patent
O'Leary

(10) Patent No.: US 9,792,644 B1
(45) Date of Patent: Oct. 17, 2017

(54) SYSTEM AND METHOD OF SUPPORTING AIRCRAFT SALES

(71) Applicant: Jet Advisors, LLC, Bedford, MA (US)

(72) Inventor: Kevin O'Leary, Bedford, MA (US)

(73) Assignee: Jet Advisors, LLC, Bedford, MA (US)

( * ) Notice: Subject to any disclaimer, the term of this patent is extended or adjusted under 35 U.S.C. 154(b) by 852 days.

(21) Appl. No.: 13/746,594

(22) Filed: Jan. 22, 2013

Related U.S. Application Data

(60) Provisional application No. 61/588,434, filed on Jan. 19, 2012, provisional application No. 61/664,968, filed on Jun. 27, 2012.

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0603* (2013.01); *G06Q 30/0617* (2013.01); *G06Q 30/0623* (2013.01); *G06Q 30/0631* (2013.01)

(58) Field of Classification Search
CPC ............ G06Q 30/0601–30/0643; G06Q 30/08
See application file for complete search history.

(56) References Cited

U.S. PATENT DOCUMENTS

2008/0033788 A1* 2/2008 Cereghini et al. .............. 705/10
2008/0033841 A1* 2/2008 Wanker .......................... 705/27
2008/0195435 A1* 8/2008 Bentley et al. .................. 705/7
2013/0006916 A1* 1/2013 McBride et al. ............... 706/52

OTHER PUBLICATIONS www.jetadvisors.com. Dated Nov. 23, 2010 to Dec. 16, 2010. [recovered from www.Archive.org].*
"Basics of Aircraft Market Analysis". Aircraft Monitor. Mar. 2012.*

* cited by examiner

*Primary Examiner* — William Allen
(74) *Attorney, Agent, or Firm* — Bodi Law LLC

(57) ABSTRACT

An apparatus and method for supporting aircraft acquisition and brokerage services for aircraft of different models, and aircraft manufactured by a plurality of different manufacturers. The system and method maintains extensive database regarding a wide-range of aircraft information and market information, and uses one or more computer servers adapted serving organized information to the user, who may be using a user terminal, for providing support to the user for determining appropriate aircraft for purchase by customers for meeting the particular needs of the customer.

25 Claims, 61 Drawing Sheets
(54 of 61 Drawing Sheet(s) Filed in Color)

System Connectivity

Aircraft Dashboard

User Data Example

Design Features

Image Gallery: Exterior Image

Image Gallery: Interior Dimensioning

Information Screen Example 1

Information Screen Example 2

Information Screen Example 3

Basic Aircraft Information

Miscellaneous Tab

Database Form

Charter Rates

Market Summary Tab

Current Market Tab

Historical/Sales Data Tab

Specific Aircraft Information

Aircraft Details Form

Features Tab

Airframe/Engine Tab

APU/Equipment Tab

Damage/MX/Certifications Tab

Interior/Exterior Tab

Avionics Tab

Contacts Tab

Inspections Tab

Sold Data Tab

Sold Button

Sold Record dbo_SR_AC_Sales_by_Q

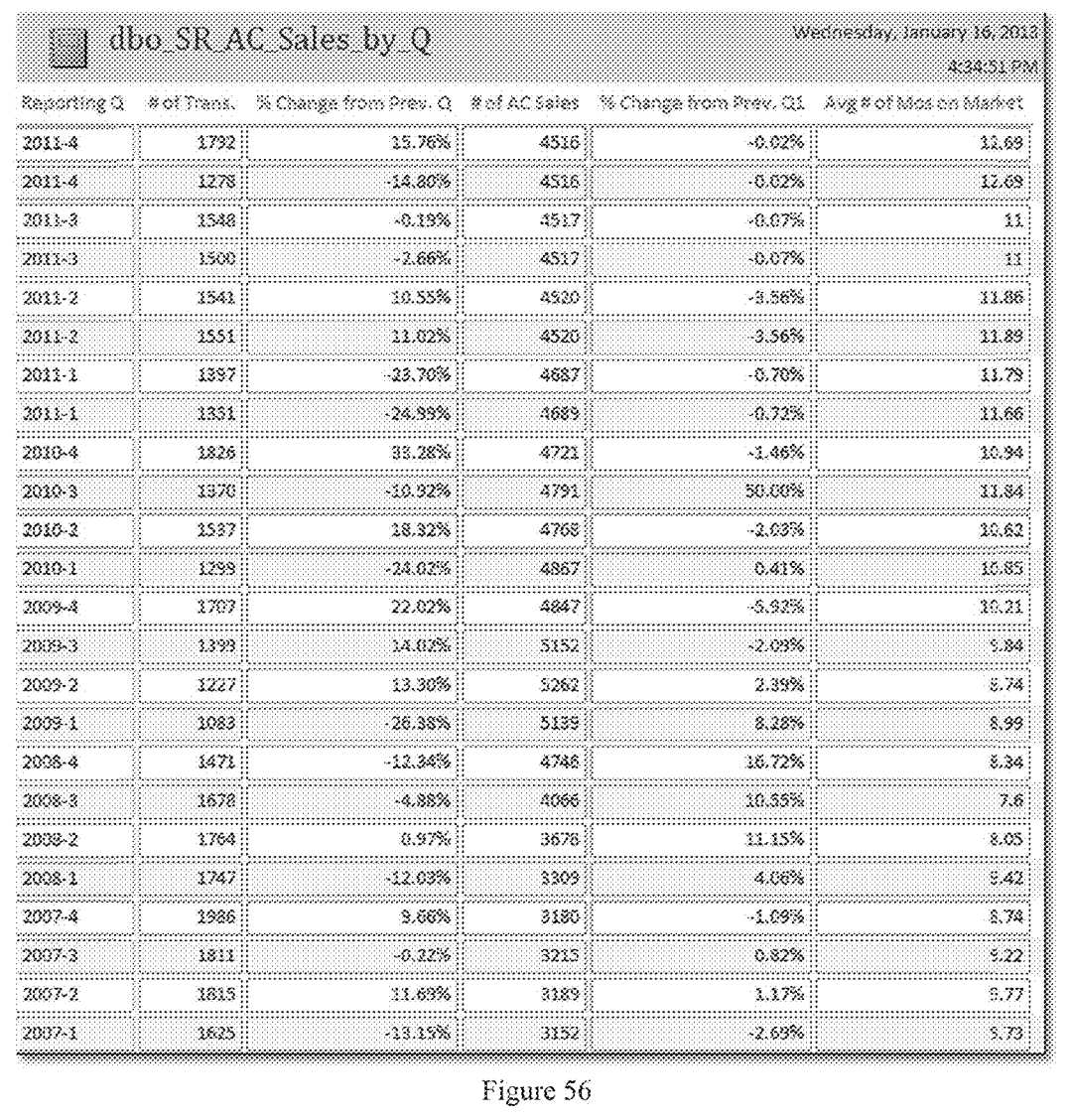

Wednesday, January 16, 2013
4:34:51 PM

| Reporting Q | # of Trans. | % Change from Prev. Q | # of AC Sales | % Change from Prev. Q1 | Avg # of Mos on Market |
|---|---|---|---|---|---|
| 2011-4 | 1792 | 15.76% | 4516 | -0.02% | 12.69 |
| 2011-4 | 1278 | -14.80% | 4516 | -0.02% | 12.69 |
| 2011-3 | 1548 | -0.19% | 4517 | -0.07% | 11 |
| 2011-3 | 1500 | -2.66% | 4517 | -0.07% | 11 |
| 2011-2 | 1541 | 10.55% | 4520 | -3.56% | 11.86 |
| 2011-2 | 1551 | 11.02% | 4520 | -3.56% | 11.89 |
| 2011-1 | 1397 | -23.70% | 4687 | -0.70% | 11.79 |
| 2011-1 | 1331 | -24.99% | 4689 | -0.72% | 11.66 |
| 2010-4 | 1826 | 33.28% | 4721 | -1.46% | 10.94 |
| 2010-3 | 1370 | -10.92% | 4791 | 50.00% | 11.84 |
| 2010-2 | 1537 | 18.32% | 4768 | -2.03% | 10.62 |
| 2010-1 | 1299 | -24.02% | 4867 | 0.41% | 10.85 |
| 2009-4 | 1707 | 22.02% | 4847 | -5.92% | 10.21 |
| 2009-3 | 1399 | 14.02% | 5152 | -2.09% | 9.84 |
| 2009-2 | 1227 | 13.30% | 5262 | 2.39% | 8.74 |
| 2009-1 | 1083 | -26.38% | 5139 | 8.28% | 8.99 |
| 2008-4 | 1471 | -12.34% | 4746 | 16.72% | 8.34 |
| 2008-3 | 1678 | -4.88% | 4066 | 10.55% | 7.6 |
| 2008-2 | 1764 | 0.97% | 3678 | 11.15% | 8.05 |
| 2008-1 | 1747 | -12.03% | 3309 | 4.06% | 9.42 |
| 2007-4 | 1986 | 9.66% | 3180 | -1.09% | 8.74 |
| 2007-3 | 1811 | -0.22% | 3215 | 0.82% | 9.22 |
| 2007-2 | 1815 | 11.69% | 3189 | 1.17% | 9.77 |
| 2007-1 | 1625 | -13.15% | 3152 | -2.69% | 9.73 |

Figure 56

Figure 57:
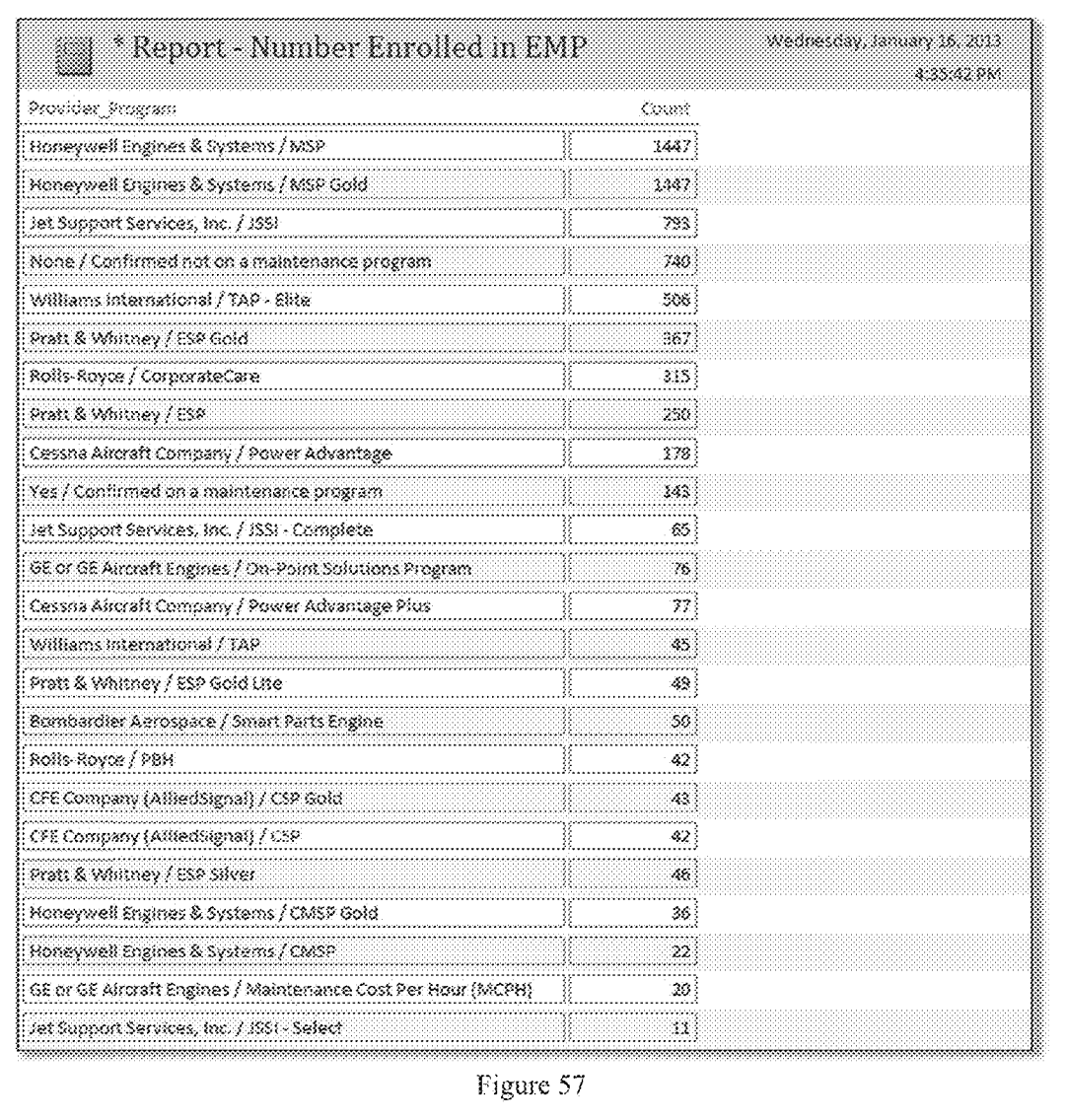

* Report - Number Enrolled in EMP

Wednesday, January 16, 2013
4:35:42 PM

| Provider_Program | Count |
|---|---|
| Honeywell Engines & Systems / MSP | 1447 |
| Honeywell Engines & Systems / MSP Gold | 1447 |
| Jet Support Services, Inc. / JSSI | 793 |
| None / Confirmed not on a maintenance program | 740 |
| Williams International / TAP - Elite | 508 |
| Pratt & Whitney / ESP Gold | 367 |
| Rolls-Royce / CorporateCare | 315 |
| Pratt & Whitney / ESP | 250 |
| Cessna Aircraft Company / Power Advantage | 178 |
| Yes / Confirmed on a maintenance program | 143 |
| Jet Support Services, Inc. / JSSI - Complete | 65 |
| GE or GE Aircraft Engines / On-Point Solutions Program | 76 |
| Cessna Aircraft Company / Power Advantage Plus | 77 |
| Williams International / TAP | 45 |
| Pratt & Whitney / ESP Gold Lite | 49 |
| Bombardier Aerospace / Smart Parts Engine | 50 |
| Rolls-Royce / PBH | 42 |
| CFE Company (AlliedSignal) / CSP Gold | 43 |
| CFE Company (AlliedSignal) / CSP | 42 |
| Pratt & Whitney / ESP Silver | 48 |
| Honeywell Engines & Systems / CMSP Gold | 36 |
| Honeywell Engines & Systems / CMSP | 22 |
| GE or GE Aircraft Engines / Maintenance Cost Per Hour (MCPH) | 20 |
| Jet Support Services, Inc. / JSSI - Select | 11 |

Figure 57 dbo_SR_AC_LifeCycle

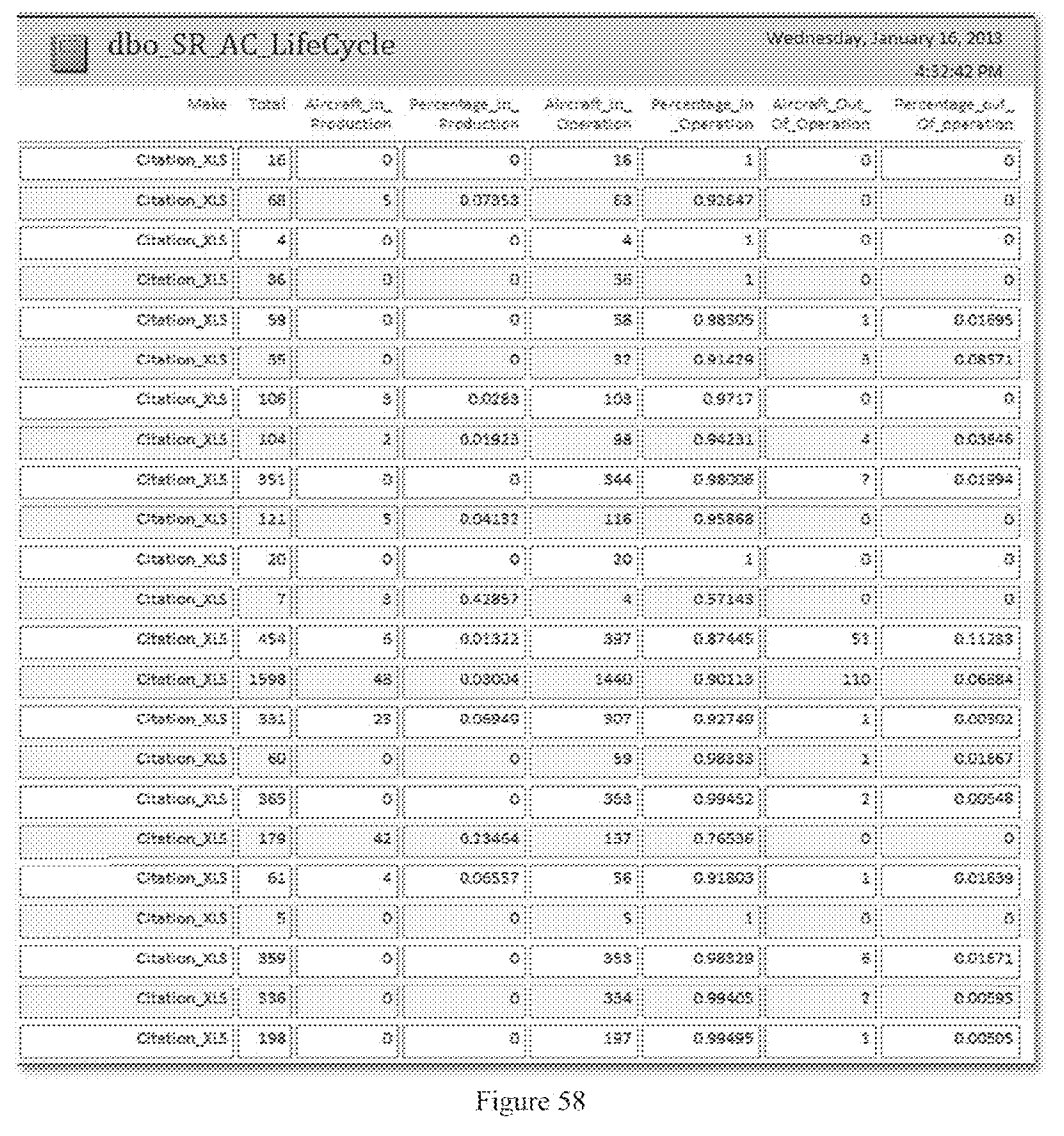

Wednesday, January 16, 2013
4:32:42 PM

| Make | Total | Aircraft_in_Production | Percentage_in_Production | Aircraft_in_Operation | Percentage_in_Operation | Aircraft_Out_Of_Operation | Percentage_out_Of_operation |
|---|---|---|---|---|---|---|---|
| Citation_XLS | 16 | 0 | 0 | 16 | 1 | 0 | 0 |
| Citation_XLS | 68 | 5 | 0.07353 | 63 | 0.92647 | 0 | 0 |
| Citation_XLS | 4 | 0 | 0 | 4 | 1 | 0 | 0 |
| Citation_XLS | 36 | 0 | 0 | 36 | 1 | 0 | 0 |
| Citation_XLS | 59 | 0 | 0 | 58 | 0.98305 | 1 | 0.01695 |
| Citation_XLS | 35 | 0 | 0 | 32 | 0.91429 | 3 | 0.08571 |
| Citation_XLS | 106 | 3 | 0.0283 | 103 | 0.9717 | 0 | 0 |
| Citation_XLS | 104 | 2 | 0.01923 | 98 | 0.94231 | 4 | 0.03846 |
| Citation_XLS | 351 | 0 | 0 | 344 | 0.98006 | 7 | 0.01994 |
| Citation_XLS | 121 | 5 | 0.04132 | 116 | 0.95868 | 0 | 0 |
| Citation_XLS | 20 | 0 | 0 | 20 | 1 | 0 | 0 |
| Citation_XLS | 7 | 3 | 0.42857 | 4 | 0.57143 | 0 | 0 |
| Citation_XLS | 454 | 6 | 0.01322 | 397 | 0.87445 | 51 | 0.11233 |
| Citation_XLS | 1598 | 48 | 0.03004 | 1440 | 0.90113 | 110 | 0.06884 |
| Citation_XLS | 331 | 23 | 0.06949 | 307 | 0.92749 | 1 | 0.00302 |
| Citation_XLS | 60 | 0 | 0 | 59 | 0.98333 | 1 | 0.01667 |
| Citation_XLS | 365 | 0 | 0 | 363 | 0.99452 | 2 | 0.00548 |
| Citation_XLS | 179 | 42 | 0.23464 | 137 | 0.76536 | 0 | 0 |
| Citation_XLS | 61 | 4 | 0.06557 | 56 | 0.91803 | 1 | 0.01639 |
| Citation_XLS | 5 | 0 | 0 | 5 | 1 | 0 | 0 |
| Citation_XLS | 359 | 0 | 0 | 353 | 0.98329 | 6 | 0.01671 |
| Citation_XLS | 336 | 0 | 0 | 334 | 0.99405 | 2 | 0.00595 |
| Citation_XLS | 198 | 0 | 0 | 197 | 0.99495 | 1 | 0.00505 |

Figure 58

SYSTEM AND METHOD OF SUPPORTING AIRCRAFT SALES

CROSS-REFERENCES TO RELATED APPLICATIONS

This application claims the benefit of provisional application Ser. No. 61/588,434, filed on Jan. 19, 2012, and incorporated herein by reference. This application also claims the benefit of provisional application Ser. No. 61/664,968 that was filed on Jun. 27, 2012, and is also incorporated herein by reference.

BACKGROUND OF THE INVENTION

Conventional approaches for supporting the customer purchase of company or personal aircraft can be time consuming and it can be difficult to coalesce the necessary data to make recommendations to such customers as to which aircraft would best support the needs of the customer. Needed is a system and method to overcome these shortcomings and meet the needs of such customers in an efficient and cost-effective manner.

SUMMARY OF THE INVENTION

Provided are a plurality of embodiments, including at least one example system, for effectively and efficiently matching the needs of an aircraft customer to commercially available aircraft, including but not limited to:

A method for supporting aircraft brokerage services using a server system coupled to a centralized database said method comprising the steps of:

- storing information about a plurality of aircraft within the database, including information regarding the performance of each of the plurality of aircraft, the market data of each of the plurality of aircraft, the satisfaction of operators of each of the plurality of aircraft, the safety record of each of the plurality of aircraft, and attributes of each of the plurality of aircraft;
- providing user access to the information about a plurality of aircraft via a user terminal connected to said server system;
- inputting needs of a potential aircraft purchaser into the server system;
- said server system determining a ranked listing of one or more of the plurality of aircraft that best match the input needs of said potential purchaser by evaluating the information about the plurality of aircraft, said ranked listing being ranked according to which aircraft best meet the input needs of the purchaser; and
- displaying said ranked listing of the one or more of the aircraft to said user for providing an aircraft purchase recommendation to the potential purchaser.

Also provided is a method for supporting aircraft brokerage services using a server system coupled to a centralized database said method comprising the steps of:

- storing information about a plurality of aircraft within the database, including information regarding the performance of each of the plurality of aircraft, the market data of each of the plurality of aircraft, the satisfaction of operators of each of the plurality of aircraft, the safety record of each of the plurality of aircraft, and attributes of each of the plurality of aircraft;
- providing user access to the information about a plurality of aircraft via a user terminal connected to said server system;

- inputting needs of a potential aircraft purchaser into the server system;
- said server determining a first subset of aircraft from said plurality of aircraft meeting a first set of criteria obtained from the needs of the potential aircraft purchaser, wherein said first set of criteria includes aircraft performance requirements;
- providing user access to information about said first subset of aircraft;
- upon request of the user, said server system determining a ranked listing of one or more of the subset of aircraft that best match the input needs of said potential purchaser, using criteria other than the first set of criteria, by evaluating the information about the plurality of aircraft, said ranked listing being ranked according to which aircraft best meet the input needs of the purchaser; and
- displaying said ranked listing of the one or more of the aircraft to said user for providing an aircraft purchase recommendation to the potential purchaser.

Further provided is a method for supporting aircraft brokerage services using a server system coupled to a centralized database said method comprising the steps of:

- storing information about a plurality of aircraft within the database, including information regarding the performance of each of the plurality of aircraft, the market data of each of the plurality of aircraft, the satisfaction of operators of each of the plurality of aircraft, the safety record of each of the plurality of aircraft, and attributes of each of the plurality of aircraft;
- providing user access to the information about a plurality of aircraft via a user terminal connected to said server system;
- inputting needs of a potential aircraft purchaser into the server system;
- said server determining a first subset of aircraft from said plurality of aircraft meeting a first set of criteria obtained from the needs of the potential aircraft purchaser, wherein said first set of criteria includes aircraft performance requirements;
- providing user access to information about said first subset of aircraft;
- upon request of the user, said server system determining a scored listing of a plurality of the subset of aircraft that best match the input needs of said potential purchaser, using criteria other than the first set of criteria, by evaluating the information about the plurality of aircraft, said scored listing providing a score representing how well each one of the plurality of the subset of aircraft meet the input needs of the purchaser; and
- displaying said scored listing to said user for providing an aircraft purchase recommendation to the potential purchaser.

Also provided is a system comprising a computer server and a database for providing a method of supporting a potential purchaser of an aircraft, said method comprising:

- collecting aircraft information about a plurality of aircraft manufactured by more than one manufacturer, at least some of said information being obtained from the database(s) of one or more external entities, wherein said aircraft information includes:
  - performance specifications about each one of the plurality of aircraft,
  - one or more images of an exterior of each one of the plurality of aircraft,
  - one or more images describing an interior of each one of the aircraft, information about internal dimensions of each one of the aircraft, information about external dimensions of each one of the aircraft, information about costs for each one of the aircraft, historical information about each one of the aircraft, and market and pricing information about each one of the aircraft;

storing said aircraft information in the database;

said computer server serving information to a user computer for causing said user computer to display on a user interface formatted aircraft information about a chosen one of said plurality of aircraft, said formatted aircraft information being derived by said server from said aircraft information, said formatted aircraft information including:

pricing information about the chosen one of said plurality of aircraft, said pricing information including market trends, and performance information about the chosen one of said plurality of aircraft, wherein said formatted aircraft information is organized for presenting on said user computer by allowing user selection of any one of a plurality of tabs, such that for any chosen one of said plurality of tabs, different formatted aircraft information is displayed;

said computer server providing additional information to the user computer for providing the user with an option to select an update of the chosen one of said aircraft, such that in response to selecting the update of the chosen one of the aircraft, the information that is displayed from any selected one of said tabs is updated to display aircraft information about the selected updated chosen one of said aircraft; and accepting input from the user regarding specific needs of the potential purchaser; and determining a list of a subset of said plurality of aircraft that are ranked by how well each one of the aircraft in said subset meets the needs of the potential purchaser.

And further provided is a system comprising a computer server and a database for providing a method of supporting a potential purchaser of an aircraft, said method comprising:

collecting aircraft information about a plurality of aircraft manufactured by more than one manufacturer, at least some of said information being obtained from the database(s) of one or more external entities, wherein said aircraft information includes:

performance specifications about each one of the plurality of aircraft, one or more images of an exterior of each one of the plurality of aircraft, one or more images describing an interior of each one of the aircraft, information about internal dimensions of each one of the aircraft, information about external dimensions of each one of the aircraft, information about costs for each one of the aircraft, historical information about each one of the aircraft, and market and pricing information about each one of the aircraft;

storing said aircraft information in the database;

said computer server serving information to a user computer for causing said user computer to display on a user interface formatted aircraft information about a chosen one of said plurality of aircraft, said formatted aircraft information being derived by said server from said aircraft information, said formatted aircraft information including:

pricing information about the chosen one of said plurality of aircraft, said pricing information including market trends, and performance information about the chosen one of said plurality of aircraft, wherein said formatted aircraft information is organized for presenting on said user computer by allowing user selection of any one of a plurality of tabs, such that for any chosen one of said plurality of tabs, different formatted aircraft information is displayed;

said computer server providing additional information to the user computer for providing the user with an option to select an update of the chosen one of said aircraft, such that in response to selecting the update of the chosen one of the aircraft, the information that is displayed from any selected one of said tabs is updated to display aircraft information about the selected updated chosen one of said aircraft; and accepting input from the user regarding specific needs of the potential purchaser, wherein said specific needs of the purchaser include a first set of criteria and a second set of criteria different than the first set of criteria;

said server determining a subset of aircraft from said plurality of aircraft meeting the first set of criteria;

providing user access to information about said first subset of aircraft;

determining a list from the subset of said plurality of aircraft that are ranked by how well each one of the aircraft in said list meets the needs of the potential purchaser; and displaying said list to said user with said ranking, wherein said user can select any one of said aircraft from said list to display aircraft information about the selected one of said aircraft.

Also provided are additional example embodiments, some, but not all of which, are described herein below in more detail.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The features and advantages of the examples described herein will become apparent to those skilled in the art to which this disclosure relates upon reading the following description, with reference to the accompanying, in which:

FIGS. 35-61 show example screen shots (as photographs) generated by the example system embodiment for supporting a specific example scenario.

DETAILED DESCRIPTION OF THE EXAMPLE EMBODIMENTS

An apparatus and method for supporting aircraft acquisition services for aircraft manufactured by a plurality of different manufacturers is disclosed. As will be appreciated by one of skill in the art, examples of the disclosed innovations may be embodied as a method, a system, a computer program product, software executing on a processor/computer, or a combination of the foregoing. The example embodiments may take the form of an entirely hardware implementation, or an implementation that combines software (including firmware, resident software, microcode, etc.) and hardware components. The software may be stored on a computer usable storage medium having computer-usable program code embodied in the medium, which may be packaged as a computer program product.

For the example embodiments, provided is a computer software system executing on a computer or computer system utilized by various parties to enable the users (e.g., internal brokers, analysts, researchers, management, salesmen, appraisers, programmers, etc.) to create and utilize a system to provide detailed information to a potential purchaser of aircraft based on the needs of the potential purchaser. Thus, the system enables the user to determine which of a plurality of available aircraft (which may be new, or used, aircraft) best suits the needs of the potential purchaser (customer). The customers provide the operators of the system (e.g., "Jet Advisors™") with their minimum requirements for performance, operating cost budget and personal preferences. Jet Advisors uses the system and method disclosed herein) to identify qualified aircraft. The system is then used to analyze the specific performance of each aircraft, compare and contrast to other options and statistically rank order the best possible choices for the customer.

Figure 1:
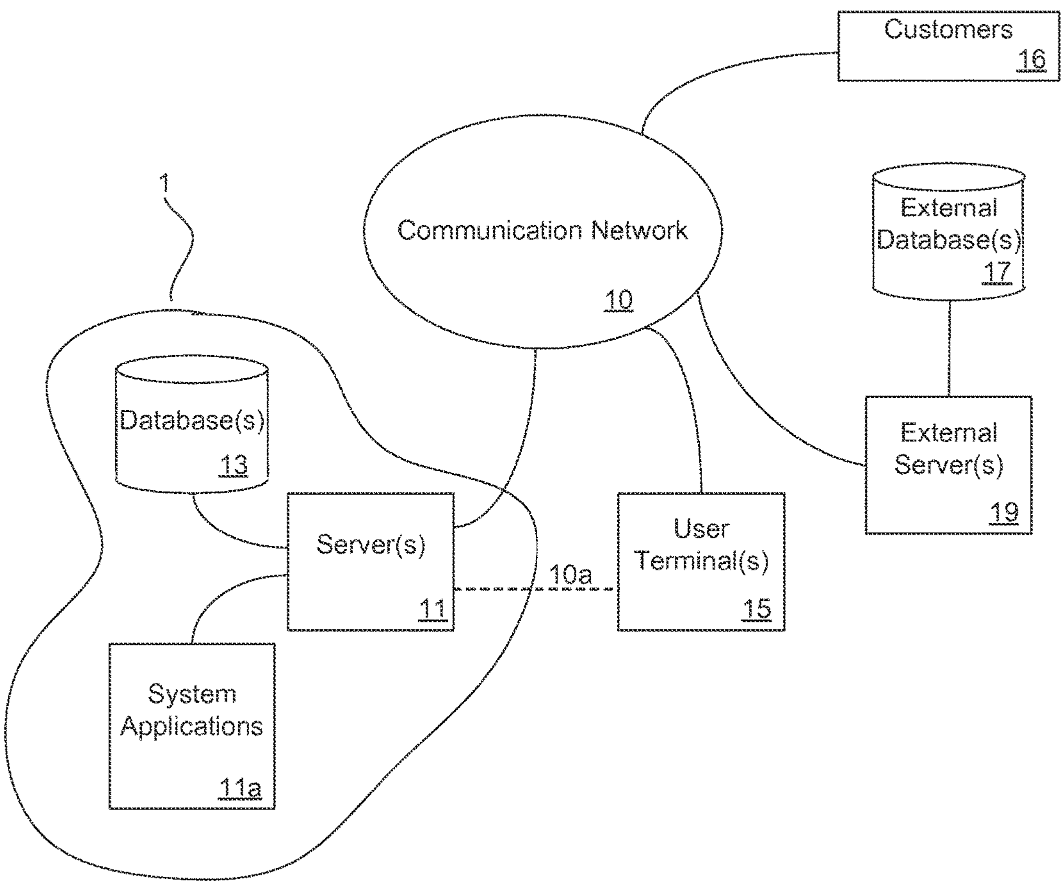
FIG. 1 is a block diagram showing an example high-level architecture for implementing an example embodiment of the system.

The example system utilizes a server-based computer system with database, such as shown in FIG. 1. In its simplest form, the system 1 has one or more servers 11 for executing a plurality of system software applications 11*a*. A database 13 is used for local storage and data structures. This system 1 is connected to other external systems 19 (with their own databases 17) via a communication network 10, which can be a private intranet (such as an internal Ethernet network), or a public network such as the Internet, or a combination of these networks, or other communication networks that may be private or public. Such networking technology as WiFi, Bluetooth, cellular networks, or others could be utilized by such a system. One or more user terminals 15 are connected to the system 1, and may be considered a part of the system 1, or may be remote terminals accessing the system 1 over a private communication network 10*a* (such as an intranet), or over the communication network 10 such as the Internet. Hence, customer computers 16 can be provided access, where desirable.

The remote terminals 15 (and/or customer computers 16) may be personal computers, laptops, smart phones or tablets, or any other computing device that can connect to the server 11 by an appropriate communications protocol such as TCP/IP, e.g., via a web-based system. For a web-based system, the server 11 would likely include a web server, such as the proprietary MS IIS or the open source Apache, for example. The server could utilize an operating system such as Windows, Linux, or some other industry standard operating system. The database 13 could be a proprietary database, such as might be provided by Microsoft or Oracle, or an open source system such as MySQL, for example.

Any suitable computerized device comprising a processing component (e.g., a processor) and a computer readable medium may be utilized for providing example embodiments. Generally, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means. The computer readable medium may comprise, for example but not limited to, an electronic, magnetic, optical, electromagnetic, infrared, or semiconductor system, apparatus, device, database, or propagation medium. More specific examples of the computer readable medium would include, but are not limited to, a computer diskette, a hard disk, a random access memory (RAM), a read-only memory (ROM), an erasable programmable read-only memory (EPROM or Flash memory) which may be internal or external, permanent or removable, a compact disc read-only memory (CD-ROM) or random access memory (CD-RAM), or any other tangible optical, electrical, magnetic, or other storage device; or storage found on transmission media such as those supporting the Internet or an intranet, including temporary cache memory.

Computer program code for carrying out operations of the example embodiments (e.g., for providing the system applications 11*a* of FIG. 1) may be written by conventional means using any computer language, including but not limited to, an interpreted or event driven language such as BASIC, Lisp, VBA, or VBScript, or a GUI embodiment such as visual basic, a compiled programming language such as FORTRAN, COBOL, or Pascal, an object oriented, scripted or unscripted programming language such as Java, JavaScript, Perl, Smalltalk, C++, Object Pascal, or the like, artificial intelligence languages such as Prolog, a real-time embedded language such as Ada, or even more direct or simplified programming using ladder logic, an Assembler language, or directly programming using an appropriate machine language.

The software of the example system comprises computer program instructions that are executed by being provided to an executing device or component (such as the server 11), which can include a processor of a general purpose computer, a special purpose computer or controller, or other programmable data processing apparatus or component, such that the instructions of the computer program, when executed, create means for implementing the functions/acts specified in the flowchart and/or block diagram block or blocks. Hence, the computer program instructions are used to cause a series of operations to be performed on the executing device or component, or other programmable apparatus, to produce a computer implemented process such that the instructions which execute on the computer or other programmable apparatus the steps for implementing the functions/acts specified in this disclosure. These steps or acts may be combined with operator or human implemented steps or acts and steps or acts provided by other components or apparatuses in order to carry out any number of example embodiments of the invention.

The example flowcharts and/or example block diagrams and the example screen shots shown in the Figures illustrate example architecture, functionality, and operation of possible implementations of example systems, methods and computer program products according to various example embodiments of the present invention. In this regard, each block in the flowchart or block diagrams may represent a module, segment, or portion of code that makes up the software, and thus which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Figure 1A:
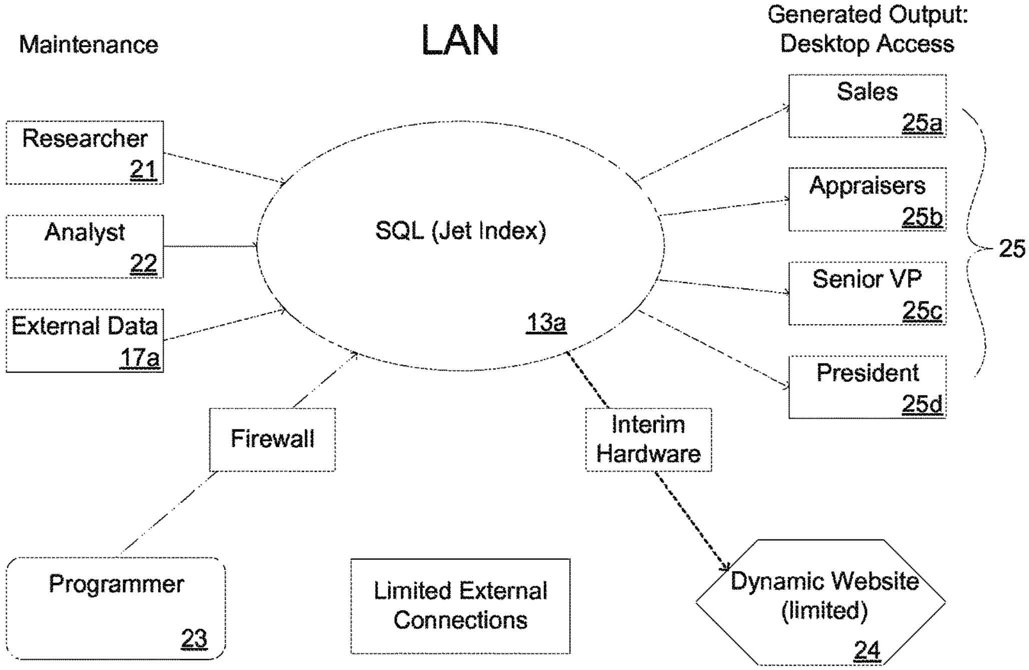
FIG. 1A is a diagram showing the primary external entities interacting with an example system.

System connectivity of an example system is shown by FIG. 1A, where an SQL database 13*a* is initially populated by inputs from various sources, such as a researcher 21 an analyst 22, and various external data sources 17*a*, among others. Access will be provided to various user and management groups 25, and the data will be used to drive a dynamic website 24, for use by various users.

For the example embodiment, the Server operating system for the server 11 of FIG. 1 is Small Business Server 2011 Standard. The database 13 is running 2008 MS SQL Microsoft SQL Server 2008R2 Workgroup, OEM, Includes 5 CALsNFI, With Media. The current statistical analysis software that is provided in the System Applications 11*a* is currently SPSS but subject to change. A closed internal network 10*a* with access limited to local employees using desktops with 2010 Access interfaces as the front end is the primary path to the users of the system 1. However, modifications to allow customers/users access to some parts of the system can also be provided, such as by connecting to an external communication network 10, such as the Internet. By connecting to such a public network, remote access can be provided to users, as well as an interface for connecting directly to customer computers 16, where desirable, In preferred examples, only the company principal is typically allowed access to the statistical reporting and generated outputs to keep such information proprietary. External employees are typically not allowed access to the system and must request reports, although modifying the system to provide secure access to only specific portions of the system to external employees can be optionally implemented. Those with access to various parts of the example system, as shown in the System connectivity diagram 1A, are described in more detail below (although optional limitations on access can be provided based on the type of access desired):

Researchers 21: All local researchers/salesmen will have limited access to the database (DB) 13*a* through their desktop computer using a MS Access 2010 front end. They will be allowed to make changes only to the aircraft they are researching. The system keeps track of all changes and "stamps" are provided to indicate who made a change and when the change was made Appraisers 25*b*: All local appraisers will have limited access to the database (DB) 13*a* through their desktop computer using a MS Access 2010 front end for supporting the appraisal process. They will be allowed to make changes only to the aircraft they are researching. The system keeps track of all changes and stamps that made the change.

Analysts 22: The local Analyst will have expanded access to the database (DB) 13*a* through one desktop computer using a MS Access 2010 front end. The analyst will be allowed to make changes to the system as directed by the Principal. The system keeps track of all changes and stamps that made the change. The Analyst will also have access to MS SQL to make required changes to the system as directed by the Principal.

Programmers 23: The Programmer will have full access to the database (DB) 13*a* remotely (such as via the public network 10 of FIG. 1, or a private network, or securely via VPN, for example). The programmers will be allowed to make changes as required to develop new reports and update the various system applications and/or settings. The system keeps track of all changes and stamps who made the change.

Senior Management (e.g., VPs) 25*c*: The local SVP will have expanded access to the database (DB) 13*a* through at least one specialized desktop computer using a MS Access 2010 front end. The SVP will be allowed to make limited changes to the system. The system keeps track of all changes and stamps who made the change.

Principals: The Principal (e.g., the president 25*d*) will have full access to the system and is the only one with access to reports and generated outputs in the example system (although in a larger system, such access could be provided to a number of trusted individuals).

As discussed above, one user is a salesman/researcher who is utilizing information obtained from the potential purchaser (the customer) in an attempt to match the needs of the customer to available aircraft.

The Aircraft Dashboard

Figure 2:
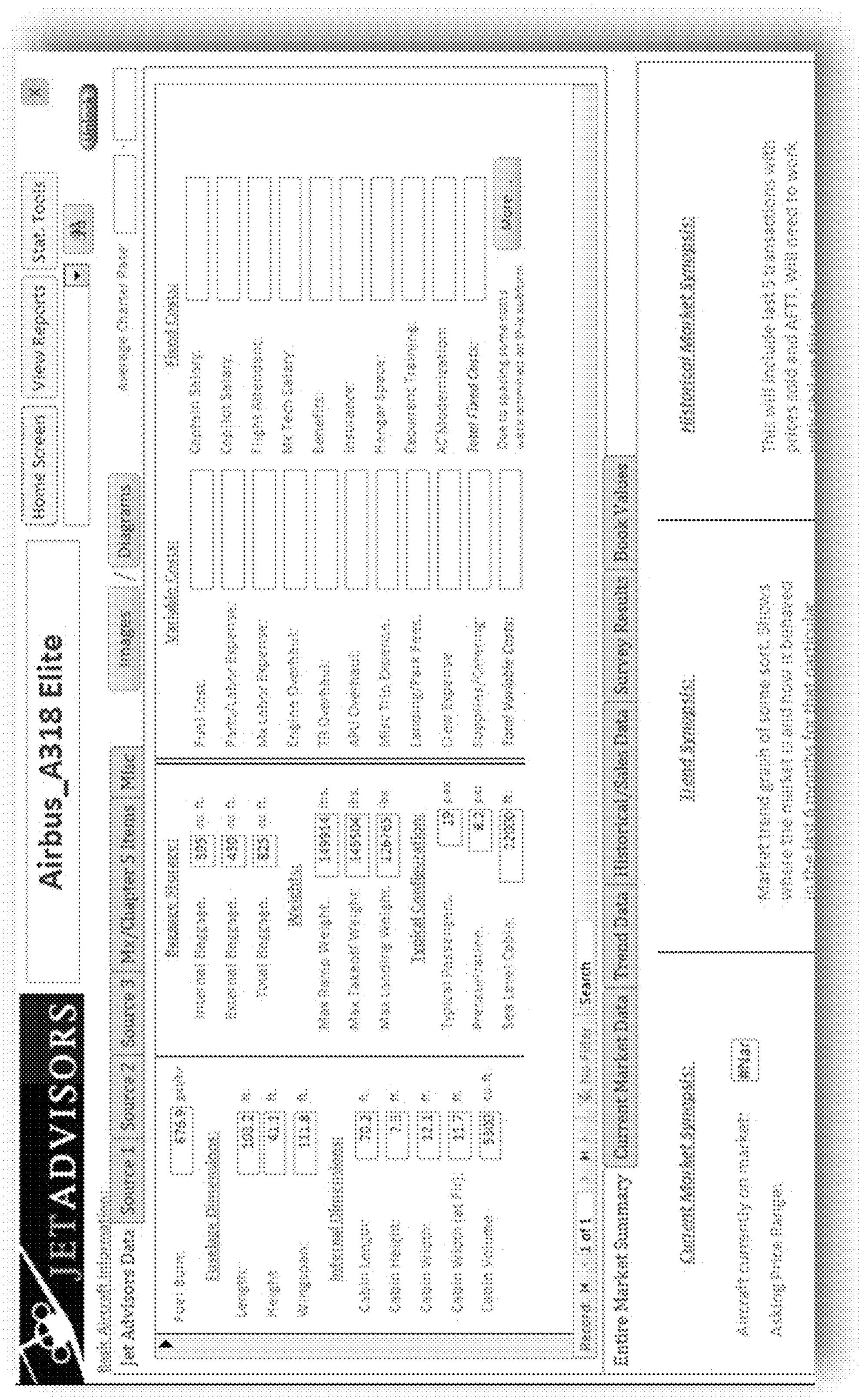
FIGS. 2-31 show example screen shots (as photographs) generated by the example system embodiment from data stored in the system.
Figure 3:
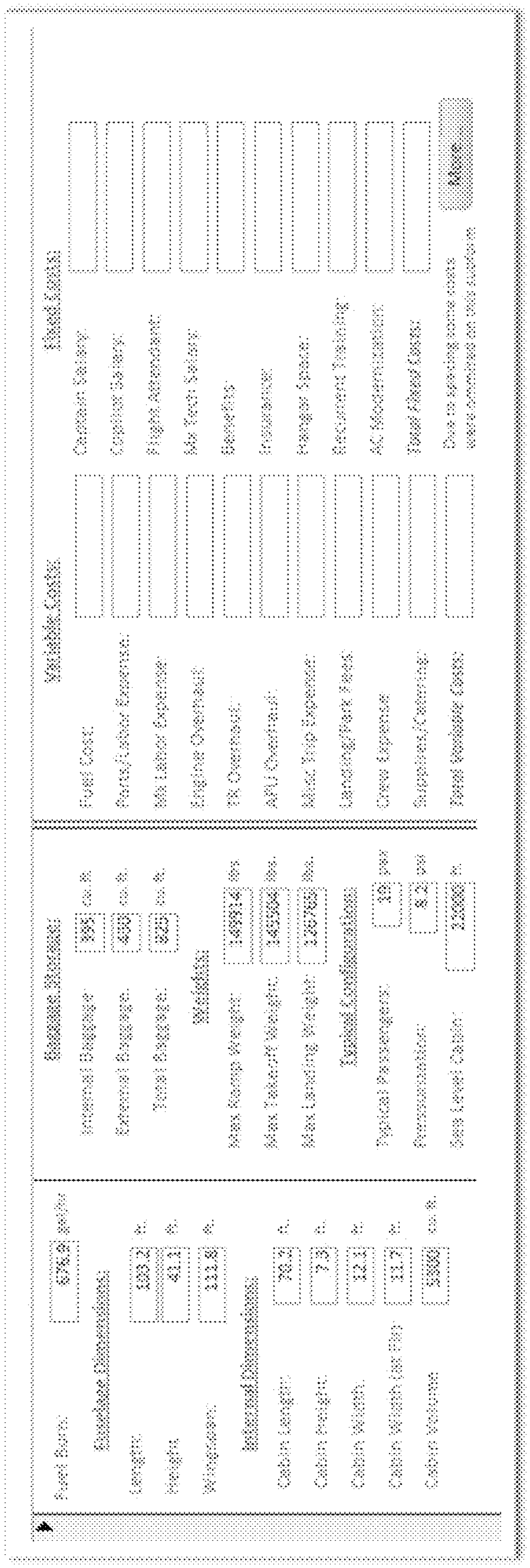

FIG. 2 shows an example screen shot of the Aircraft Dashboard generated by the example embodiment. The purpose of the Aircraft Dashboard is to have the most up to date information readily accessible by salesmen/researchers and appraisers. This displays aircraft performance, costs and market data while simultaneously showing the ordinal ranking within the aircraft category for each parameter. As a major benefit of using the system, the user will save time and be able to come up with answers relatively quickly to respond to customer inquiries, all in all a serious advantage against the competition. A sample of data that will be quickly available to the user is shown by the User Data Example screen shot of FIG. 3:

User Data Example: The screen shot of FIG. 3 contains a sample of the data that can be provided from one of the sources as displayed on the Aircraft Dashboard (showing some data that is currently in the process of being modified). This data is selected based on its importance and frequency of use during sales calls and the appraisal process so that the data is quickly made available to support customer inquiries.

A quick synopsis of important or useful data is provided through several tabs in the Aircraft Dashboard view of FIG. 2. The Aircraft Dashboard is specifically designed to have the most important information be readily available at the fingertips of the appraiser, salesman or the researcher. The data itself is updated regularly, as defined in the Update manuals, and fed into the server (such as by the researchers and/or analysts), which in turn feeds the database. The data that is displayed on the Aircraft Dashboard is handpicked through suggestions by the users. However, the overall layout and the type of data may change as the company deems necessary to support market needs. The purpose of this synopsis view is to reduce the time and the effort that is required when looking up information during telephone calls or the appraisal process, in order to quickly respond to customers.

Figure 4:
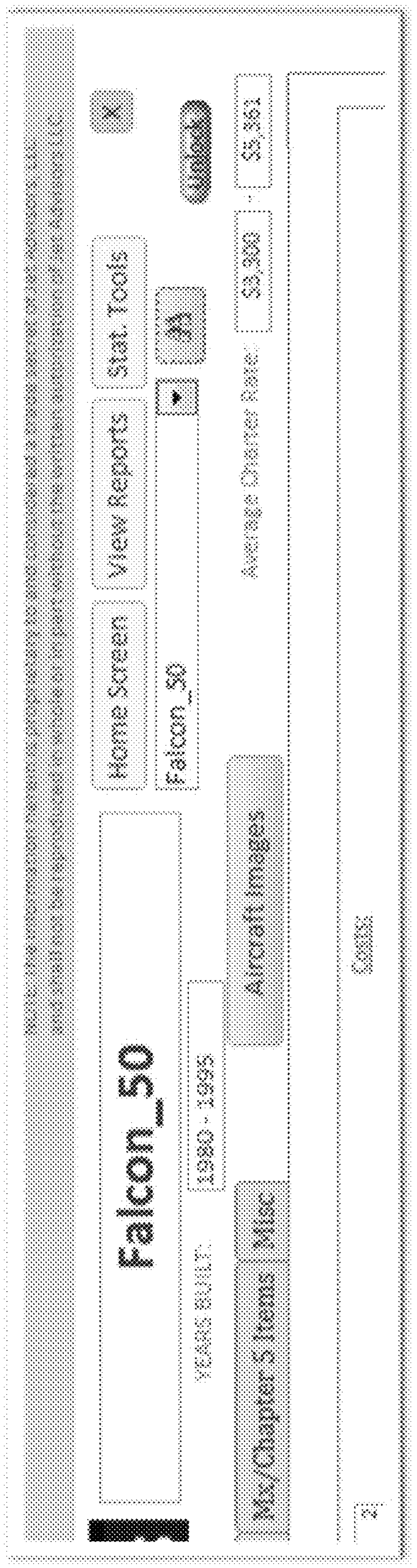

Current Market Data:

FIG. 4 is a diagram (screen shot) of the current market data tab which is available in the lower section of the Aircraft Dashboard of FIG. 2. This market data is fed directly from a subscription service database such as JetNet (JetNet is a subscription based package that provides data on worldwide business aircraft) through the local server with any system data, updated by researchers and salesmen, taking priority in most (about 95%) cases. This tab is specifically designed to display the latest market data right from the Aircraft Dashboard form without the necessity of relying on a service which is currently available through a browser only. The market snapshot displays several important variables, as recognized by the salesmen and appraisers, and that list can be expanded. The data itself is updated on a regular basis by the company's researchers and salesmen, as well as through monthly updates from a subscription service such as JetNet via the MTD Export Tool.

Figure 34:
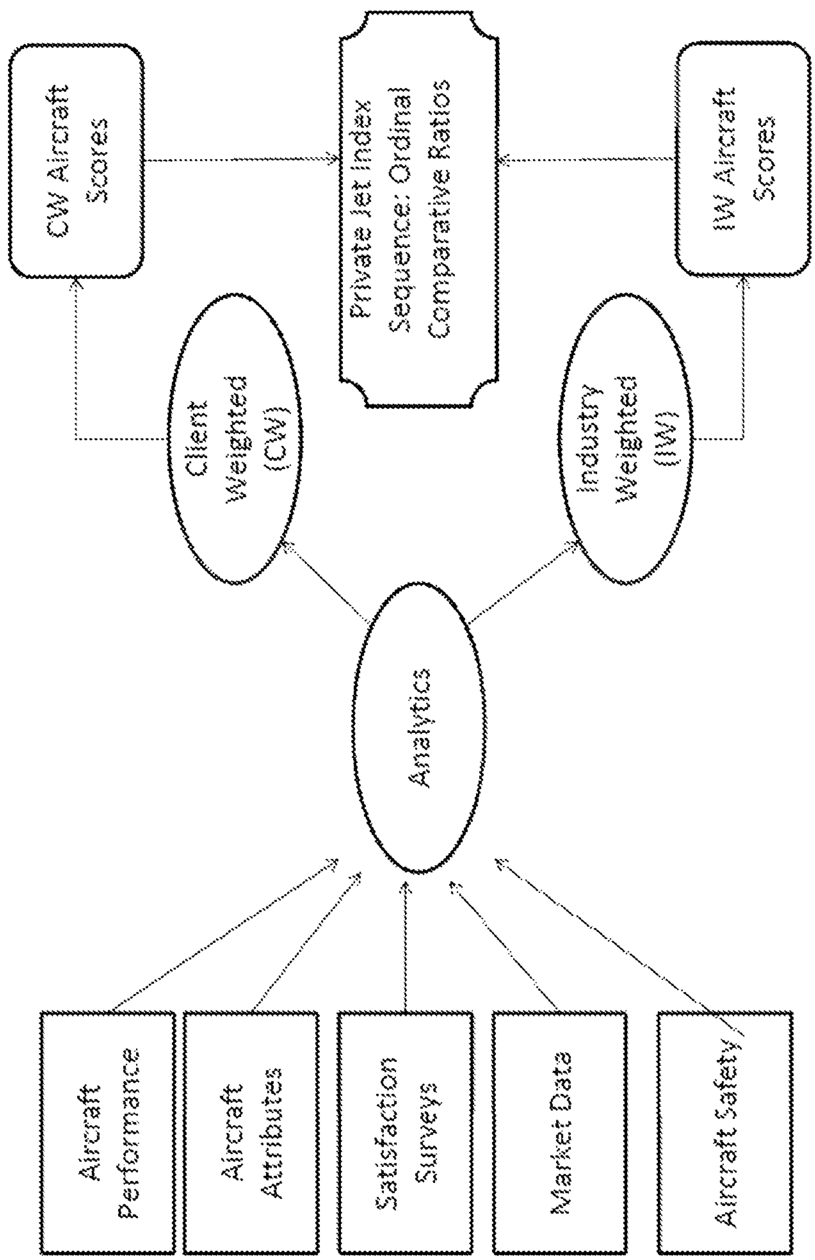
FIG. 34 shows an example flow chart showing an example flow of data and processing for the example system embodiment.

Ordinal ranking and scoring will be accomplished by statistical operations on the aircraft performance, aircraft attributes, market, safety and satisfaction surveys will be statistically analyzed, scored and ranked. These scores will be adjusted for both the client's needs and standard industry needs to create a final scoring. Each aircraft under consideration will be scored and ranked and the User will be able to quickly understand how superior one aircraft is over the next ranked aircraft. This will help the salesmen during phone calls with clients in deciding the best aircraft type for a particular potential customer mission. FIG. 34 is a flow chart showing an example process to aid in determining such scores and ranking.

The diagram of FIG. 4 shows useful design features of the Aircraft Dashboard of FIG. 2, such as the navigation buttons and the aircraft selection menu. The design of the Aircraft Dashboard is fairly straightforward, as at the top of the Aircraft Dashboard view is the company logo as well as a small navigation toolbar. The purpose of this toolbar is to take the user from one aircraft to another aircraft relatively quickly. This is done by choosing an aircraft from the drop down menu and hitting the button to the right of the drop down, which pulls up all of the information available for that particular aircraft type. There is also an option to go back to the Home Screen (welcome screen), and start working from the very beginning. A link to reports and statistical tools will take the user to the other forms in the system, which are currently still in development. An option to view images for each aircraft is also available and opens a new window with several stock photos of the particular aircraft type, with the user being able to go through the window and go through the pictures. The option itself is based on each particular aircraft type and will only allow the user to view images for the current type selected from the drop down.

Figure 5:
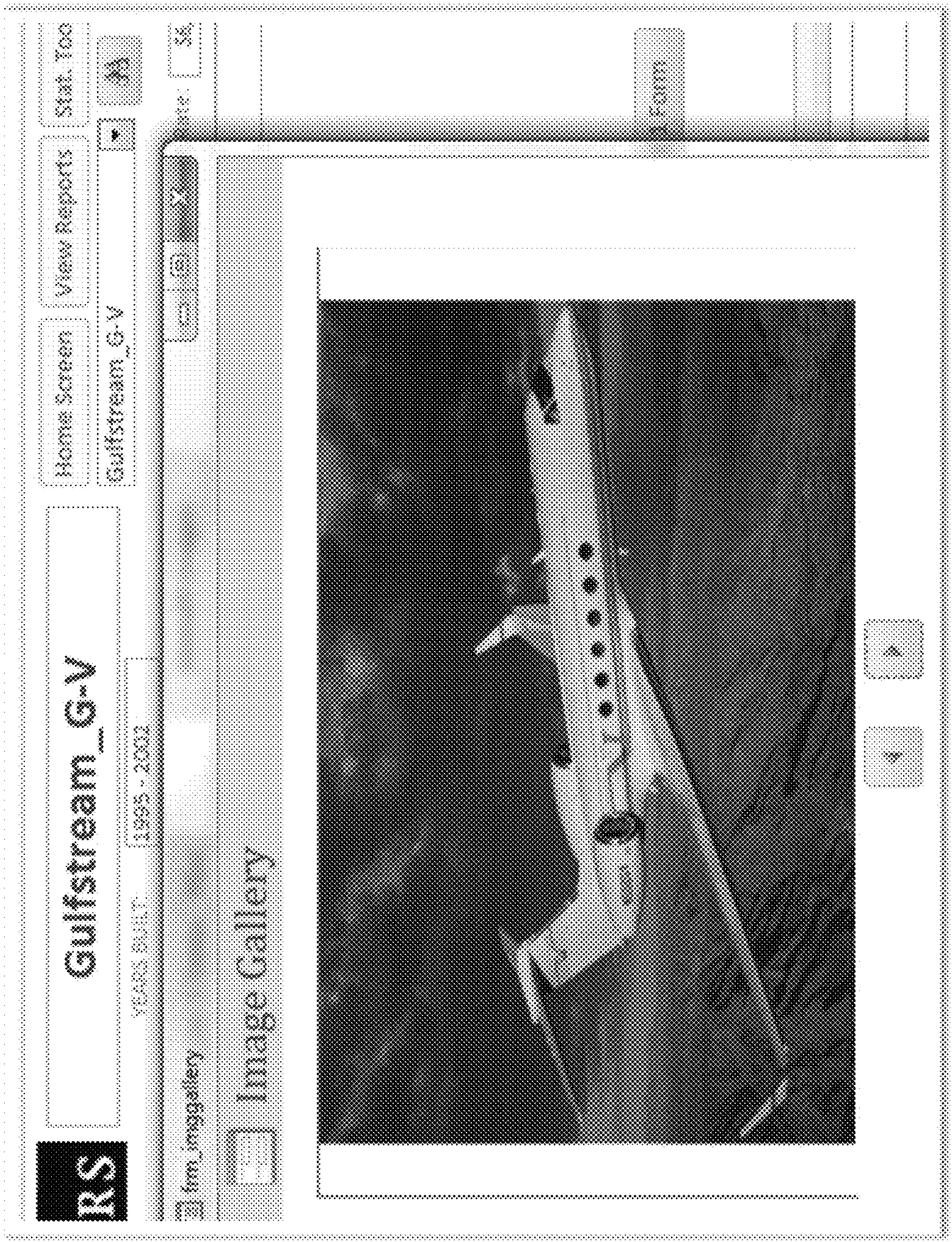

FIG. 5 provides a screen shot of an example picture from the aircraft image gallery stored in the system database. In this case the user selected a Gulfstream G-V, and thus the Gulfstream G-V pictures are provided to the user. The user can navigate to the next or the previous photo in the database with the appropriate buttons provided below the image shown in the screen shot. The images themselves are stored on the company database.

Figure 6:
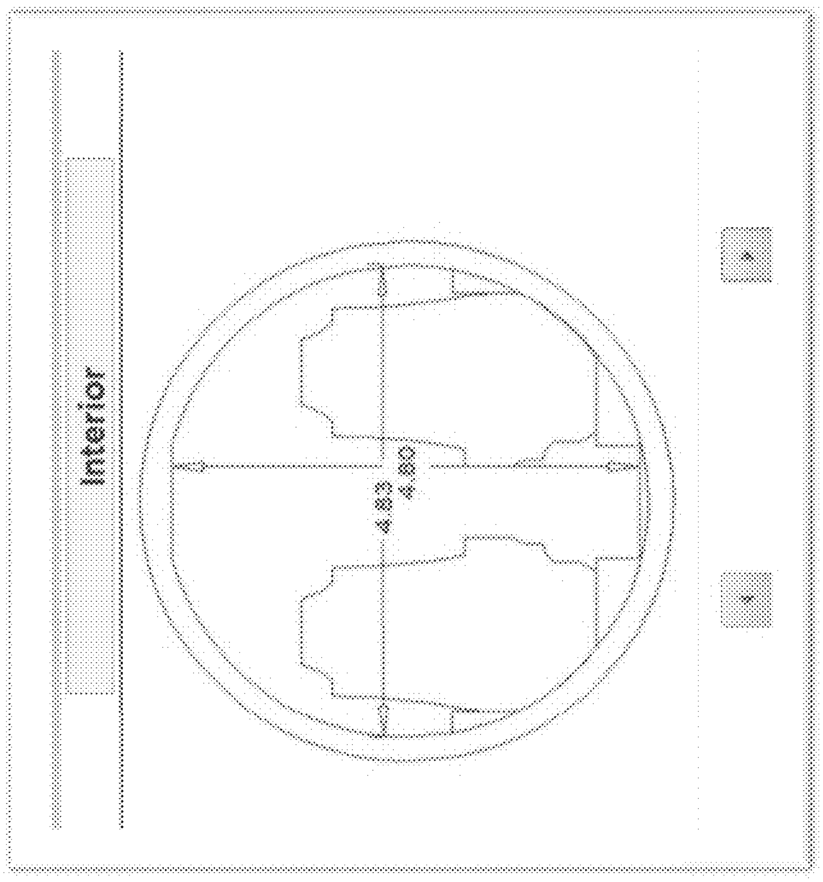

A very similar setup as the one that is laid out above in the aircraft images example provides for other aircraft diagrams. Such aircraft diagrams are stored on the server as well, and are unique to each aircraft (where applicable). The user can choose to navigate between diagrams or switch between aircraft and then re-click the diagrams button on the Aircraft Dashboard to see the appropriate diagrams for that particular aircraft type. FIG. 6 provides a screen shot of one example of such a diagram, showing the interior dimensions of a chosen aircraft.

Figure 7:
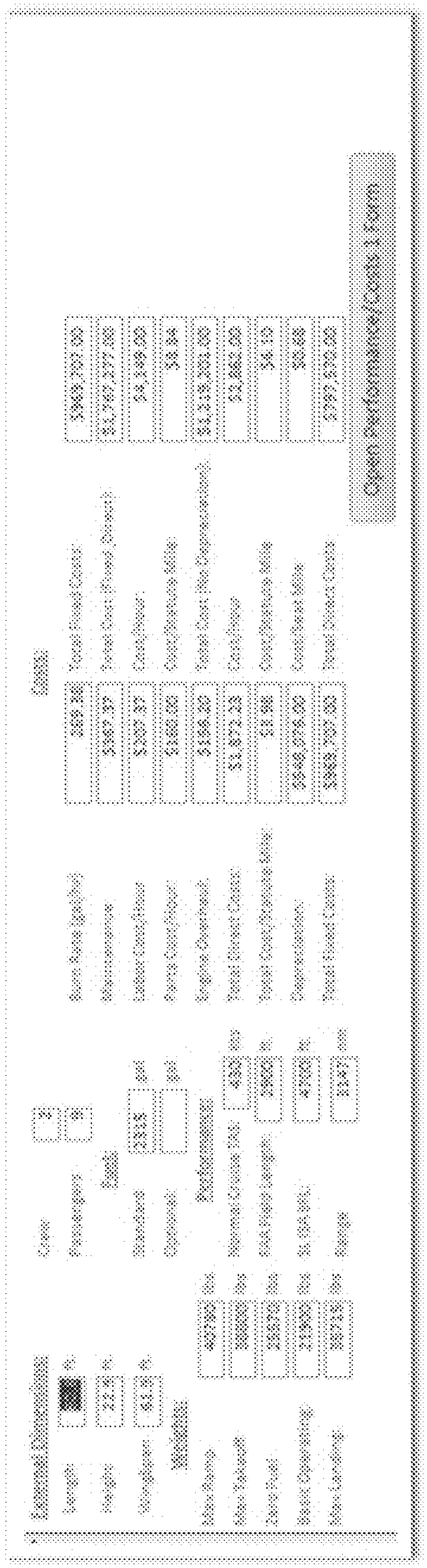

Basic Aircraft Information:

The Basic Aircraft Information section will provide the most important information that is often used when discussing aircraft with clients. Range, payload, number of passengers, speed, runway requirements and other data will be directly visible on the Aircraft Dashboard under each appropriate tab with a link to the original form for more detailed information (for an example list refer to the figures discussed below). Several examples of this data are discussed below and are in the order of tabs provided in the example system:

FIG. 7 shows example information, purchased from a subscription service such as the JetNet database. As described above, JetNet is a subscription based package that provides data on worldwide business aircraft.

Figure 8:
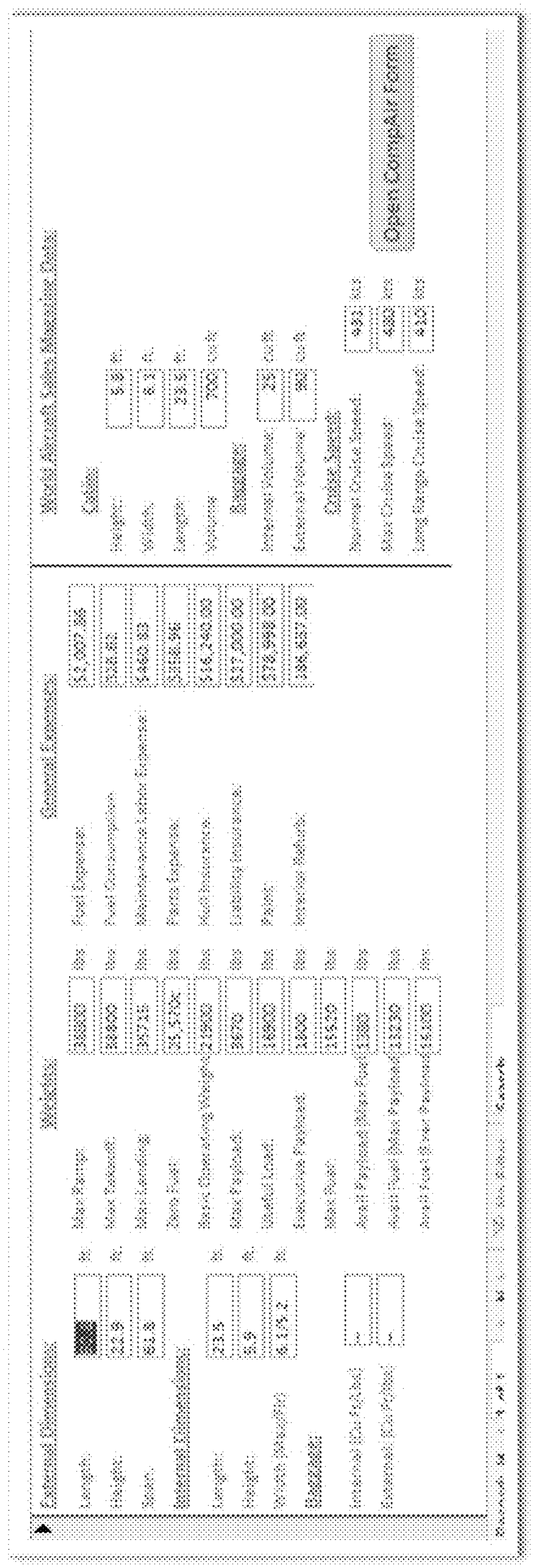

FIG. 8 shows example information, purchased from ARG/US and World Aircraft Sales Magazine databases.

Figure 9:
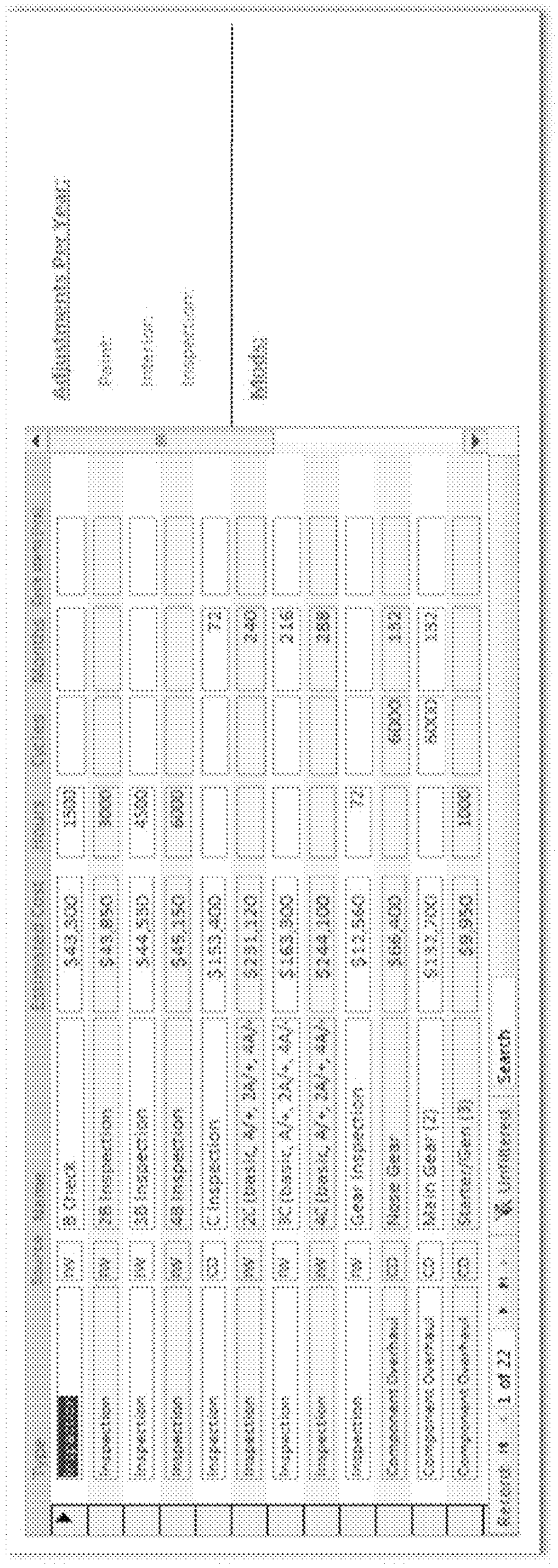

FIG. 9 shows example Chapter 5 maintenance items collected from various sources as well as information purchased from Conklin & de Decker. Conklin & de Decker provides the general aviation industry with objective and impartial information in the form of professionally developed and supported products and services related to aircraft. To the right of that, yearly adjustment figures will be provided to the appraiser to help them ease the process.

The maintenance and Chapter 5 items tab shows the most important inspections based on aircraft type selected on the Aircraft Dashboard. These items are usually in ascending order starting with the most frequent inspection. There is also information on the cost of component overhauls, engine overhauls, the pricing of limited life parts as well other miscellaneous maintenance related items.

Figure 10:
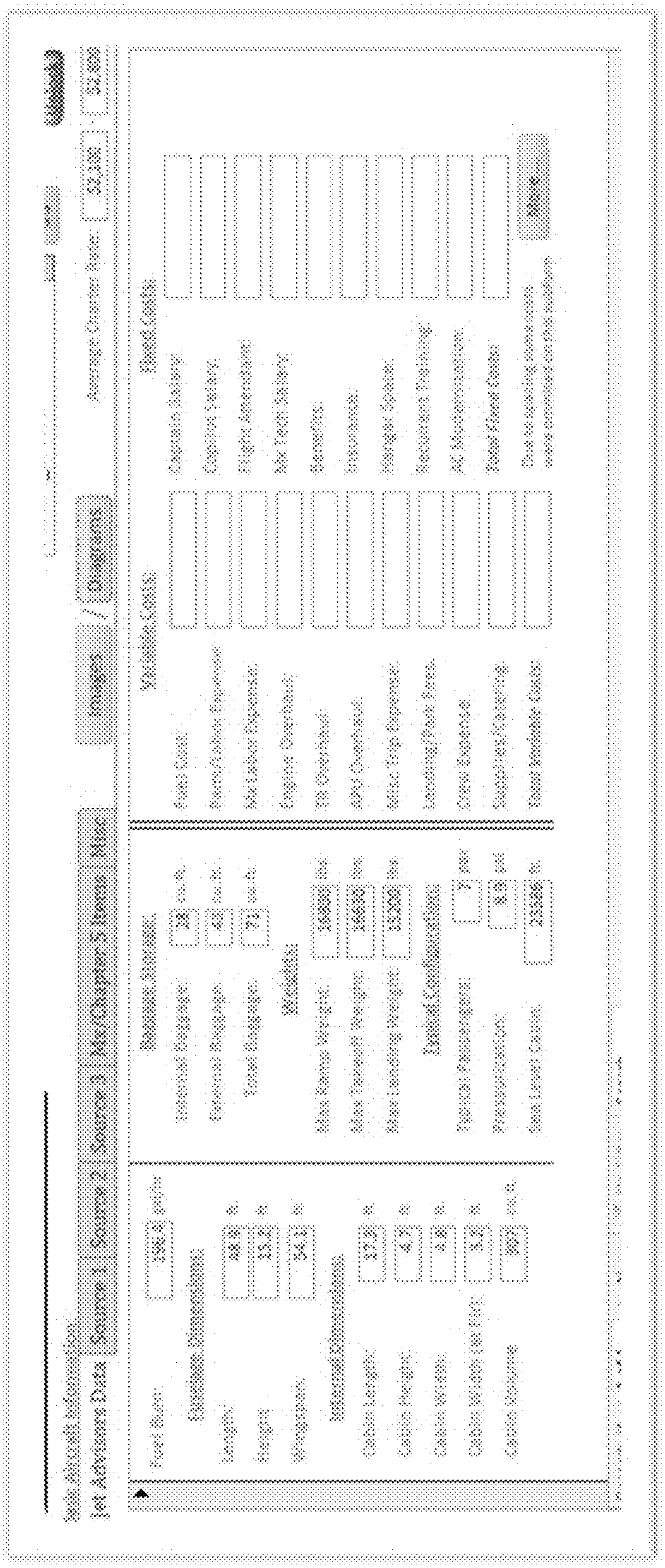

Finally, the most important tab in the Aircraft Dashboard is the first tab under Basic Aircraft Information, an example of which is shown in FIG. 10. This data tab displays the system's version of performance and operating cost numbers. These numbers are derived from multiple sources, periodically checked and dynamically analyzed in order to be presented on the aircraft dashboard. The example FIG. 10 shows operating costs that still need to be finalized.

FIG. 10 shows performance and operating costs numbers determined by the system. The operating costs are currently not filled in for this example, but as soon as they are finalized with current data, they will become dynamic and be based on the price of fuel as well as changes in the data coming from other sources (including but not limited to, JetNet, ARG/US. and Conklin & de Decker).

A miscellaneous tab has been added as well and serves as a source of other important information for each particular model. Much of the information in the Misc. tab is purchased through a subscription service such as JetNet in the form of STAR reports. There is also safety information purchased from Bob Breiling and possibly other sources, which displays accident rates for each particular aircraft type. All of this data is regularly updated, as described in the update manuals. The update times vary from item to item, as some items may be updated every month, while others several times a year.

Figure 11:
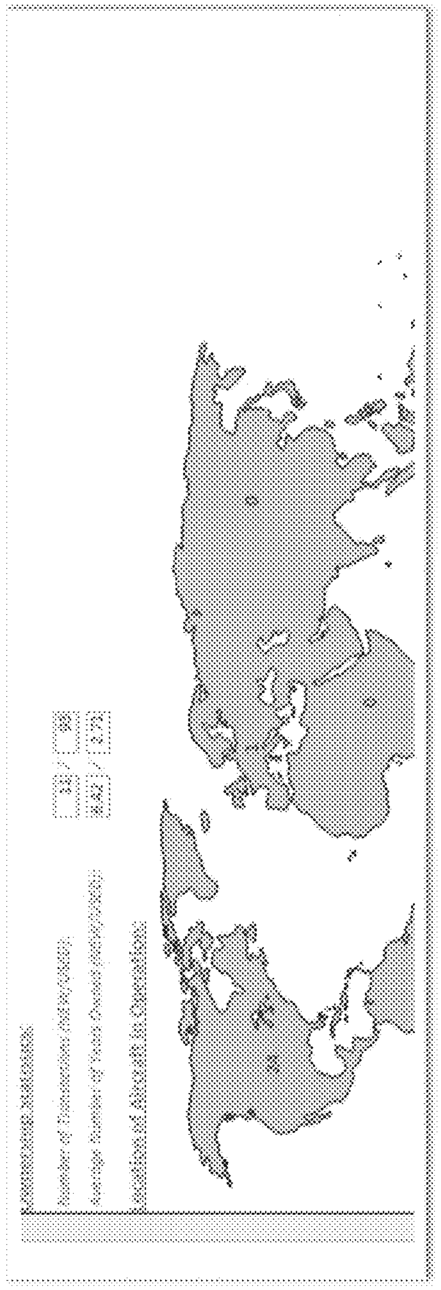

FIG. 11 provides a screen shot of one example of information that can be provided in this miscellaneous tab. This example displays information from a subscription service such as JetNet's STAR reports such as ownership statistics and the location of aircraft in operation. All data is regularly updated from the appropriate sources. The miscellaneous tab will be more useful for the salesmen as they will have an opportunity to impress the clients with a wealth of information that is usually not available at a tip of their fingers. Such information as the number of aircraft operating on a single continent or the average number of years owned should give the company a serious advantage on the phone.

Figure 12:
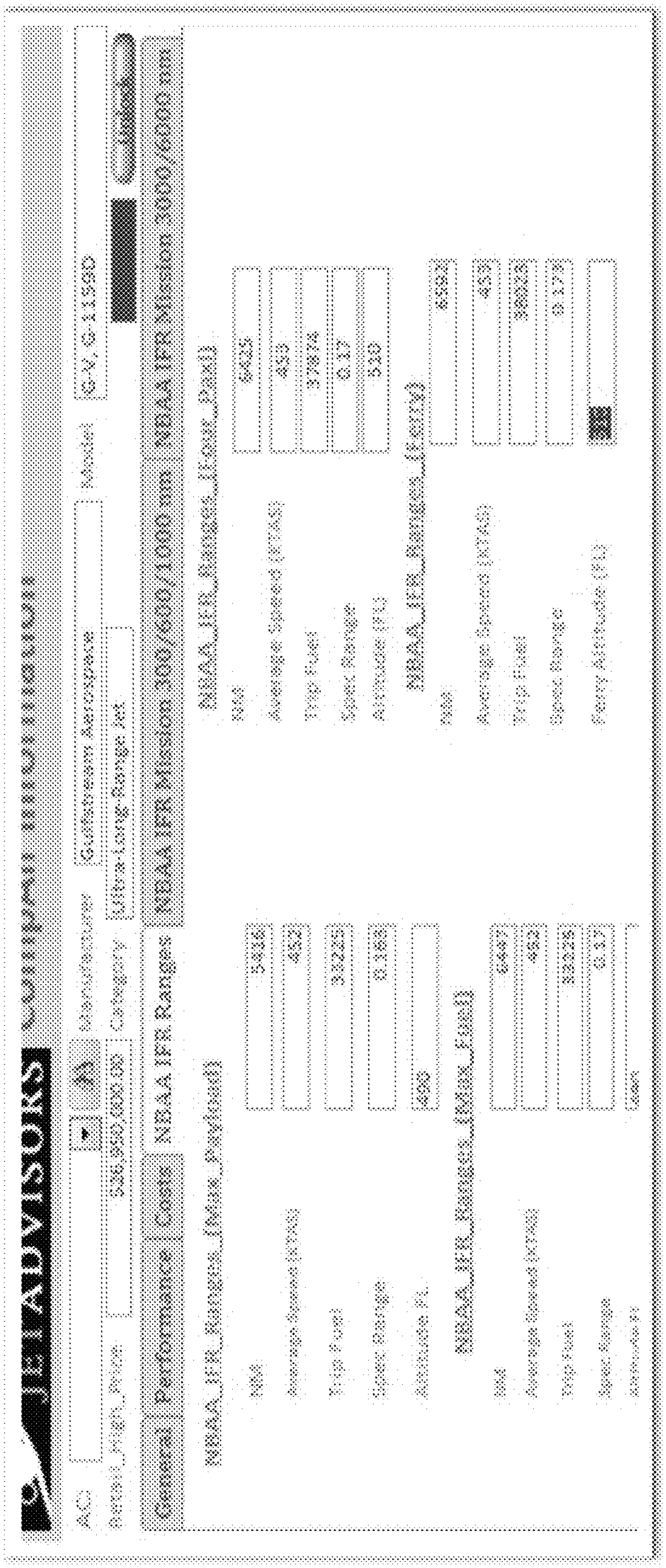

Each tab will also have a link to each particular database form, which will allow the user to view the entire database in a format that is easily accessible, reducing the time it is required to look up information. FIG. 12 shows the data purchased from ARG/US in an example form, as described above. This example shows the full form for the ARG/US database. The data itself is updated regularly, using the company's update manuals. The user is able to navigate directly to this form and the correct record by following the link on the Aircraft Dashboard. The form automatically opens to the correct record. From here the user is also able to select a different aircraft for review.

Aircraft charter rates are also provided right on the Aircraft Dashboard for each particular aircraft type (where applicable). The charter rates are collected from several sources such as local charter companies as well as online directories like Charter Hub (http://www.charterhub.com), and are updated regularly as stated in the company's update manual. The charter rates are displayed as a range from the lowest number to the highest number in the database. This ensures that the users give the clients the most accurate information. A "years built" section is also included on the Aircraft Dashboard, and it shows the years the aircraft was produced.

Figure 13:
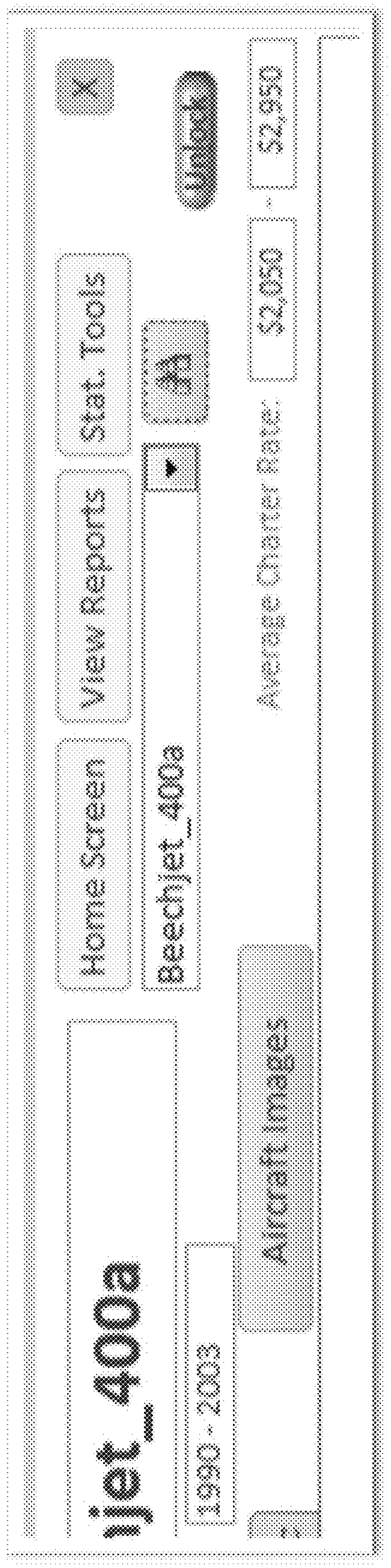

FIG. 13 shows example charter rates provided in the right corner of the Aircraft Dashboard. They are updated regularly, and are displayed as a range from the lowest to the highest number. On the left side of the diagram is the "Years Built" section, which shows the years that particular aircraft type was produced.

Figure 14:
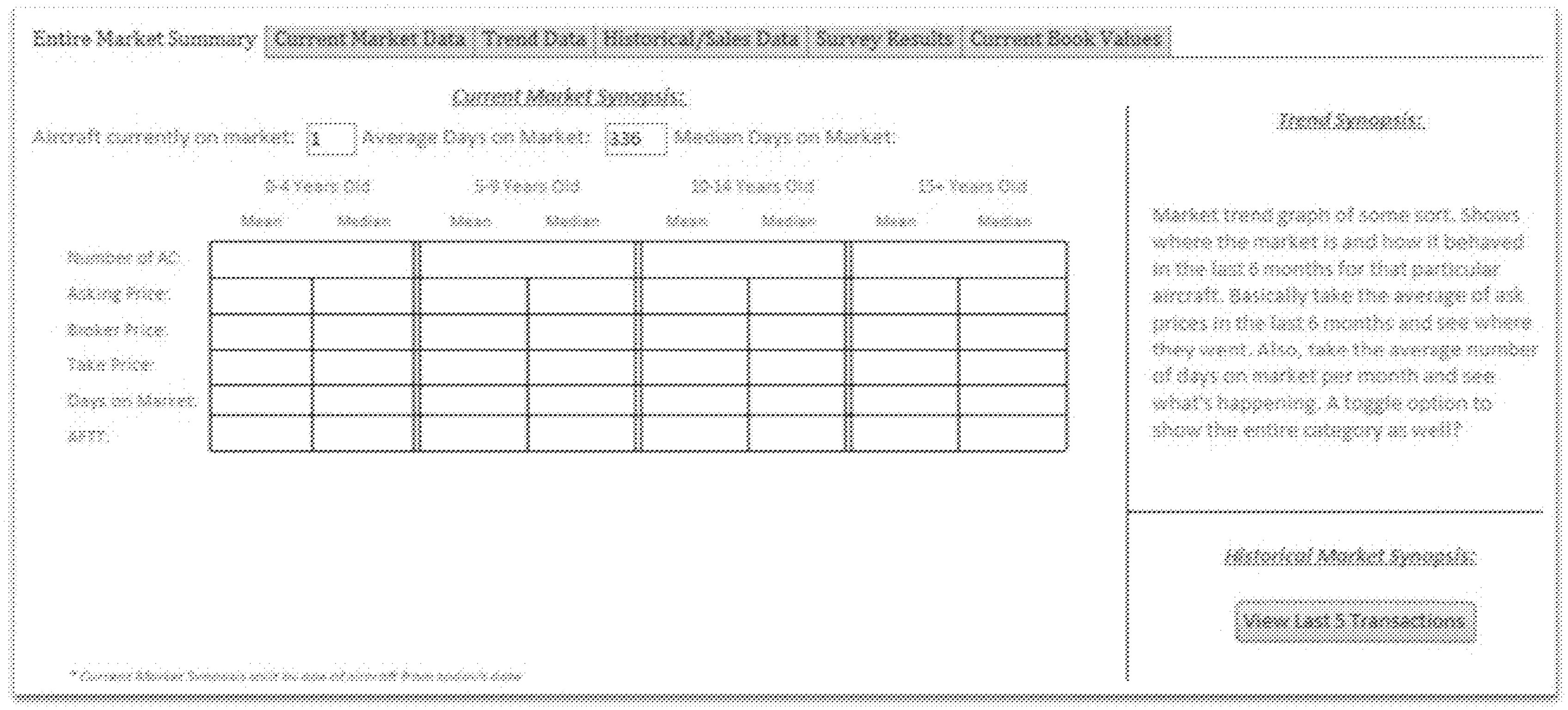

Market Summary Information:

Even more tabs are provided directly below the Basic Aircraft Information section of the Aircraft Dashboard. These tabs will serve as the market summary tabs, as shown in the example of FIG. 14. The entire market summary tab will provide a quick synopsis for the 3 other tabs. It will show the aircraft currently on market as well as their asking price ranges and the latest market trends, calculated using analysis on the data collected through a subscription service such as JetNet and a data run by the MTD Export Tool. Some examples of the data include mean and median of asking prices, broker prices, take prices (the price the seller of the aircraft accepts), days on market, airframe total time and the number of aircraft available for each category grouped by the age of the aircraft from the date of the query. The major reason for splitting this data is to accurately provide a synopsis of the entire market. It would be unfair to compare and average together an aircraft that has been produced for over 10 years and come up with a misleading market representation. The trend synopsis section can be provided as the system continues to populate the MTD section of the database. This will include market graphs and other statistics based on a similar setup as the current market snapshot. The system will also be able to compare the entire category to see where the aircraft ranks in terms of its rivals. The historical market synopsis section in the lower right corner of the screen allows the user to view the last 5 transactions for the particular aircraft type chosen and is available in a popup window form only. From there, the user will be able to view more details.

Figure 15:
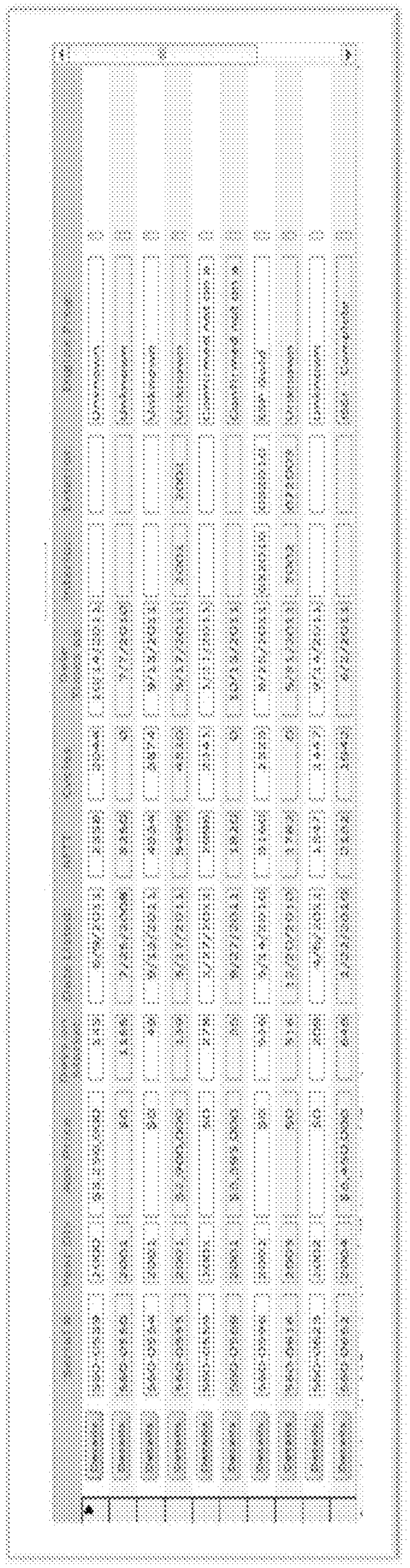

FIG. 14 shows the market summary tab in its incomplete form due to the lack of actual data. The data, as it is obtained, will be filled in for the current market synopsis The current market data tab as shown in FIG. 15 will show the current sales, pricing, days on market and other relevant information which is directly fed from the SQL server, with monthly updates from a subscription service such as JetNet as well as regular updates by the company's researchers and salesmen. The data for this tab is fed from the server through a purchased subscription from JetNet, which is later updated by employees of the system. Only the most pertinent information is displayed under this tab, in order to give the user a quick snapshot of what is available on the market today.

Figure 16:
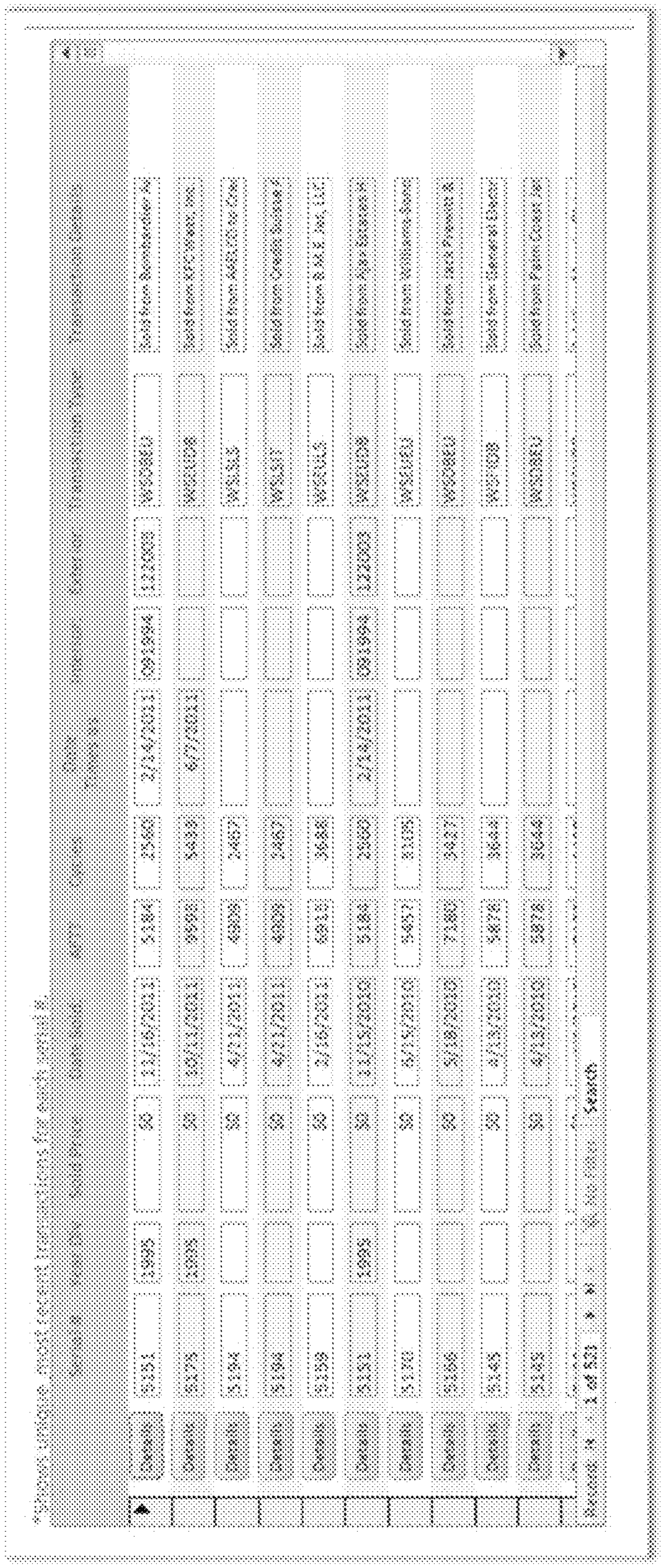
Figure 17:
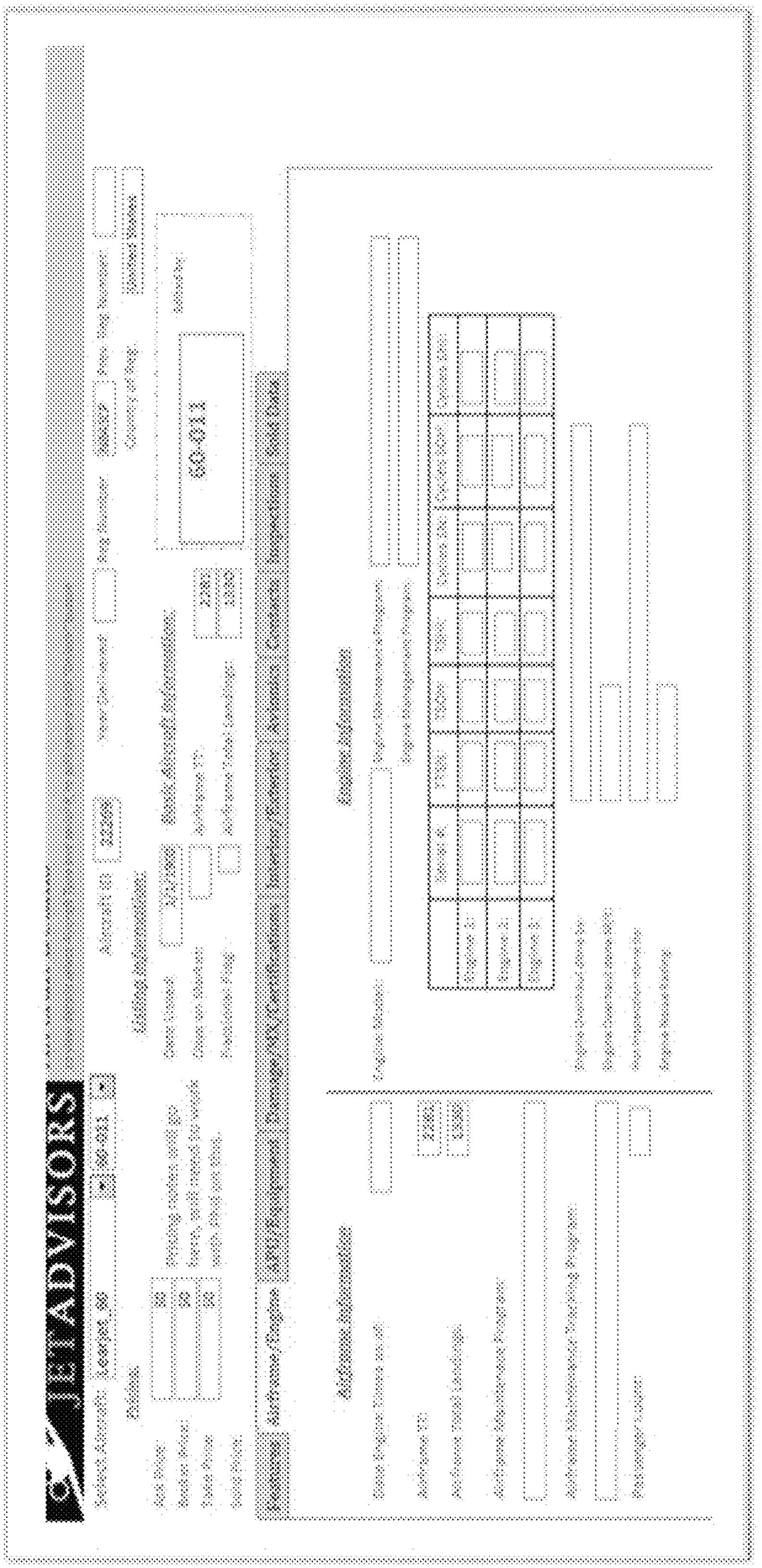

FIG. 16 shows an example historical/sales data tab. The data for display by this tab is fed from the server through a purchased subscription from a subscription service such as JetNet, which is later updated by employees. Only the most pertinent information is displayed under this tab, in order to give the user a quick snapshot of what has sold recently. By clicking the details button the user brought in to the "Aircraft Details" form which will display all the details under the "Sold Data" tab. This historical sales data form displays all transactions that are in the system going back as far as possible, but for the example system to at least the year 2000, and in some cases earlier than 1995. Currently, the vast majority of this data is provided by a subscription service such as JetNet through a subscription service. However, the system can be adapted such that researchers will be able to fill in this information themselves. By clicking the "Details" button tab to the left of each serial number, the user is brought to a new form which displays everything related to that serial number. The list of fields for each serial exceeds 200, as the form contains data on interior, exterior, engines, APU (auxiliary power unit), contact information and recent transactions:

FIG. 17 shows the view form for each particular aircraft serial number. This form will be used to view specific information on each aircraft. In addition to that, the form will work as an update tool for research staff. Any information entered in this form will be stored in the system database for further reference or analysis. In this form, the drop down menus in the top left will be used for navigation. Due to the shear amount of data, the form is also split into several tabs for easy access to each particular generic item, such as engine information.

The trend data tab, which is essentially the MTD, will show the latest trends for the particular aircraft model chosen in the dropdown menu at the top. This trend data will be also be available for each unique aircraft, by serial number and will show that serial number's history on the market. This information will include such items as updated airframe times and most importantly price changes over time as the aircraft spends time on the market. Historical and sales data will show all transactions in reverse chronologic order for the particular aircraft type chosen from the drop down menu on the Aircraft Dashboard. This is currently incomplete.

Finally, the last tab, the survey tab will display the collected results from the surveys conducted for this purpose. These surveys will be derived from webinar or other electronic means to conduct a focus group of experienced professionals. The data from the webinar will be Text Mined to establish themes. These themes will be used in designing the owner satisfaction surveys. The surveys will be randomly distributed (using random number generator or similar technology) to select aircraft owners. The results will be comprehensively analyzed by the appropriate statistical analysis (factor analysis, structure equation models and more). See provisional patent application Ser. No. 61/664,968 filed on Jun. 27, 2012, regarding eFocus Groups, incorporated by reference, for more detail.

Generally, for this example embodiment, the Aircraft Dashboard is not designed to be an update tool. Any information received by researchers and other staff members will have to be entered in other parts of the database for the example embodiment, although extensions to the Aircraft Dashboard could be provided for such data entry, if desired. But for the example, referring to the update manual will be necessary for all updates that are done within the system. However, in other embodiments, means of entering updated information directly using an interface, such as from the Aircraft Dashboard itself, can be accommodated, if desired.

Figure 18:
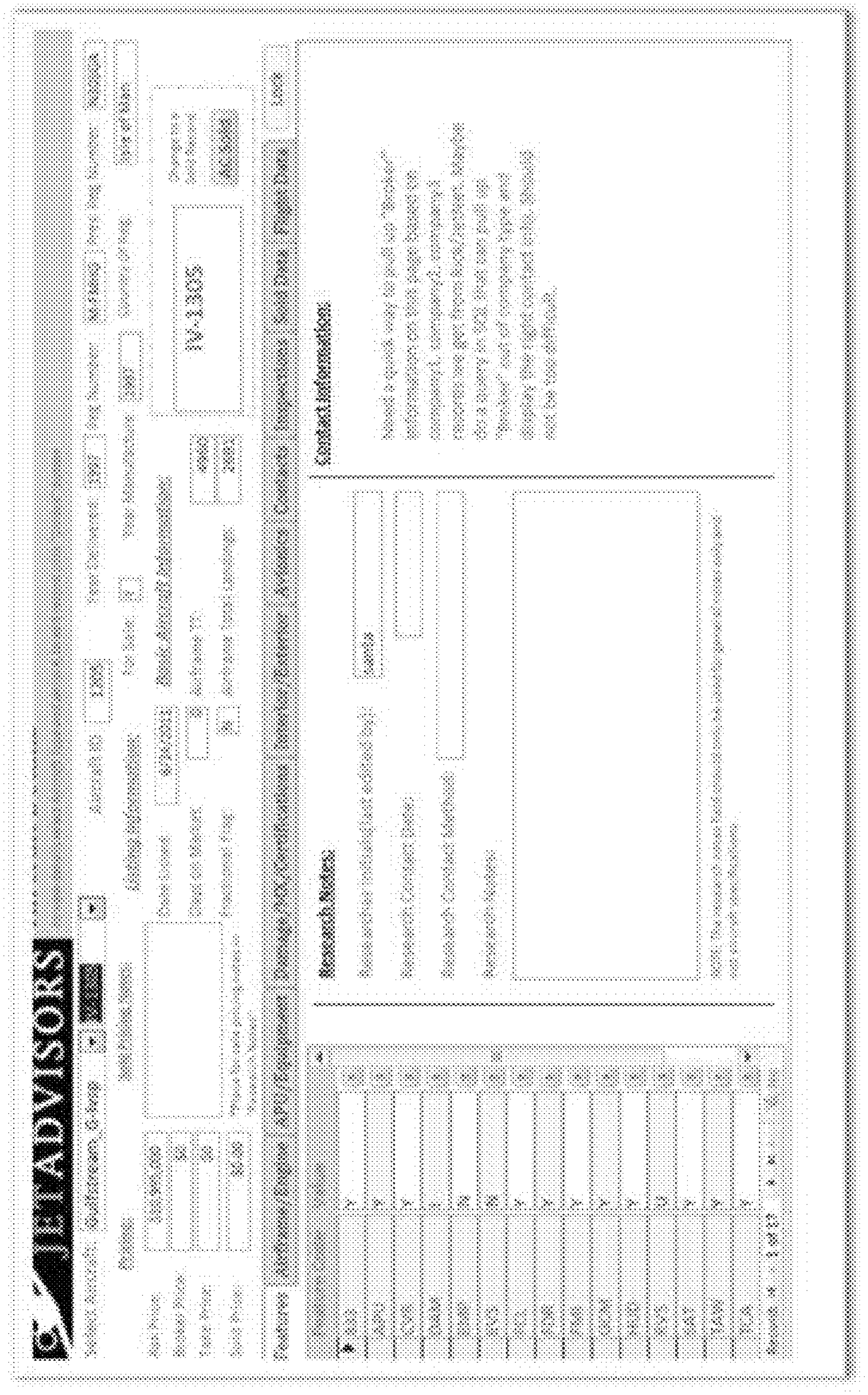

The "Aircraft Details Form" shown in FIG. 18 serves as both a view form and an update tool for the researcher. A simple "Lock" button is all that separates the user from the ability to just view records and the ability to change any field that they want. This form is linked directly from the Aircraft Dashboard based on the "Details" button and opens up a different aircraft serial number any time it is chosen under the current market tab or the sales/historical transactions tab. All data comes directly from the system database, and for the example is updated through Microsoft Access only. The main purpose of this form is to provide much better information and a synopsis of the aircraft than is currently available through various services.

Figure 19:
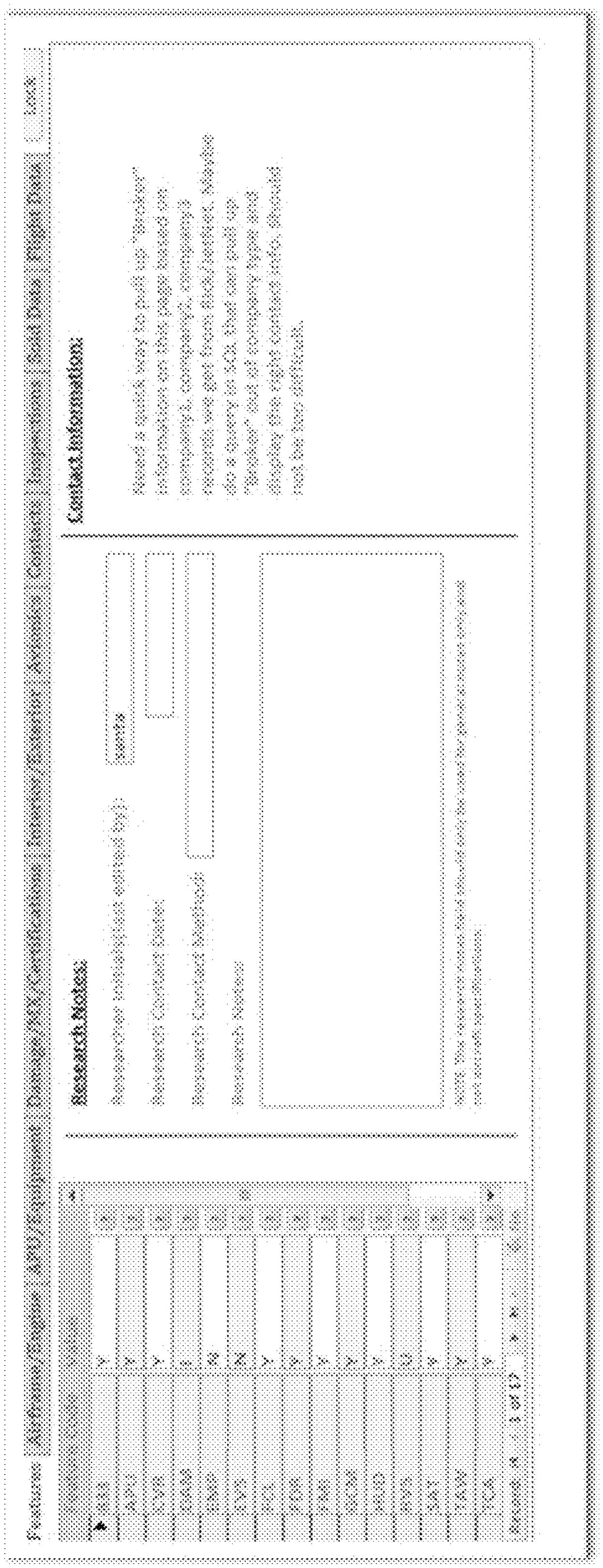

Just like many other forms in the example system, the "Aircraft Details" form is designed using different tabs, due to the shear amount of data fields present for each individual aircraft. For the example system, there are over 150 aircraft fields as well as another 150 feature code fields, which make displaying the data a challenge. The majority of these fields come directly from the MTD Export Tool, with some added internally to better break up the data and includes data fields that may be desired or necessary. The breakdown as well as a description and a diagram of each tab is listed below in consecutive order:

The features tab shown in the screen shot of FIG. 19 shows the feature codes for each particular aircraft with the ability to hit the "?" button which will pop-up a simple definition of each 3 letter code. Most feature codes are either Y or N and are used for statistical analysis. Only aircraft that have been for sale have feature codes, unless researchers manually input the feature codes.

The research notes section is a feature of this form that allows the researcher or the salesman to keep a track of latest changes, contact methods and other simple notes in one, easy to go place. The research notes require the user to fill in his/her initials when making any changes to the record in addition to supplying the contact date, contact method and any notes that are pertinent to the phone conversation or the email. The contact information on the far right will display the "Broker" information (if available), which will be extracted from the contacts tab for easy view.

Figure 20:
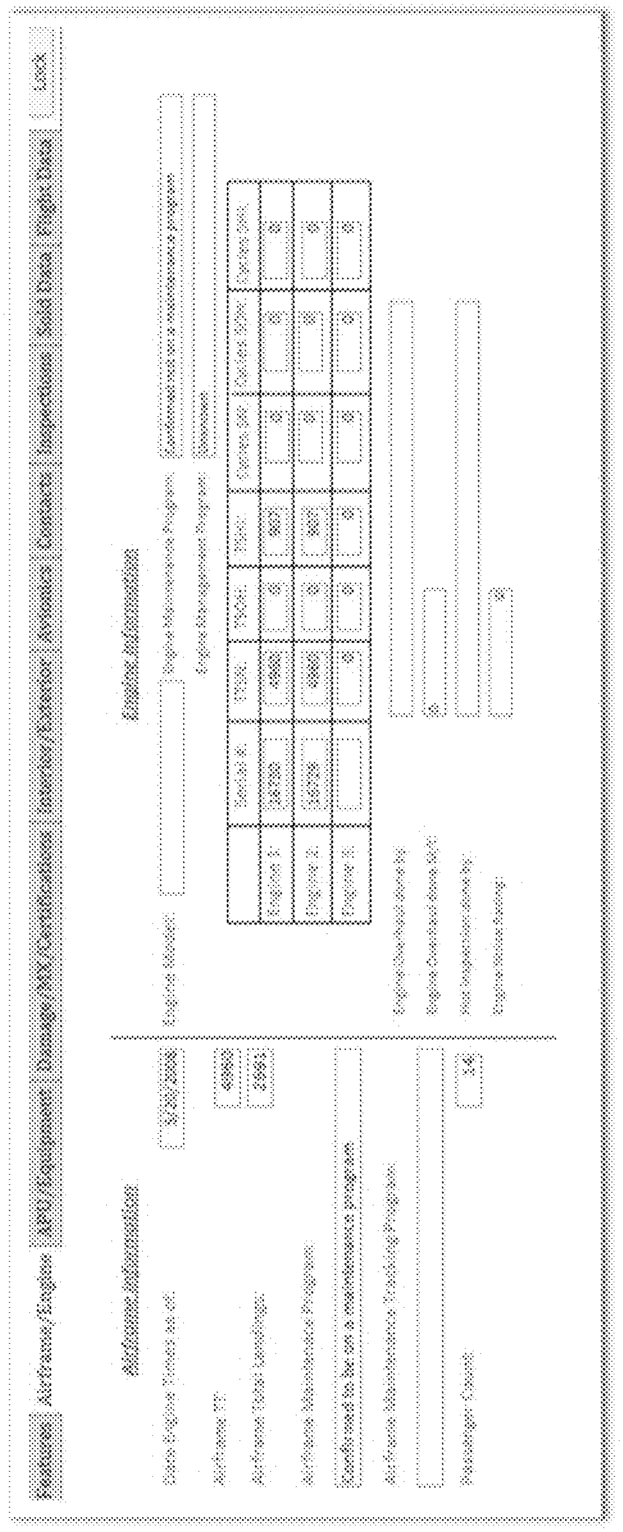

The airframe/engine tab of the aircraft details form, shown in the screen shot of FIG. 20, displays all the fields that are related to airframe and engine information. Here there are fields for airframe time, cycles, engine programs and etc. These fields are all editable and are stored in the aircraft table on the server. Whenever a record gets updated, the changes are saved.

Figure 21:
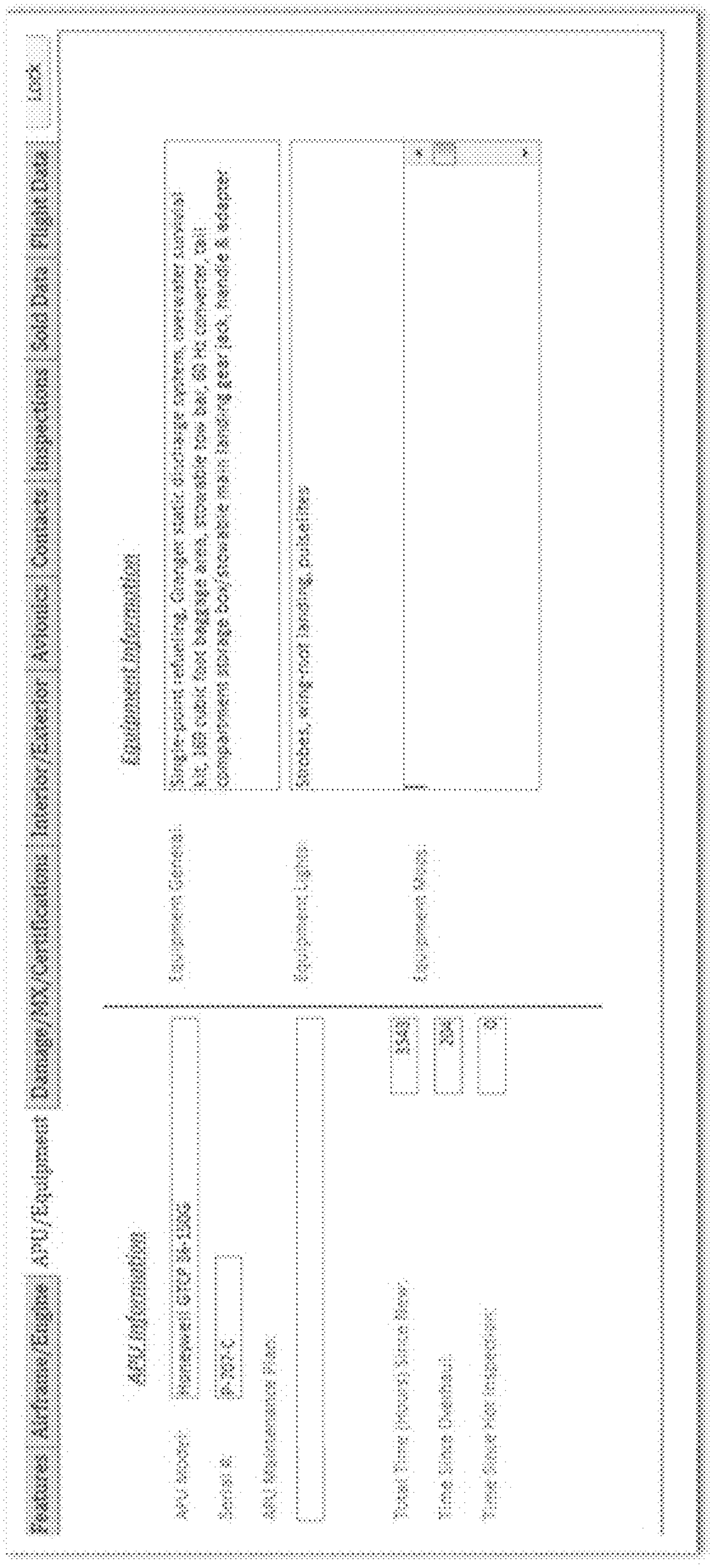

The APU/equipment tab, shown in the screen shot of FIG. 21, shows the tab that contains information on APU model, an APU maintenance plan as well as any special equipment information that pertains to each aircraft. All fields are stored in the aircraft table.

Figure 22:
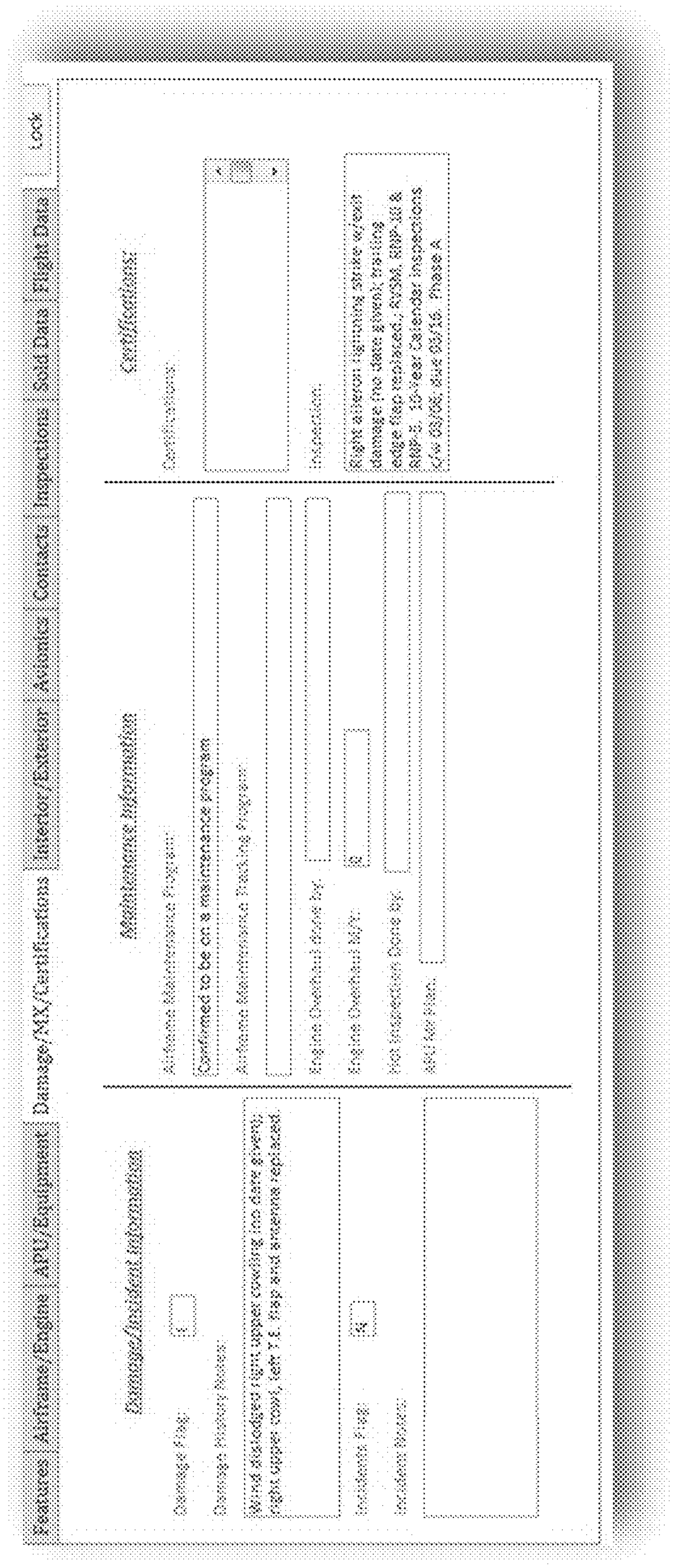

The damage, maintenance and certifications tab, shown in the screen shot of FIG. 22, contains fields that relate to damage and incident information as well as airframe and engine maintenance programs. In addition to that, a section on the far right has certifications and inspections as memo fields. All fields are stored in the aircraft table.

Figure 23:
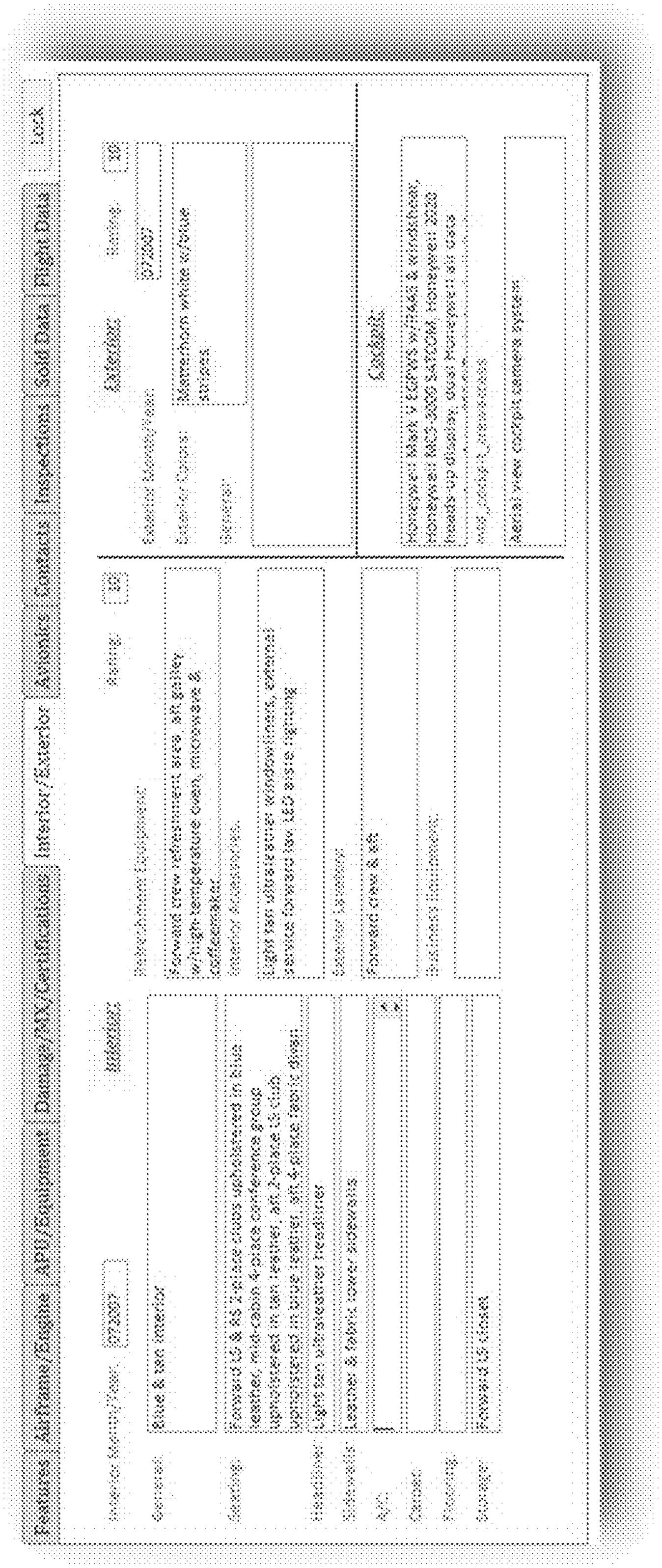

The interior and exterior tab, shown in the screen shot of FIG. 23, serves as a place for all information relating to the paint and interior of the aircraft. Most fields here are memo fields, as they store descriptions of the interior such as colors and seating arrangements. In the bottom right corner is also a small section that is devoted to the cockpit. It contains cockpit amenities and accessories. All fields are stored in the aircraft table.

Figure 24:
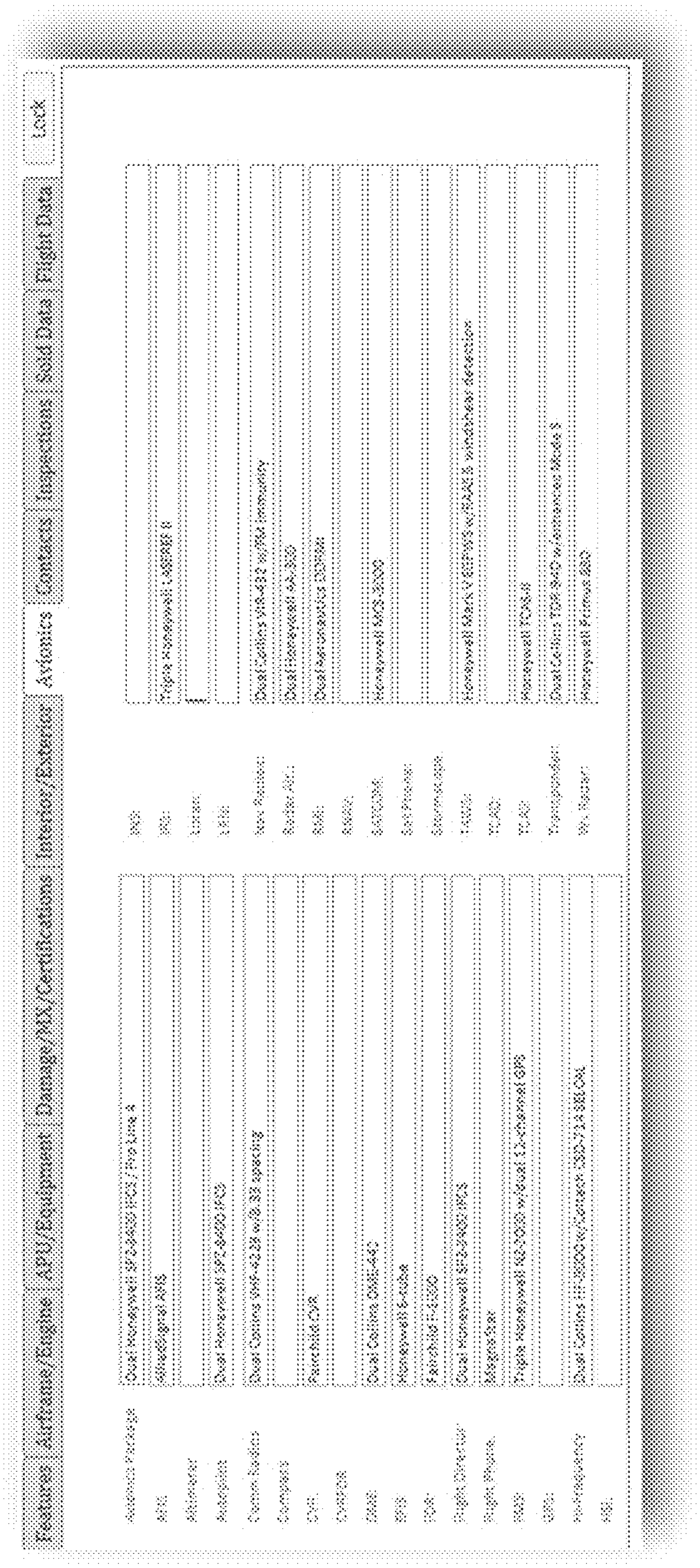

The avionics tab, shown in the screen shot of FIG. 24, contains all information and fields relating to the avionics and instrumentation package for the particular aircraft. All information is manually entered from specification sheets (detailed listings of the aircraft characteristics) by the researchers and is stored in the system in the aircraft table.

Figure 25:
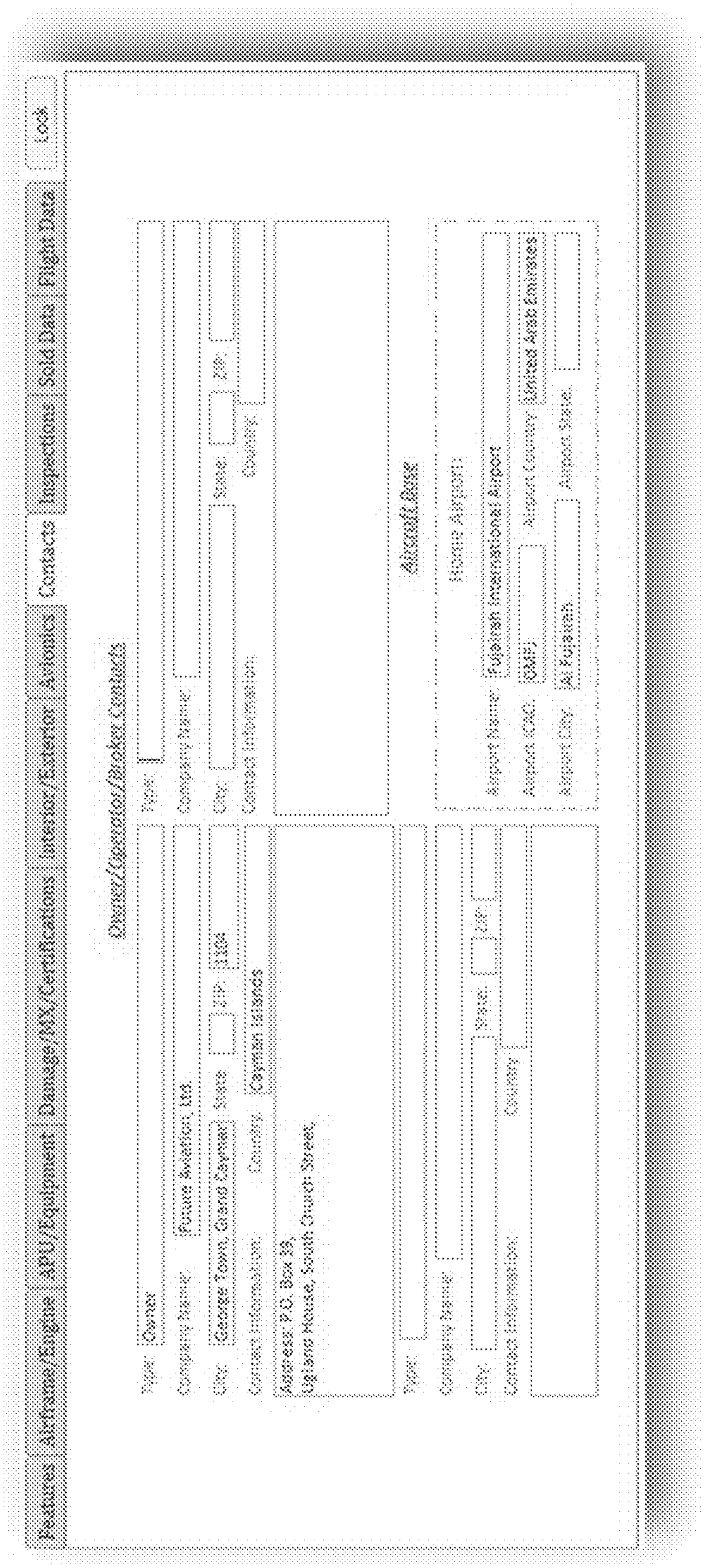

The contacts tab, shown in the screen shot of FIG. 25, contains fields that relate to owners, operators and brokers of each aircraft. All data is taken directly from a subscription service such as JetNet through the MTD Export, and is almost never updated. The contact information memo field can also be split into several other fields in order to better display this in the interface. Currently it is delivered in a paragraph "memo" form.

Figure 26:
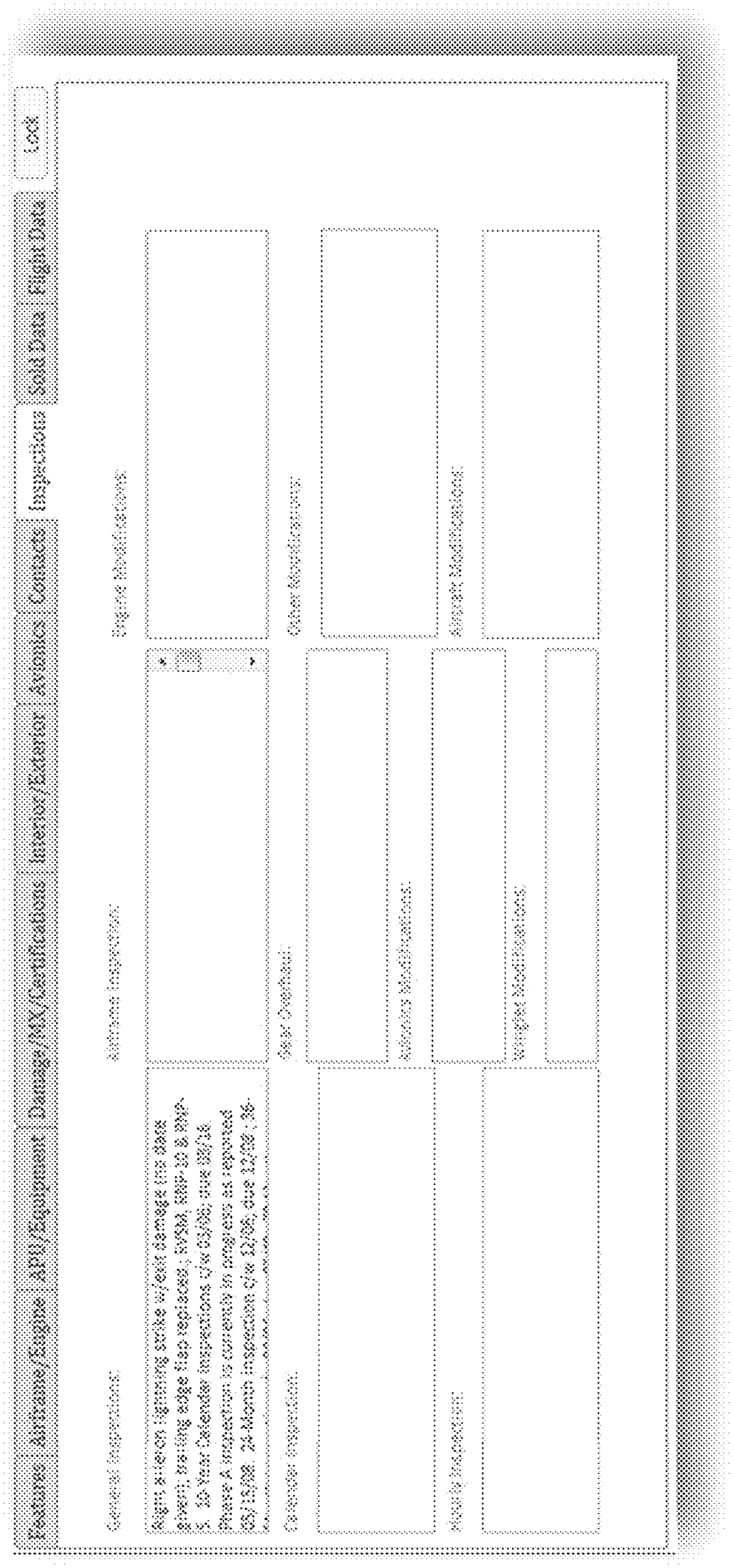

The inspections tab, shown in the screen shot of FIG. 26, displays a JetNet "General Inspections" field and also several other internal fields such as calendar inspection, hourly inspection, airframe inspection and etc. These fields will be filled out by researchers from maintenance reports and any information gathered through research of particular aircraft. All this data is stored in the aircraft table.

Figure 27:
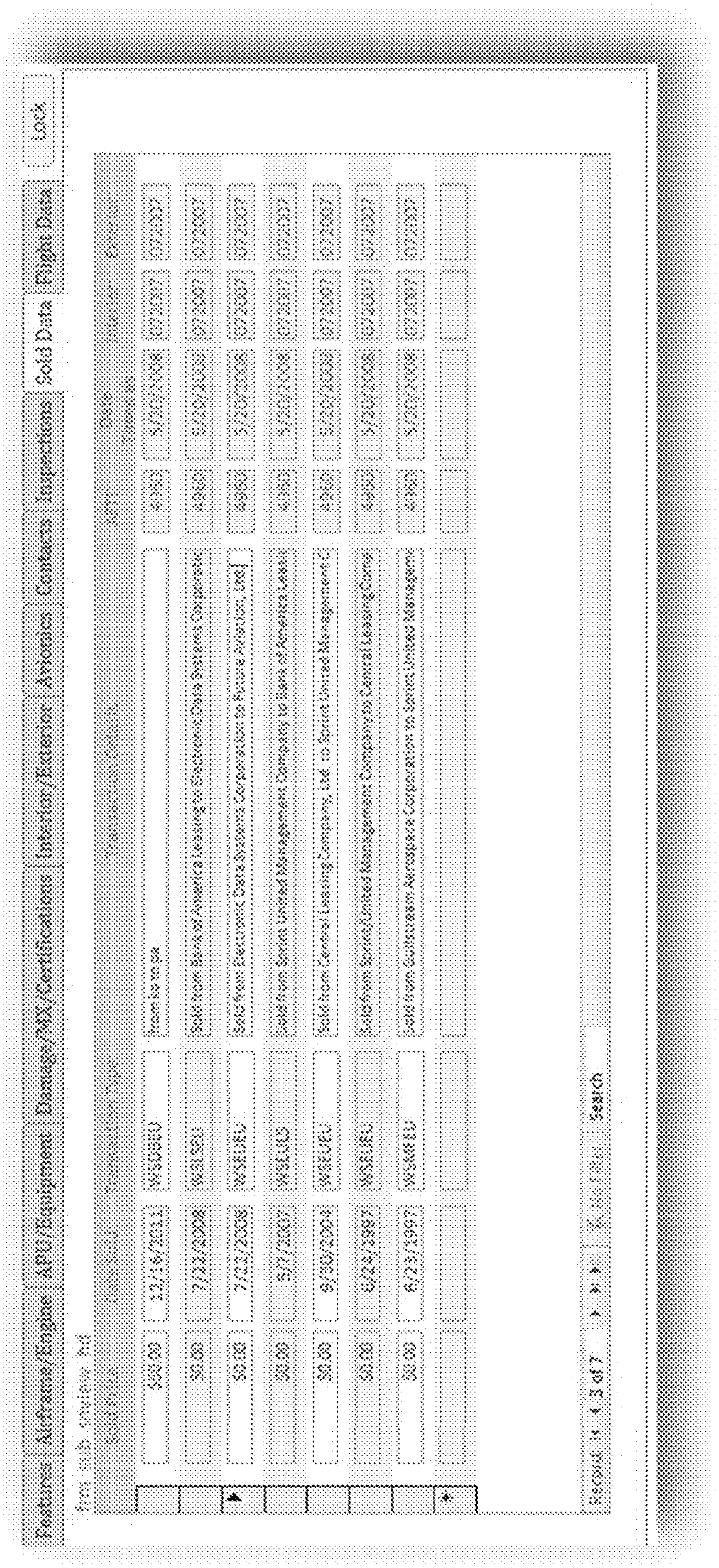

The sold data tab, shown in the screen shot of FIG. 27, serves as a history of sales transactions unique to that specific aircraft. Anytime a transaction occurs with that specific aircraft, it will be seen here in the history in chronological order. The record itself will also preserve historic details from when the transaction record was first created (such as airframe time, interior & exterior notes and etc.). This will allow for retroactive appraisals and research.

Figure 28:
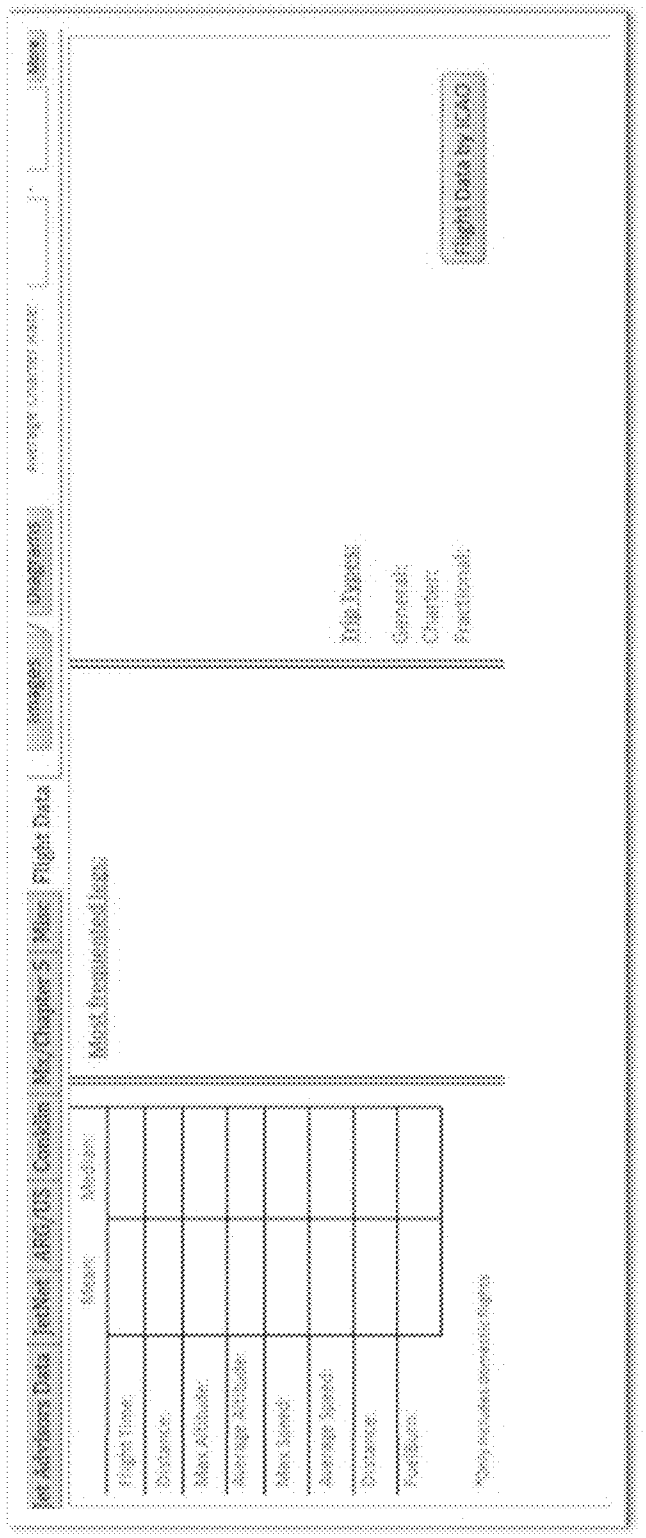

The final tab, the "Flight Data" tab shown in the screen shot of FIG. 28, displays all flights in the system provided by a particular subscription, in this case the ARG/US subscription (or another competing supplier of historical flight data). The data will be displayed in a reverse chronological order and will feature all flights going back to a certain date, such as 2007, if available, for the specific aircraft selected. This information will come directly from the server and will feed into Access using a subform. This information will be used to document and rank the usage of aircraft historically out of challenging airports. This novel use of the FAA data allows for definitive information about how the aircraft are actually used in the real world.

"Flight Data", which can be formatted as shown in the screen shot of FIG. 28, is delivered to the system servers via a subscription, such as an ARG/US subscription from TRAQPak (or another competing supplier of historical flight data). This data comes from the Federal Aviation Administration and is sorted and simplified by the subscription service, which reduces the user's time when it comes to sorting the data properly. The data is stored on the SQL server in several tables separated by years (2007-2011) and contains over 18 million flight records for business aircraft and turboprop aircraft within the United States. The data itself arrives in a .csv (comma delimited) format and is uploaded into the server by a programmer or an analyst.

Figure 29:
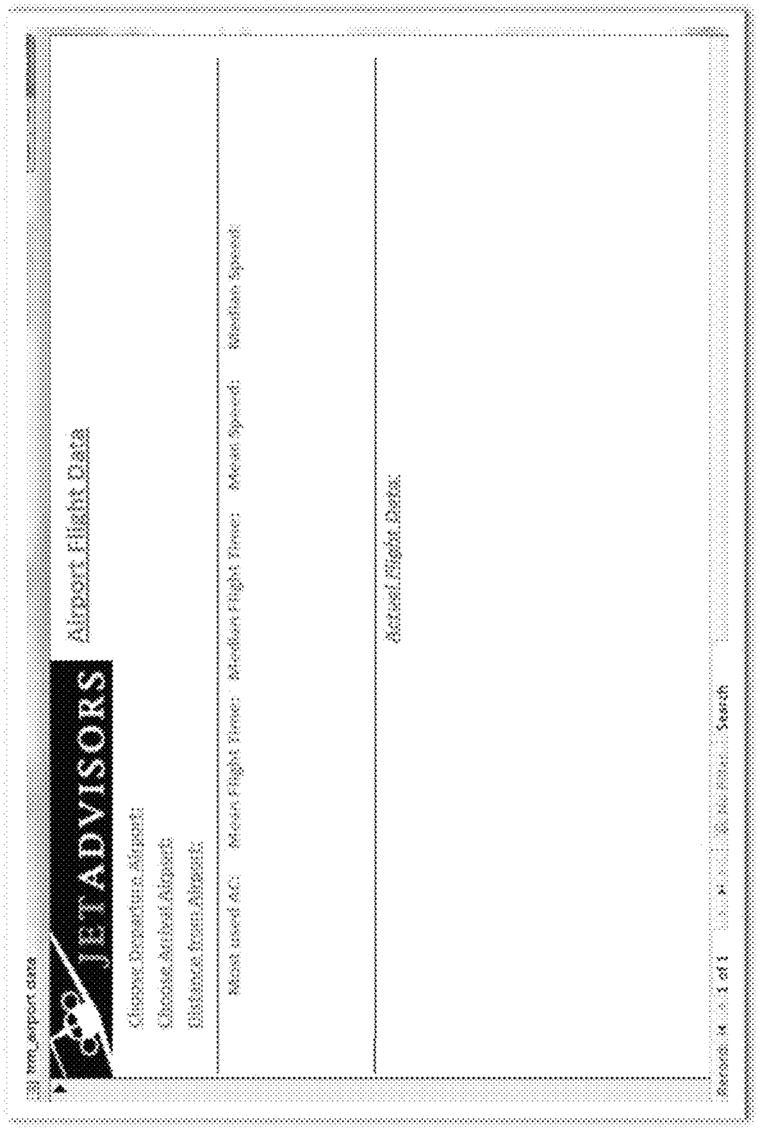

As displayed in the screen shot of FIG. 29, the flight data tab of the Aircraft Dashboard will serve as a summary of flights by specific aircraft type. The mean and the median of many variables are provided as well as providing a trip summary for each specific aircraft type. A trip summary from different airports selected by the user can also be made available.

The airport flight data form will serve as a statistical summary tool for each specific airport selected by the user. The user will be able to choose a departure and an arrival destination together with a distance from the specific airport which will include surrounding airports into the mix (For example: NYC area—i.e. TEB, LGA, JFK). This will all be possible by using a SQL script that will calculate the radius around each specific airport based on its coordinates and come up with a list of surrounding airports. The selections chosen in the first 3 dropdowns will populate the form displaying the actual flights legs as well as summary of trends such as the most used aircraft types, mean and median flight time and speed.

Figure 30:
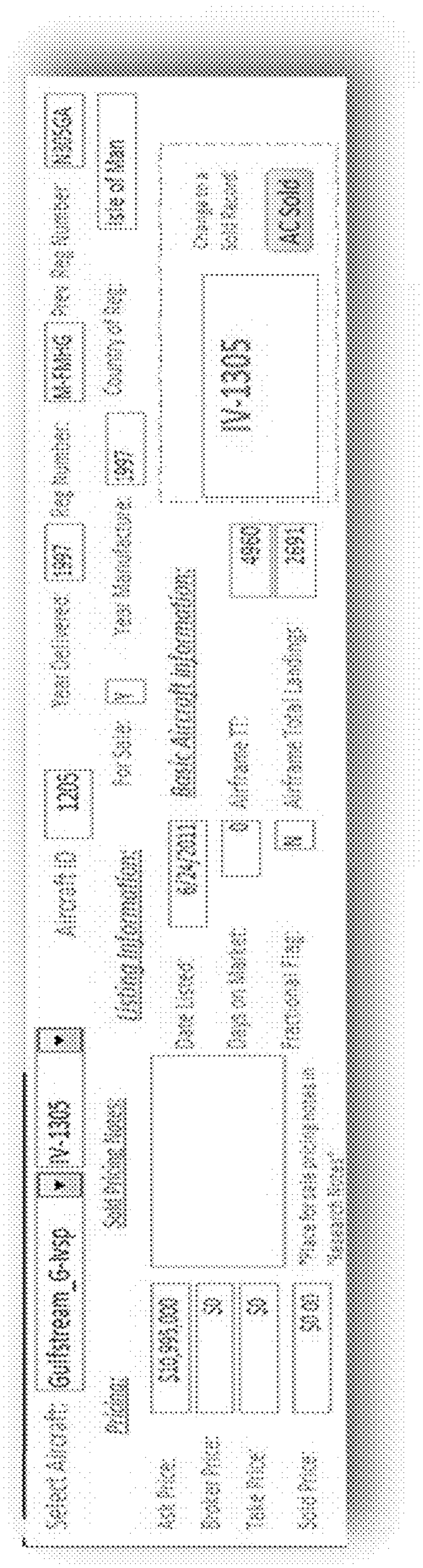

Finally, the top of the aircraft details form that never changes is the most important information that relates to the specific aircraft. This includes the serial number, pricing, year of manufacture and delivery as well as its registration number and airframe total time. This information should always be checked for accuracy and updated as often as possible. The diagram shown in the screen shot of FIG. 30 shows what that section of the form looks like. Pricing is on the far left right next to the drop down menu for the specific aircraft type and the serial number as well as a "Sold Price Notes" field. Listing information as well as basic aircraft info such as AFTT (airframe total time) is displayed in the center along with an enlarged serial number section.

Figure 31:
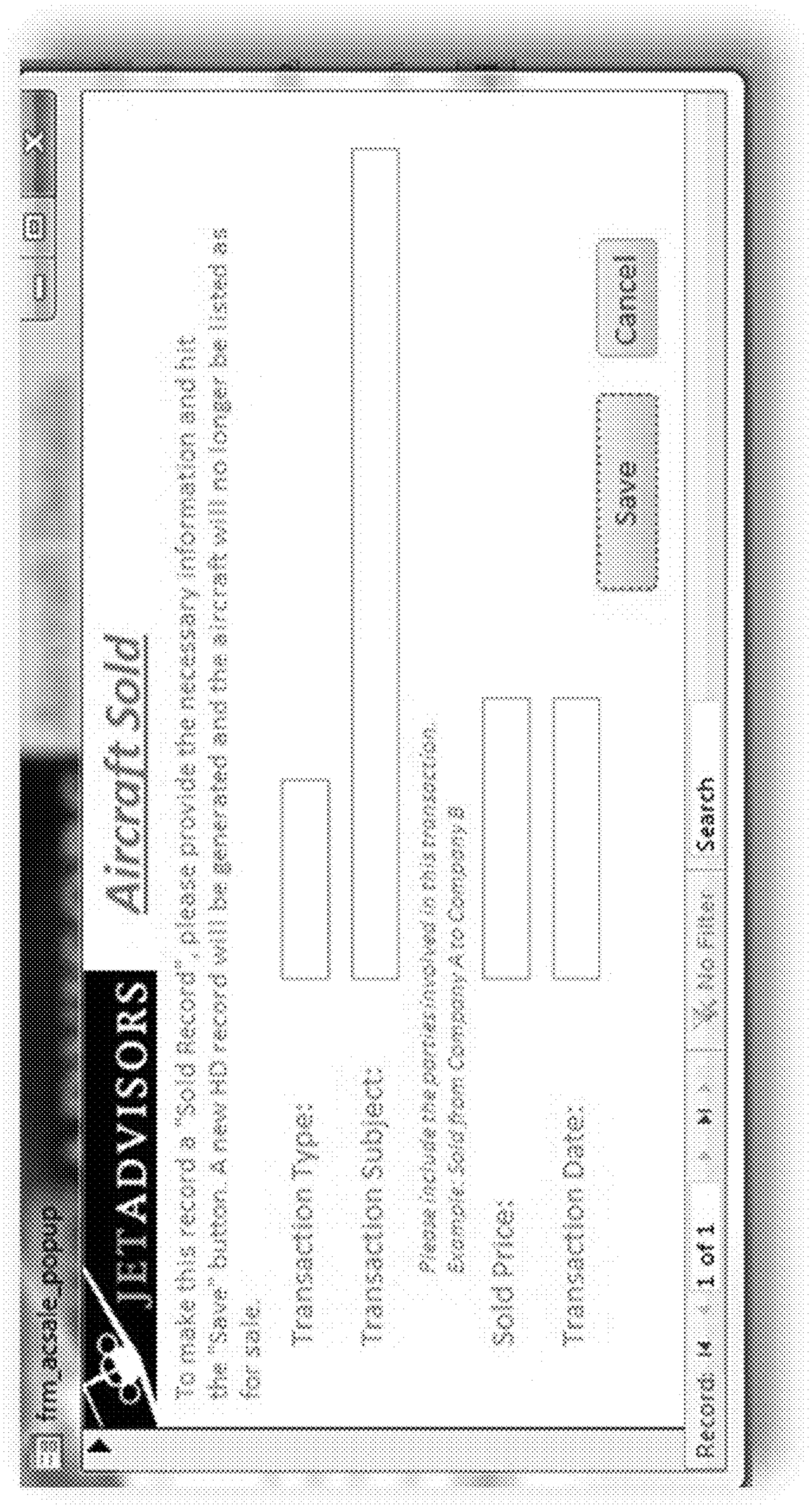

With the sold button at the top of form, the user is also able to create a "sold record" for the specific aircraft type, as shown in the example of FIG. 31. When the "AC Sold" button is depressed the user can go ahead and create that sold record that popups in a new window. This window allows the researcher to enter the transaction type (which will eventually become a drop down box), a transaction subject (who the aircraft was sold to/from) and also the sold price and the transaction date. Hitting the "Save" button will create the new record, and hitting the cancel button will exit the window without saving any changes.

Figure 32:
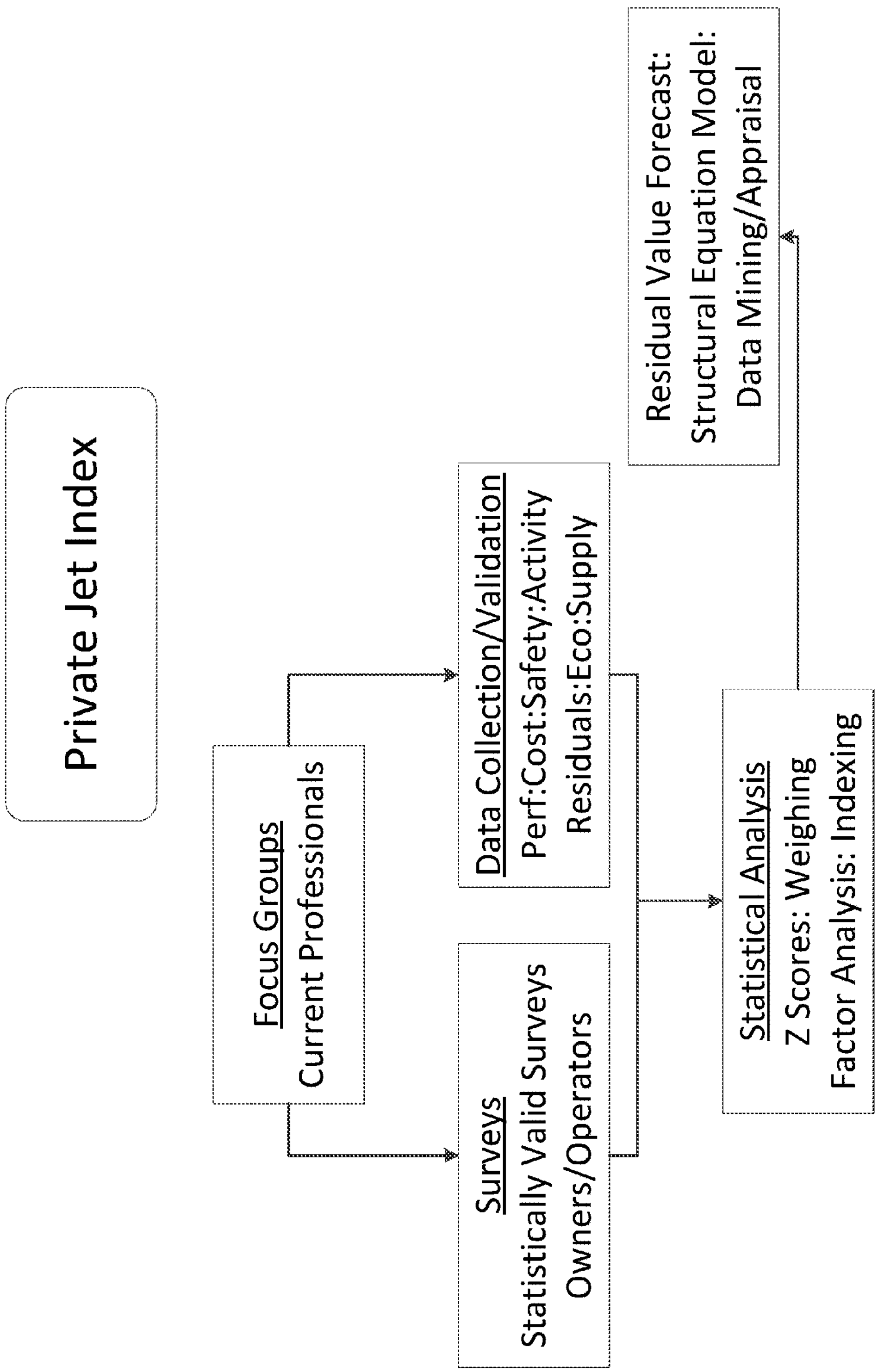
FIG. 32 shows a block diagram of a system model of the example embodiment.
Figure 33:
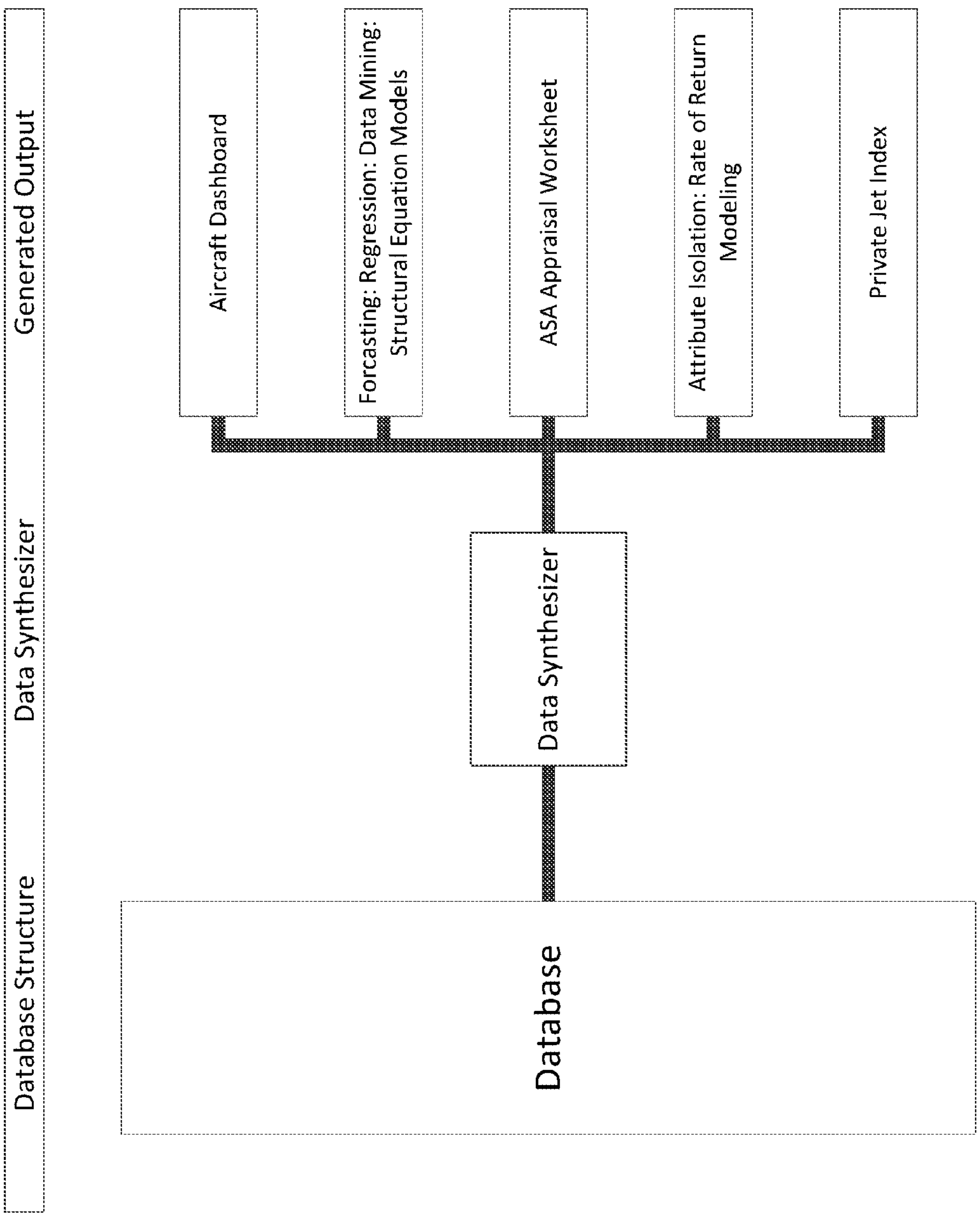
FIG. 33 shows a representation of a systematic analysis software program for implementing the example system model of FIG. 32.

Finally, the system model of FIG. 32 implements the process shown in FIG. 33 which provides a representation of a systematic analysis software program that incorporates all salient data relating to private jet aircraft (such as performance, actual deployment history, operating costs, safety record, residual value retained, owner satisfaction, future demand estimates, world supply & demand, sales transaction history, current market data, and economic indicators) to create a competitive index and forecast future values. FIG. 34 shows an example flow chart showing an example flow of data and processing for the example embodiment, called by at least one implementer the "private jet index" (PJI). This "index" will be maintained by aircraft and market researchers that consistently feed market data into the index for dynamic analysis. The appraisers will use the index to perform appraisals for current and retroactive valuation reports. The index will employ select statistical analyses to position private jet aircraft competitively and rank their attributes and forecast their future values. The index will use statistical operations such as mean, median, standard deviation, weighting, factor analysis, path analysis, regression, data mining, text mining, structural equation models and others to conduct the analysis and generate the outputs. The principal will use the index to provide past and forward looking reports for enterprise level clients interested in purchasing or building the best possible private jet aircraft.

Example Application Scenario

The following scenario us provided as a specific example of using the system and method of the example embodiment:

The client contracts with an organization implementing the system, Jet Advisors® (JA) to decide whether to buy an aircraft. If they decide to buy an aircraft JA would proceed through the methodology (the "private jet index" or "PJI") to identify which aircraft to compare and Ultimately the PJI will run calculations to identify the optimum aircraft to purchase based on the client needs, market data (past, present and forecasted) aircraft performance, aircraft attributes, aircraft safety history and satisfaction surveys.

Client trips are inputted into tables to analyze their trips. The table below shows a typical flight analysis:

TABLE 1

Example Flight Analysis

| | | % | Total Hrs | % of hrs |
|---|---|---|---|---|
| Frequency Passenger Loads | | | | |
| 0-1 Pax | 336 | 36.6% | 713.02 | 33.5% |
| 2-4 Pax | 419 | 45.6% | 954.63 | 44.8% |
| 5-7 Pax | 122 | 13.3% | 339.62 | 15.9% |
| 8 or more Pax | 20 | 2.2% | 127.37 | 6.0% |
| Flight Time Frequencies | | | | |
| less than 1 hr | 60 | 6.5% | 33.37 | 1.6% |
| 1 hr-1.5 hr | 236 | 25.7% | 255.54 | 12.0% |
| 1.5 hrs-2 hrs | 63 | 6.9% | 106.63 | 5.0% |
| 2-2.5 hrs | 134 | 14.6% | 299.68 | 14.1% |
| 2.5-3 hrs | 252 | 27.4% | 668.93 | 31.4% |
| 3-4 hrs | 103 | 11.2% | 342.8 | 16.1% |
| 4-5 hrs | 48 | 5.2% | 210.18 | 9.9% |
| 5+ hrs | 33 | 3.6% | 214.11 | 10.0% |
| Day Of Week Departures | | | | |
| Sunday | 153 | 16.6% | 366.66 | 17.2% |
| Monday | 125 | 13.6% | 308.54 | 14.5% |
| Tuesday | 99 | 10.8% | 222.81 | 10.5% |
| Wednesday | 143 | 15.6% | 298.84 | 14.0% |
| Thursday | 172 | 18.7% | 376.21 | 17.7% |
| Friday | 137 | 14.9% | 292.77 | 13.7% |
| Saturday | 101 | 11.0% | 265.41 | 12.5% |
| Frequency of Trip Distances: | | | | |
| 0-200 miles | 95 | 10.3% | 94.47 | 4.4% |
| 201-399 miles | 176 | 19.2% | 185.25 | 8.7% |
| 400-699 miles | 53 | 5.8% | 80.62 | 3.8% |

TABLE 1-continued

Example Flight Analysis

| | | % | Total Hrs | % of hrs |
|---|---|---|---|---|
| 799-1199 miles | 447 | 48.6% | 1071.94 | 50.3% |
| 1200-1499 miles | 31 | 3.4% | 98.52 | 4.6% |
| 1500 miles & up | 119 | 12.9% | 548.54 | 25.7% |
| Flight Frequency/Aircraft Requested AC | | | | |
| G-550 | 11 | 1.3% | 48.3 | 2.3% |
| G-450 | 18 | 2.1% | 49 | 2.3% |
| DA-2000 | 162 | 18.6% | 427.6 | 20.1% |
| G-200 | 242 | 27.8% | 491.6 | 23.1% |
| G-IVSP | 71 | 8.2% | 0 | 0.0% |
| DA-2EASY | 20 | 2.3% | 49.3 | 2.3% |
| CE-750 | 181 | 20.8% | 411.8 | 19.3% |
| CE-560XL | 10 | 1.1% | 9.1 | 0.4% |
| BE-400A | 5 | 0.6% | 5.5 | 0.3% |
| GV | 5 | 0.6% | 20.5 | 1.0% |
| 800XPC/800XP | 9 | 1.0% | 11.5 | 0.5% |
| 800XP | 12 | 1.4% | 19.2 | 0.9% |
| CE-680 | 68 | 7.8% | 140.9 | 6.6% |
| CE-560XLS | 10 | 1.1% | 11.9 | 0.6% |

Figure 35:
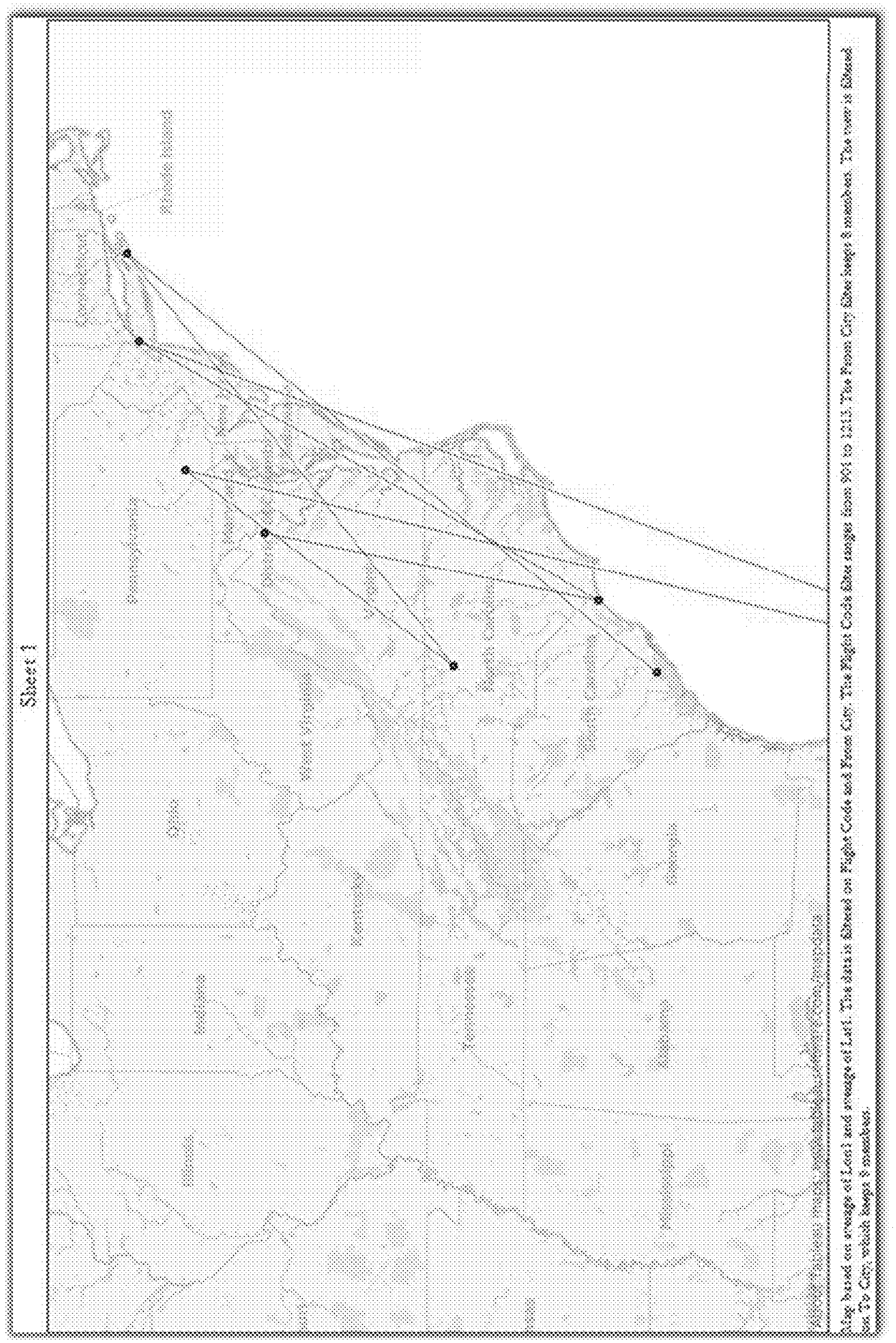
Figure 36:
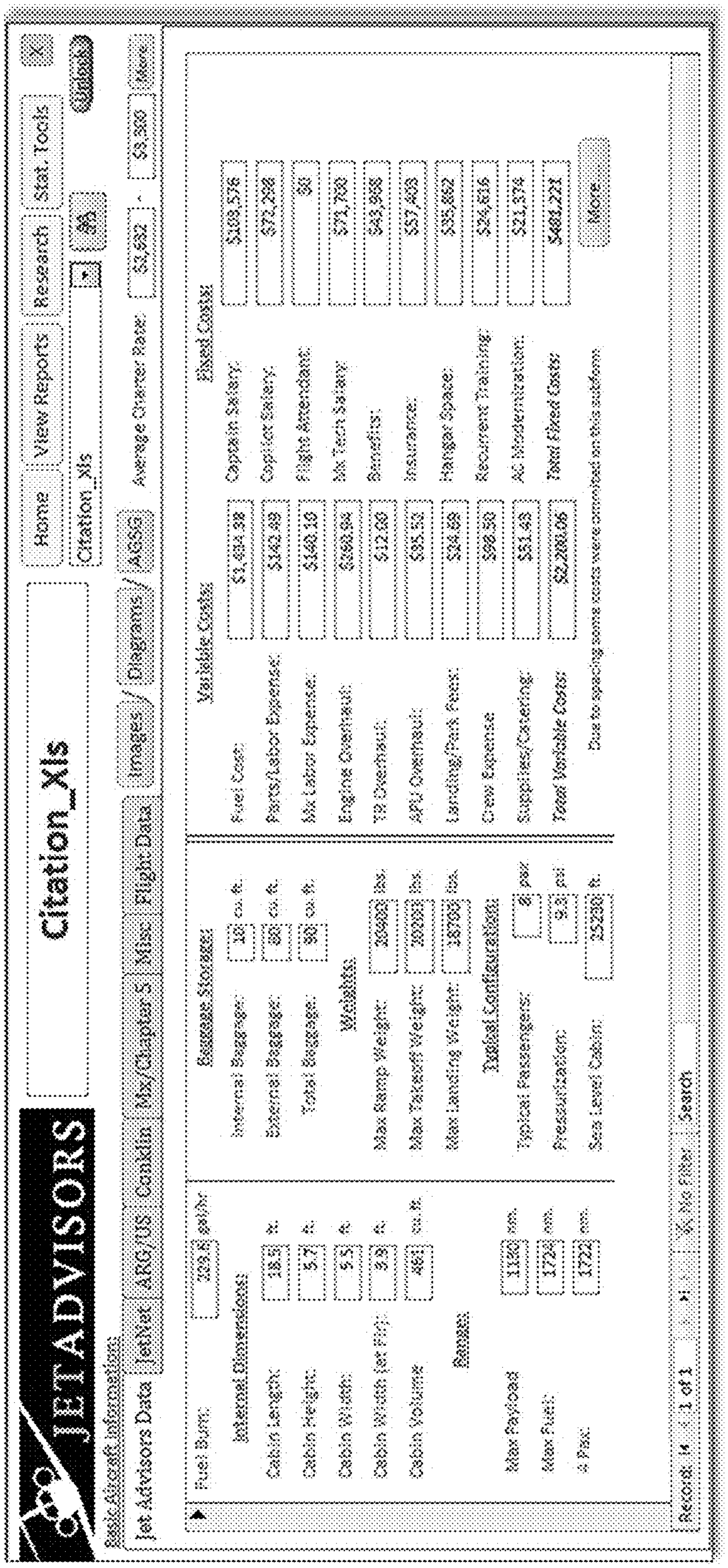
Figure 37:
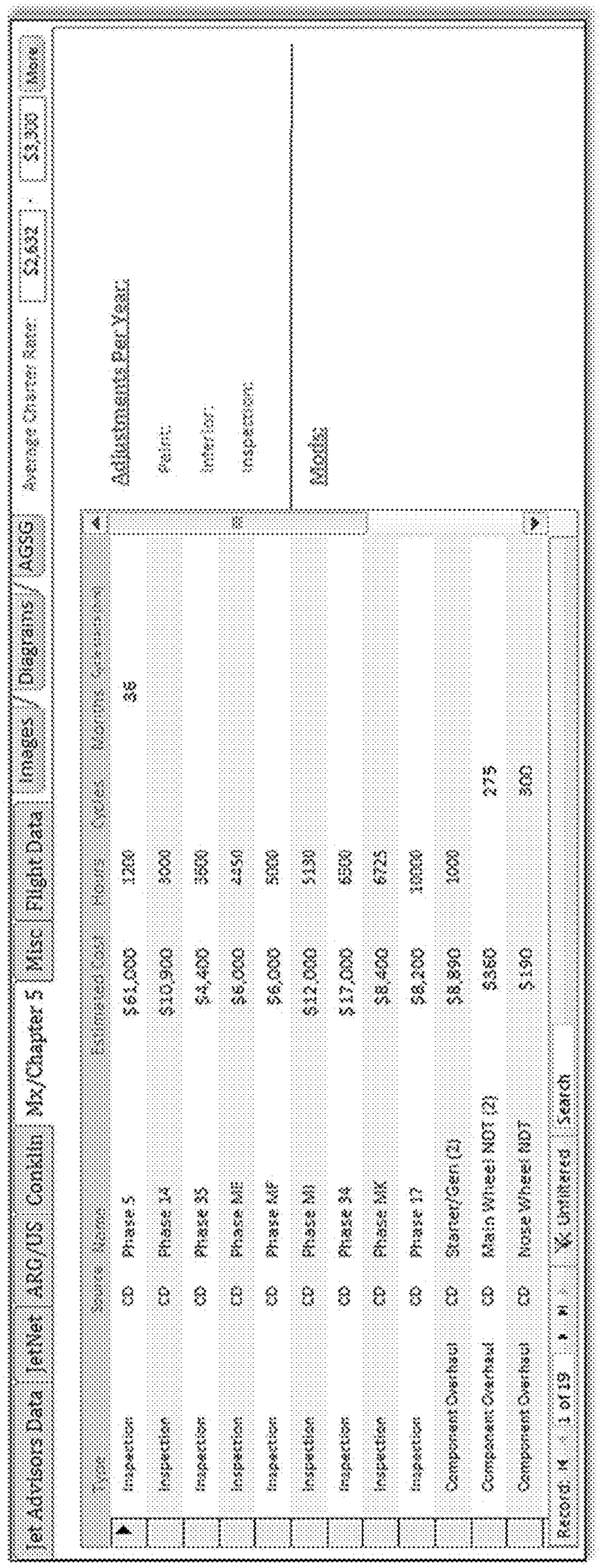
Figure 38:
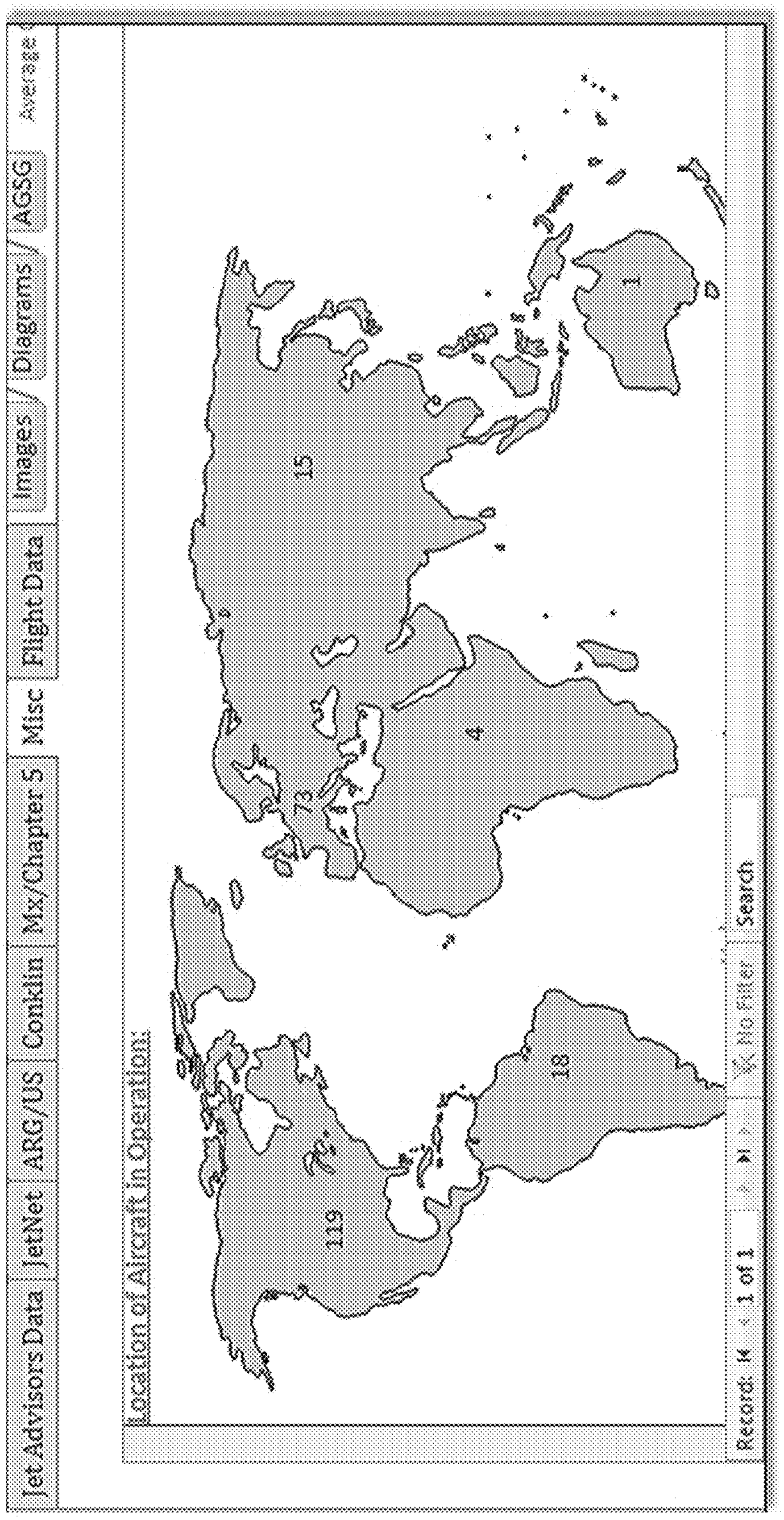
Figure 39:
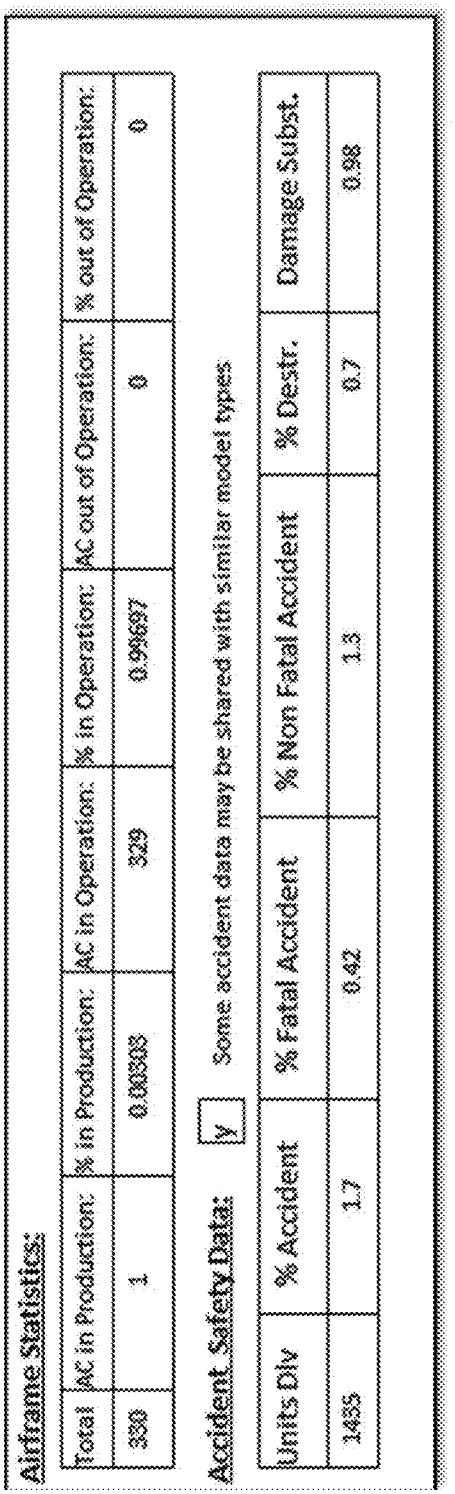
Figure 40:
Figure 41:
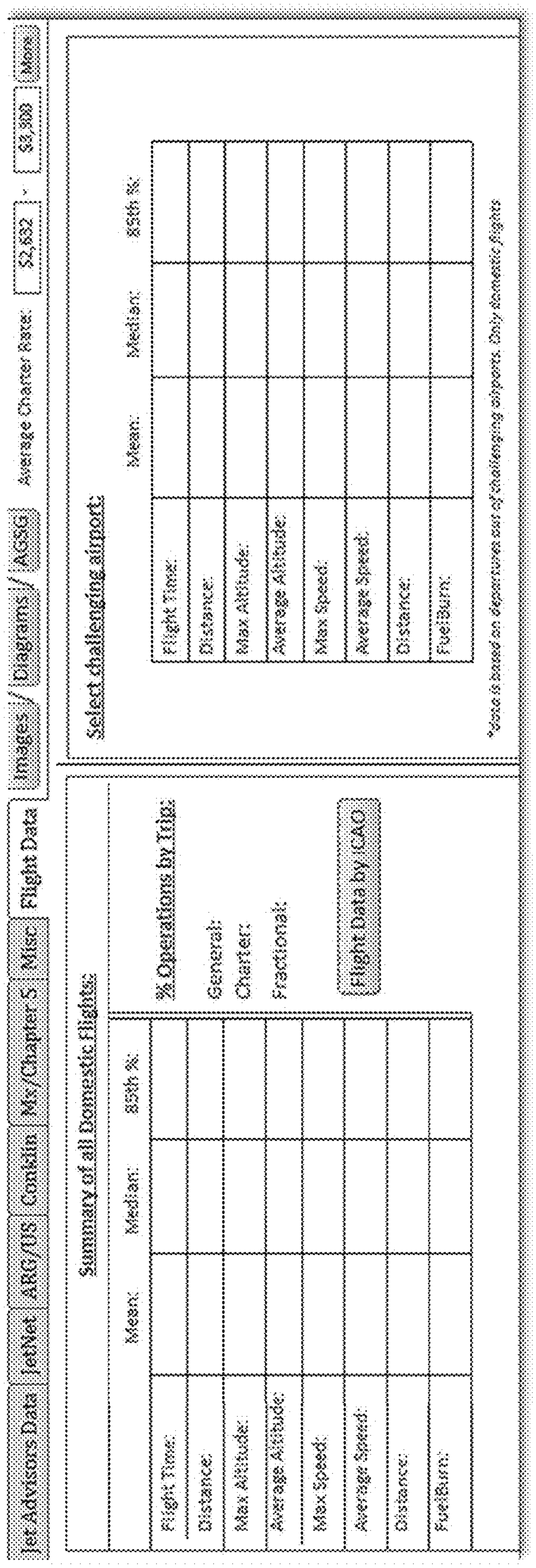
Figure 42:
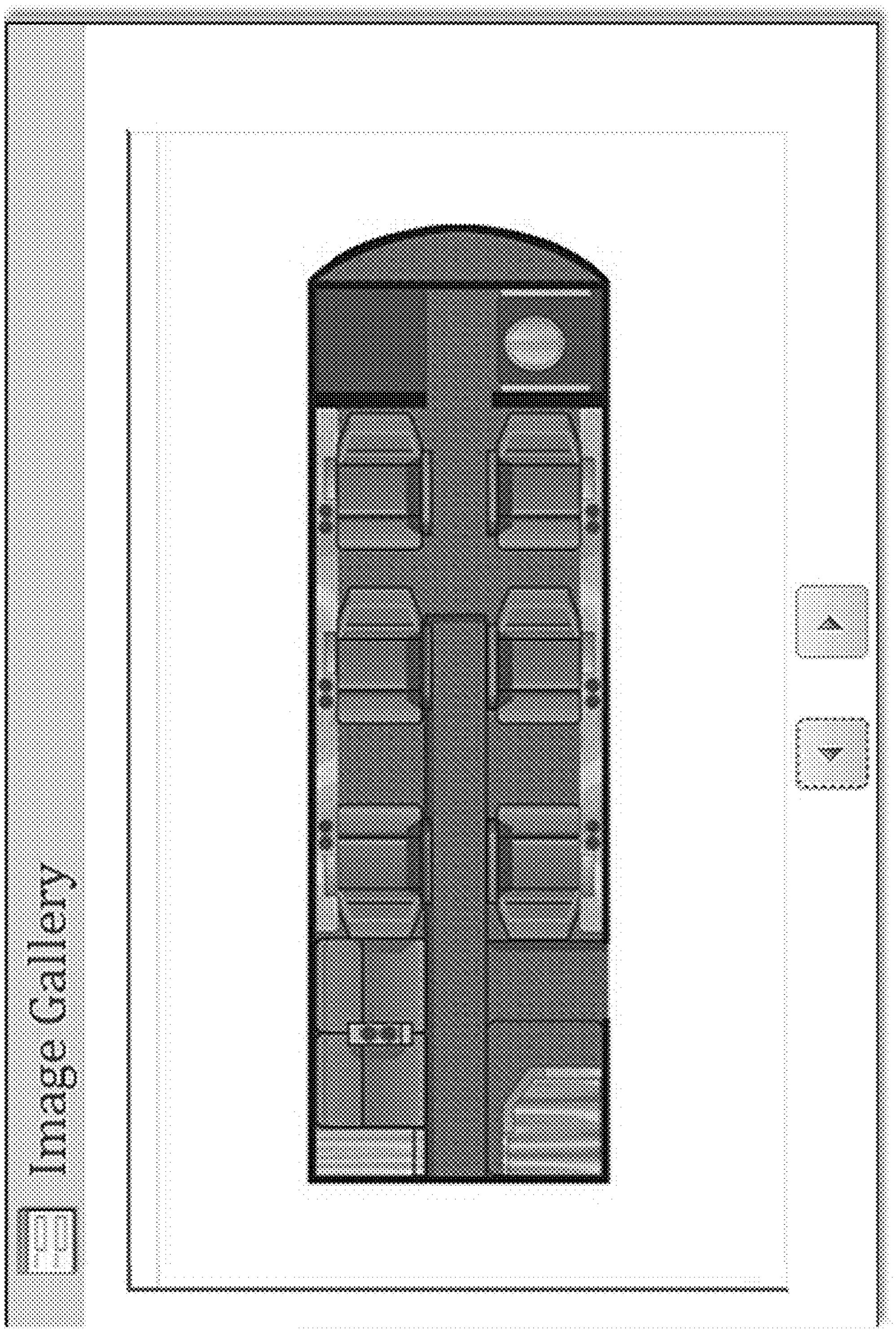
Figure 43:
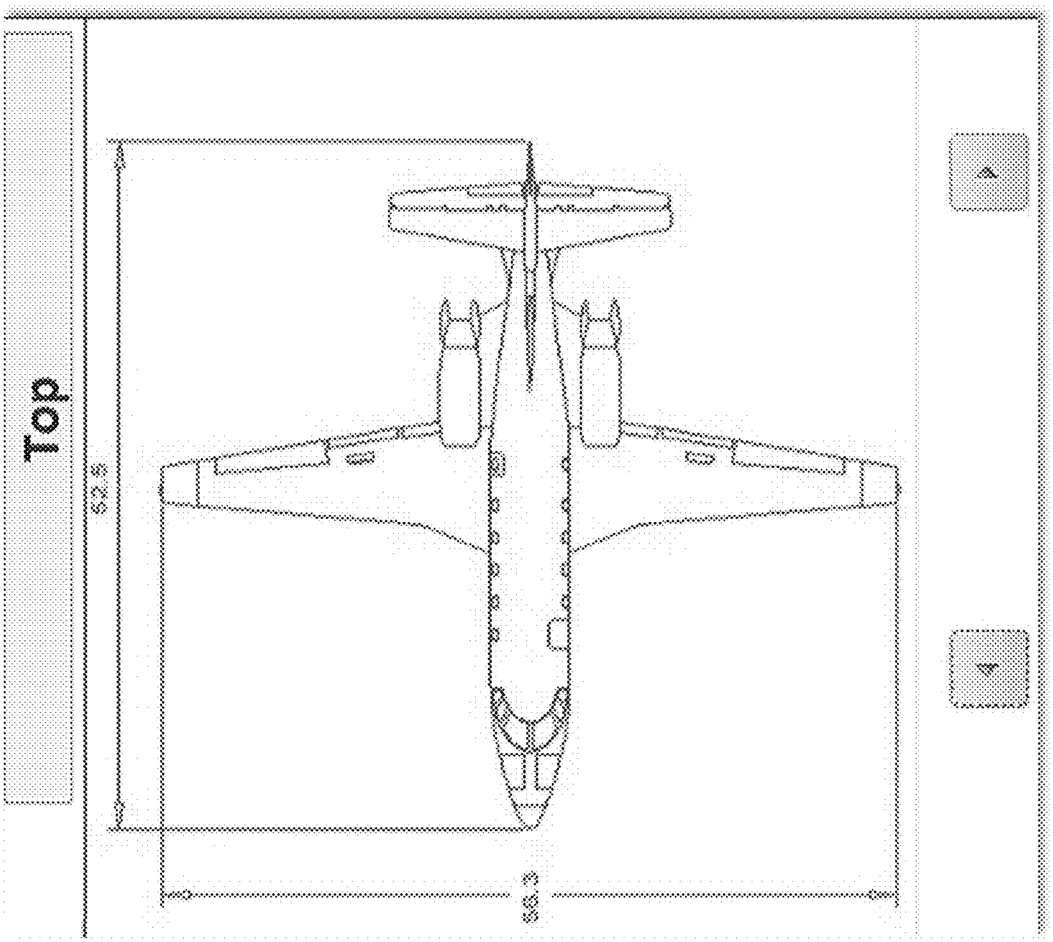
Figure 44:
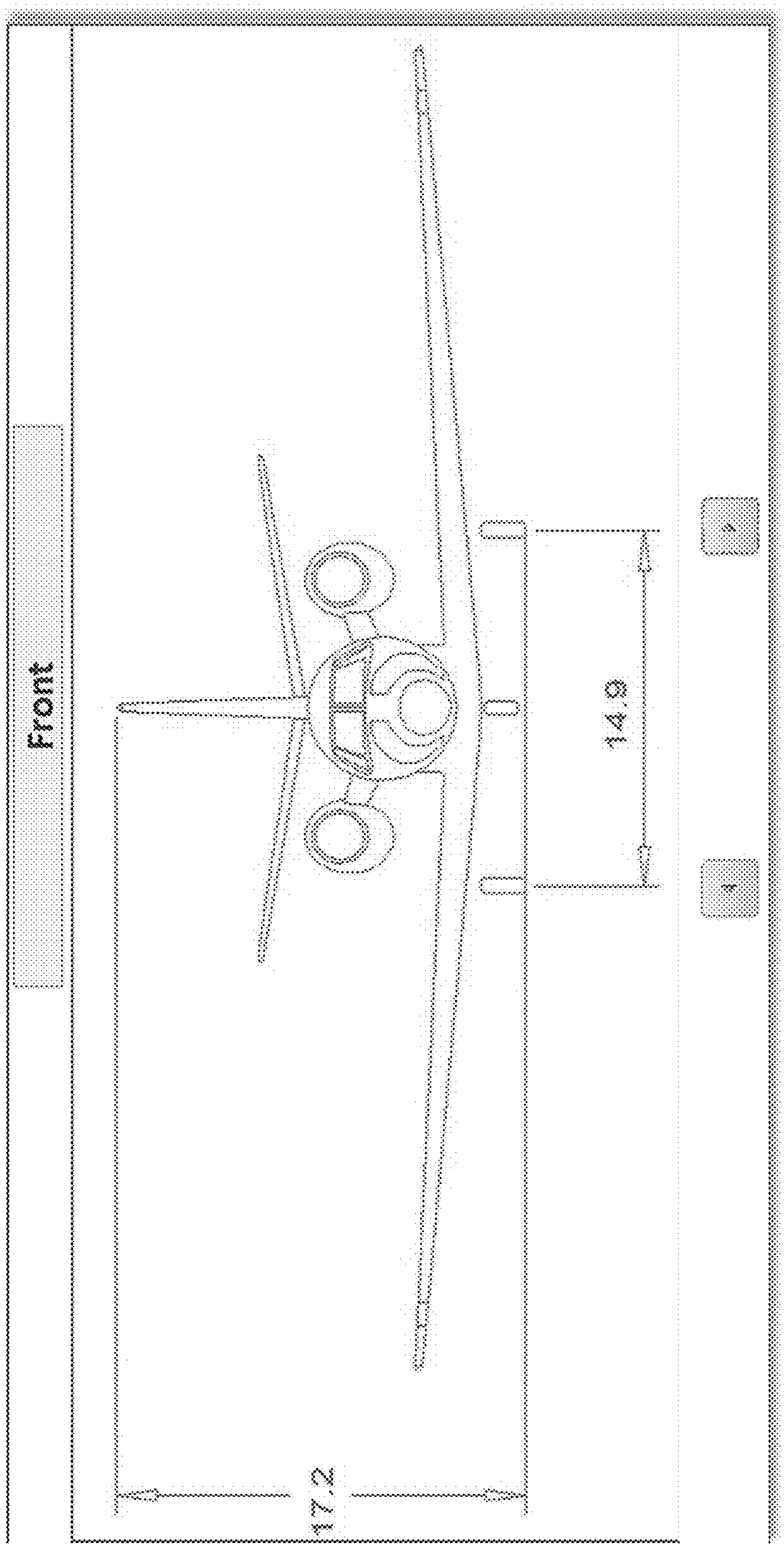
Figure 45:
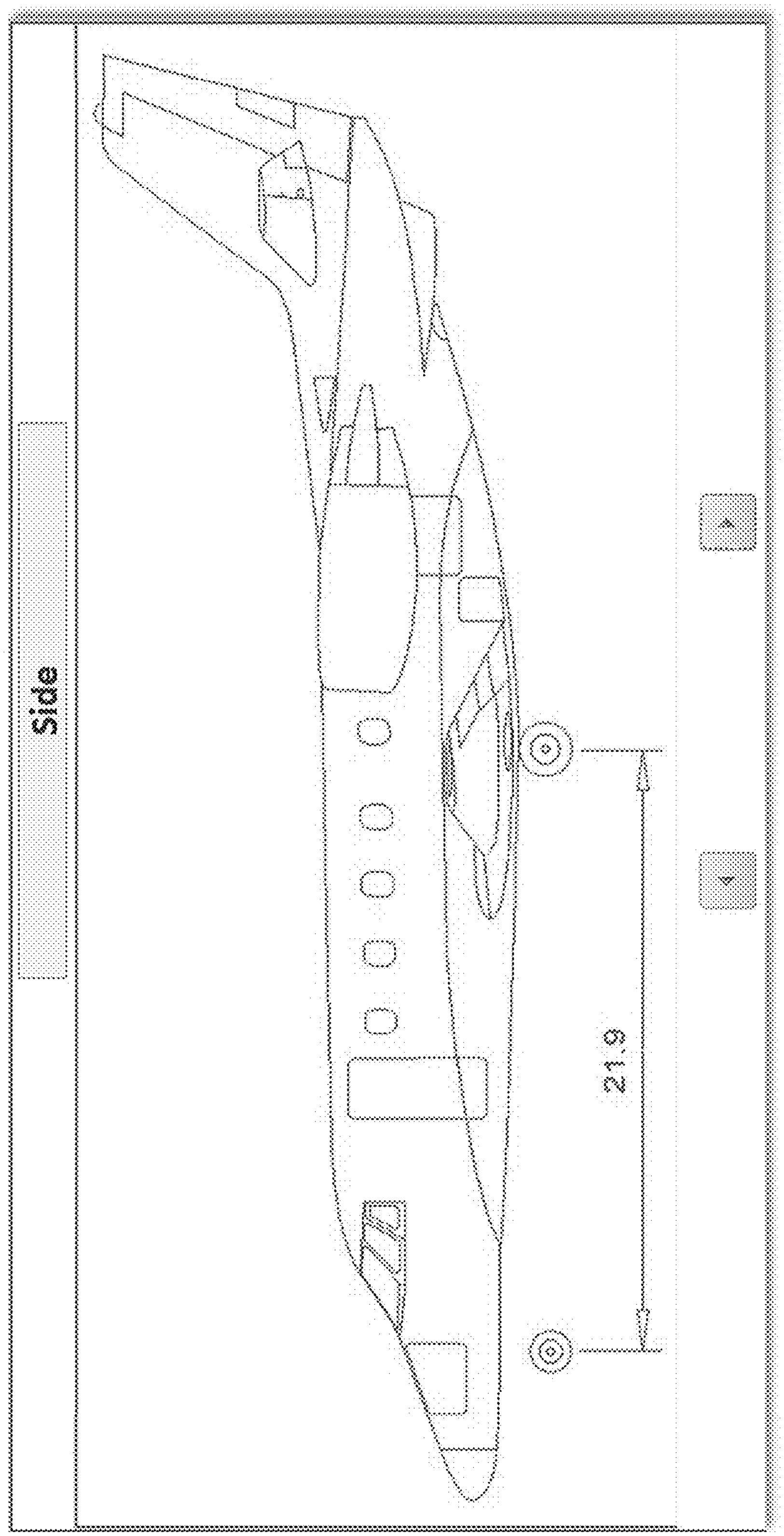
Figure 46:
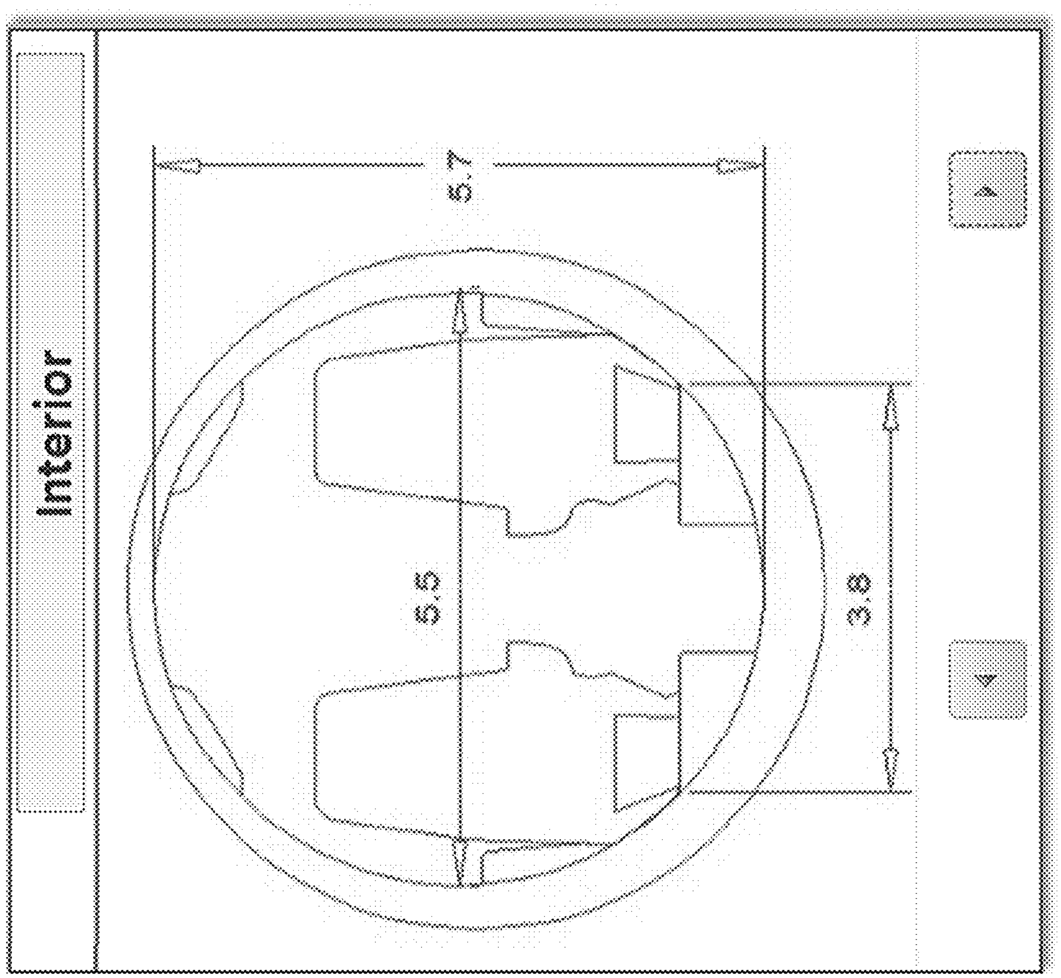
Figure 47:
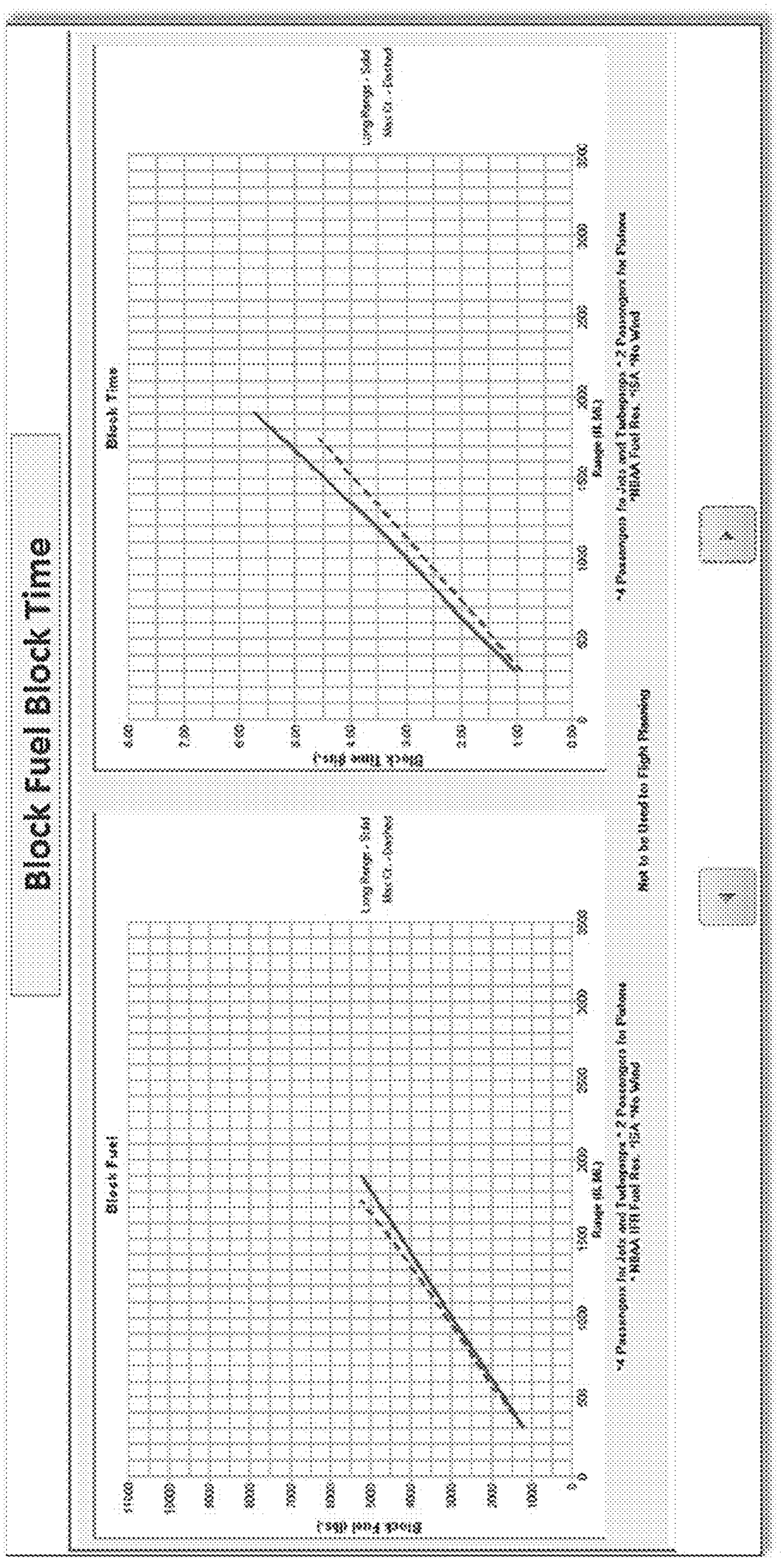
Figure 48:
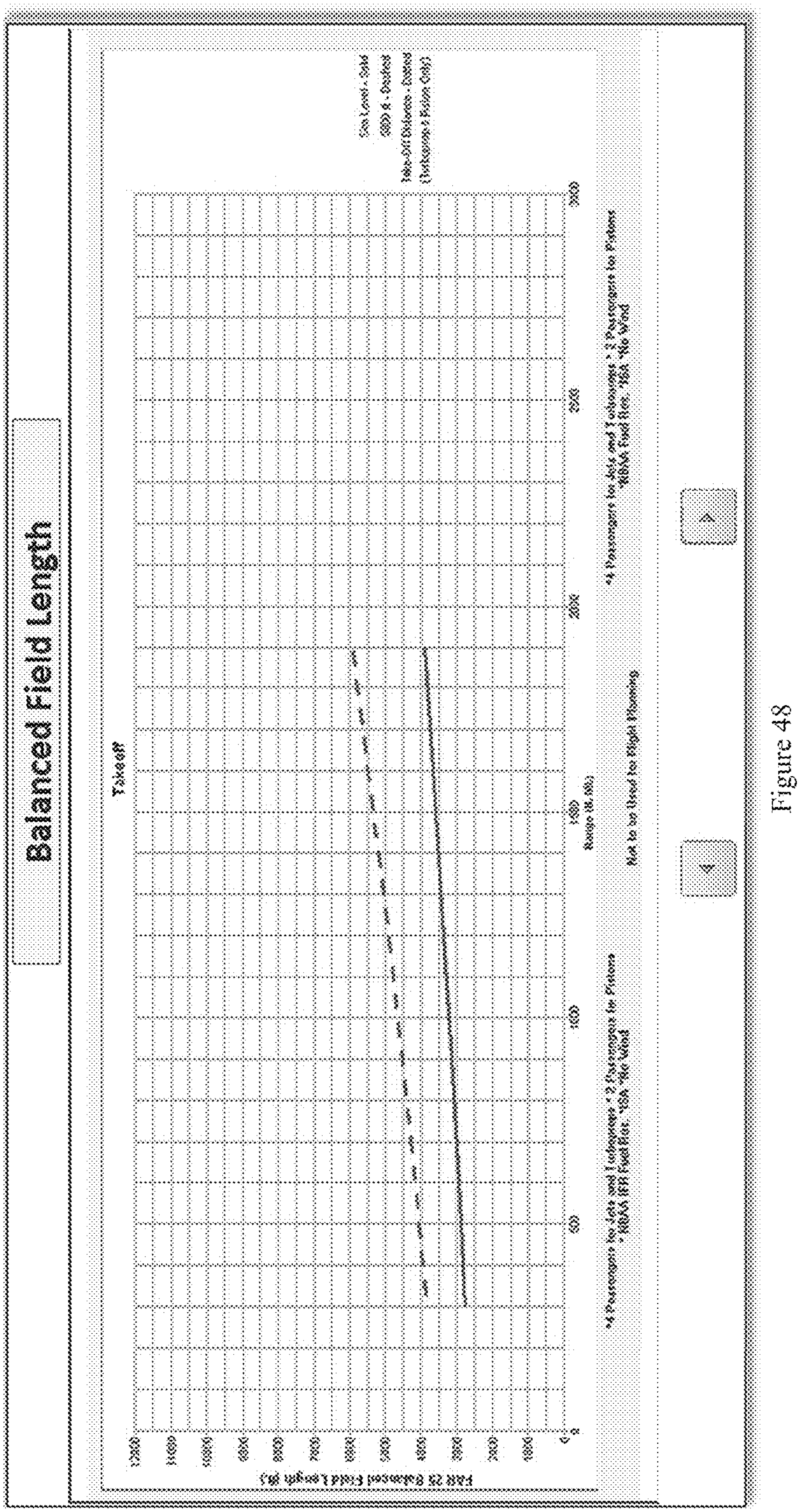
Figure 49:
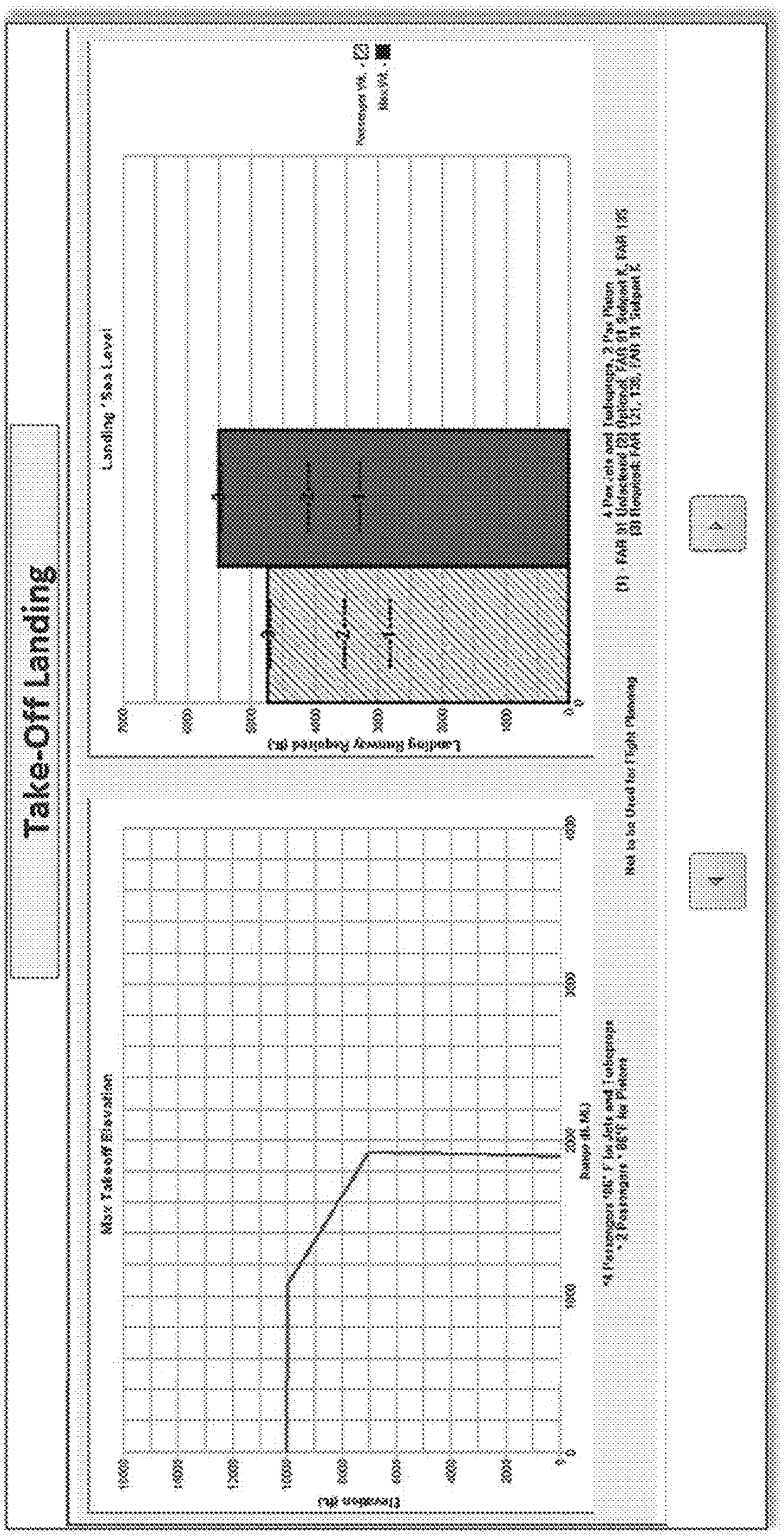
Figure 50:
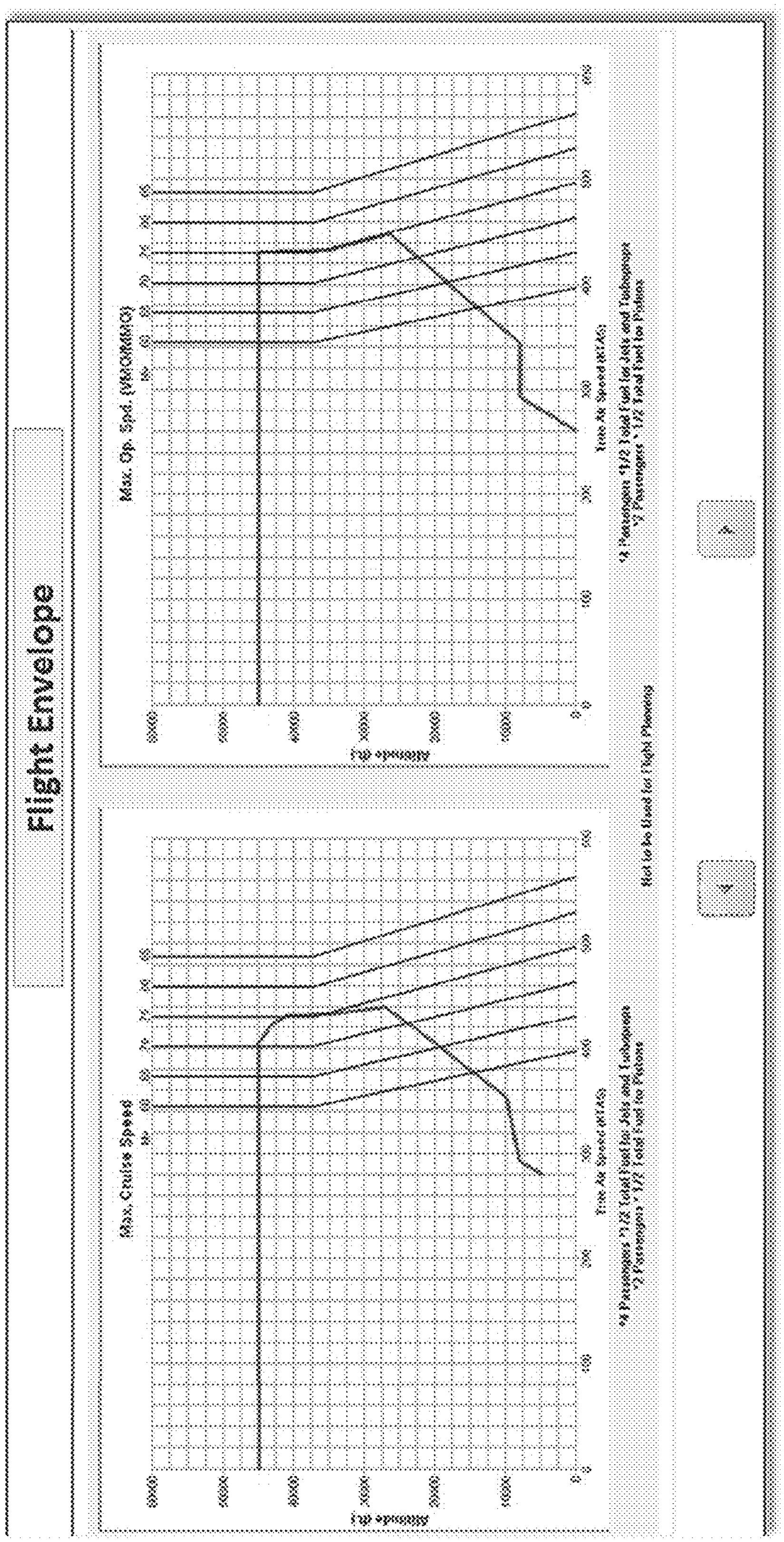
Figure 51:
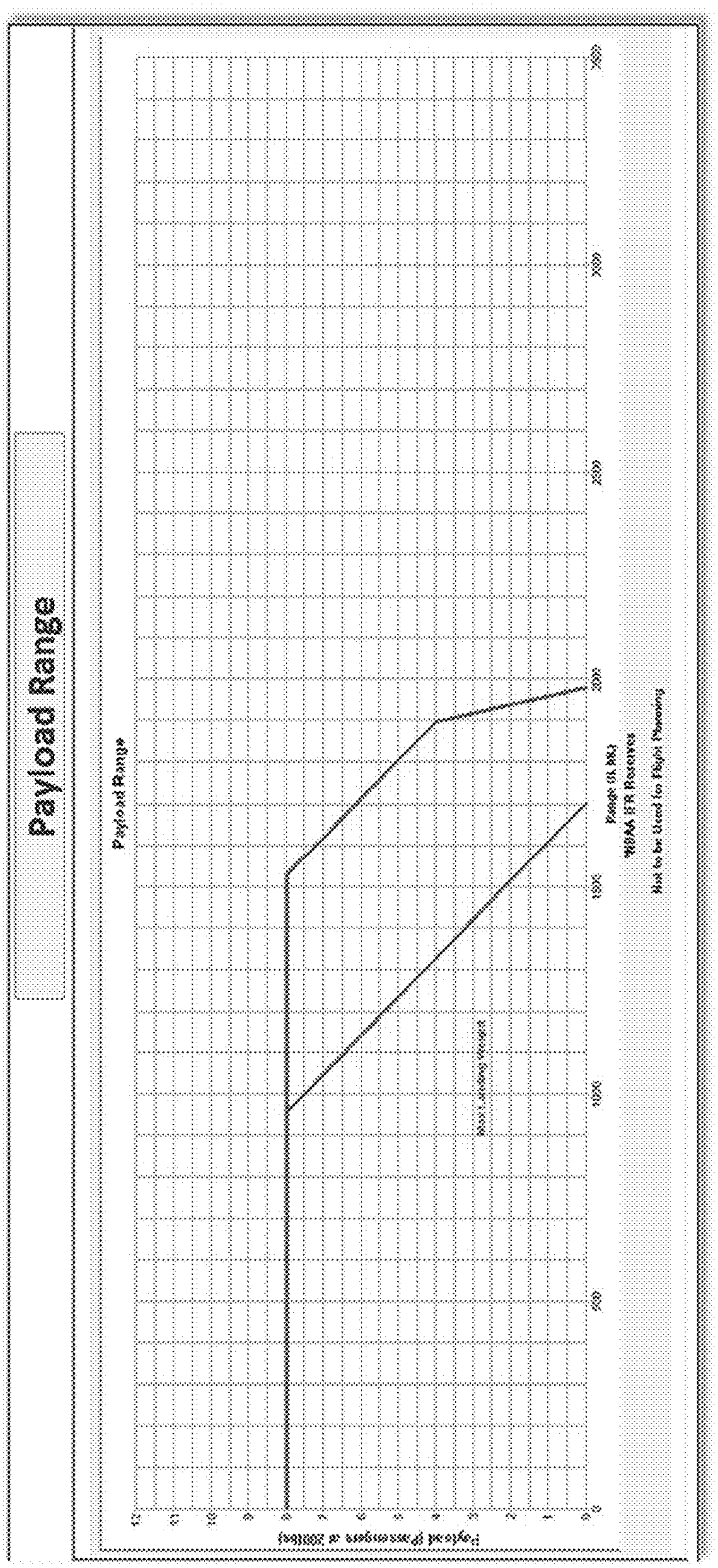
Figure 52:
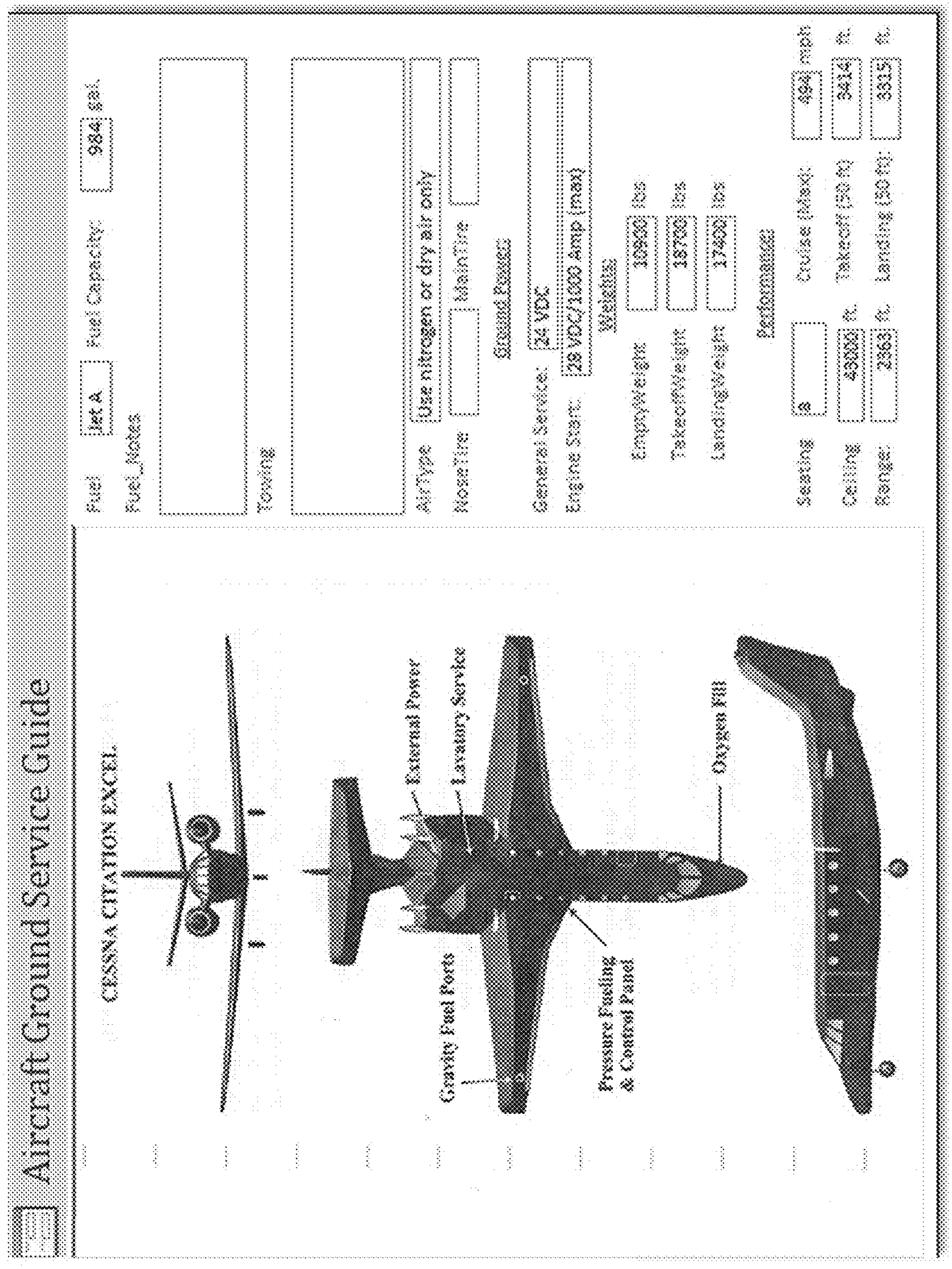
Figure 53:
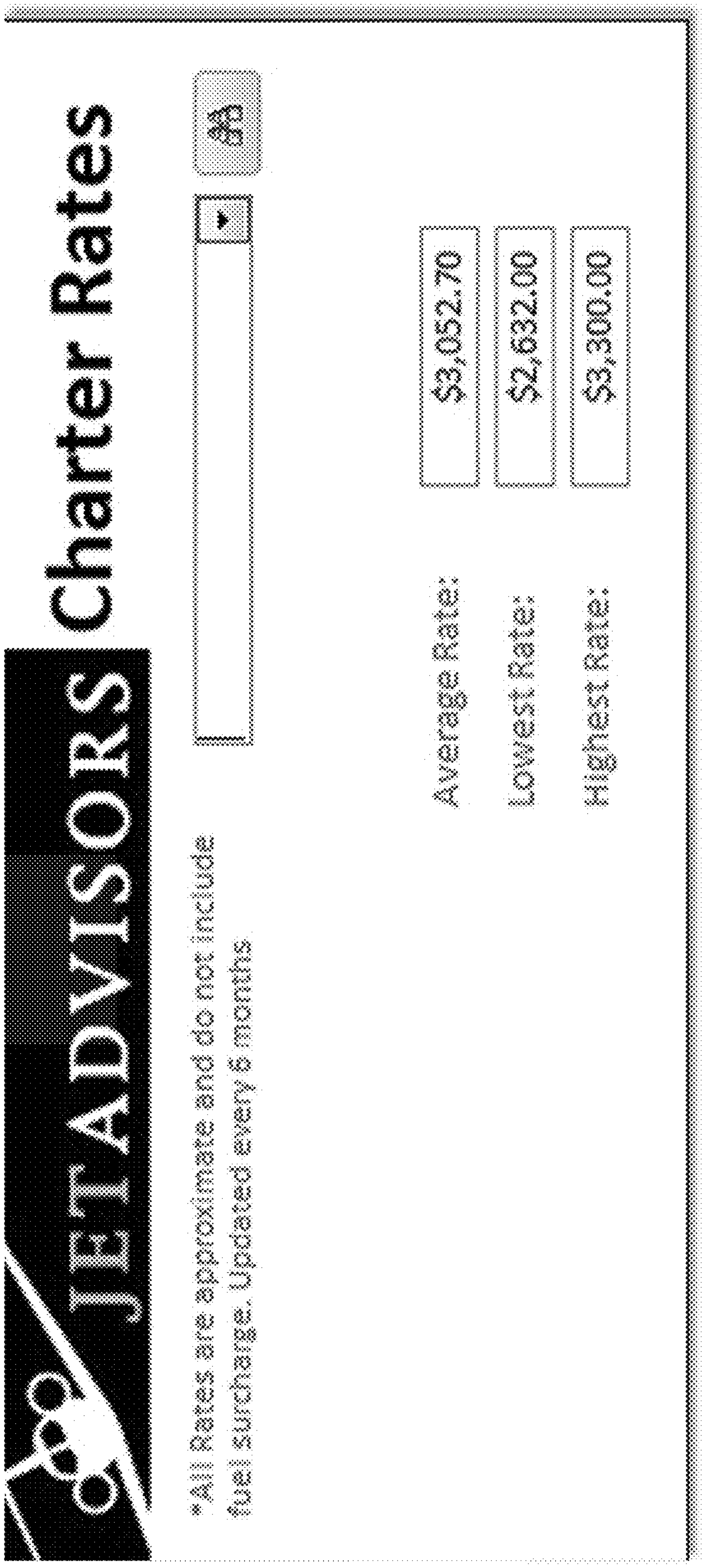
Figure 54:
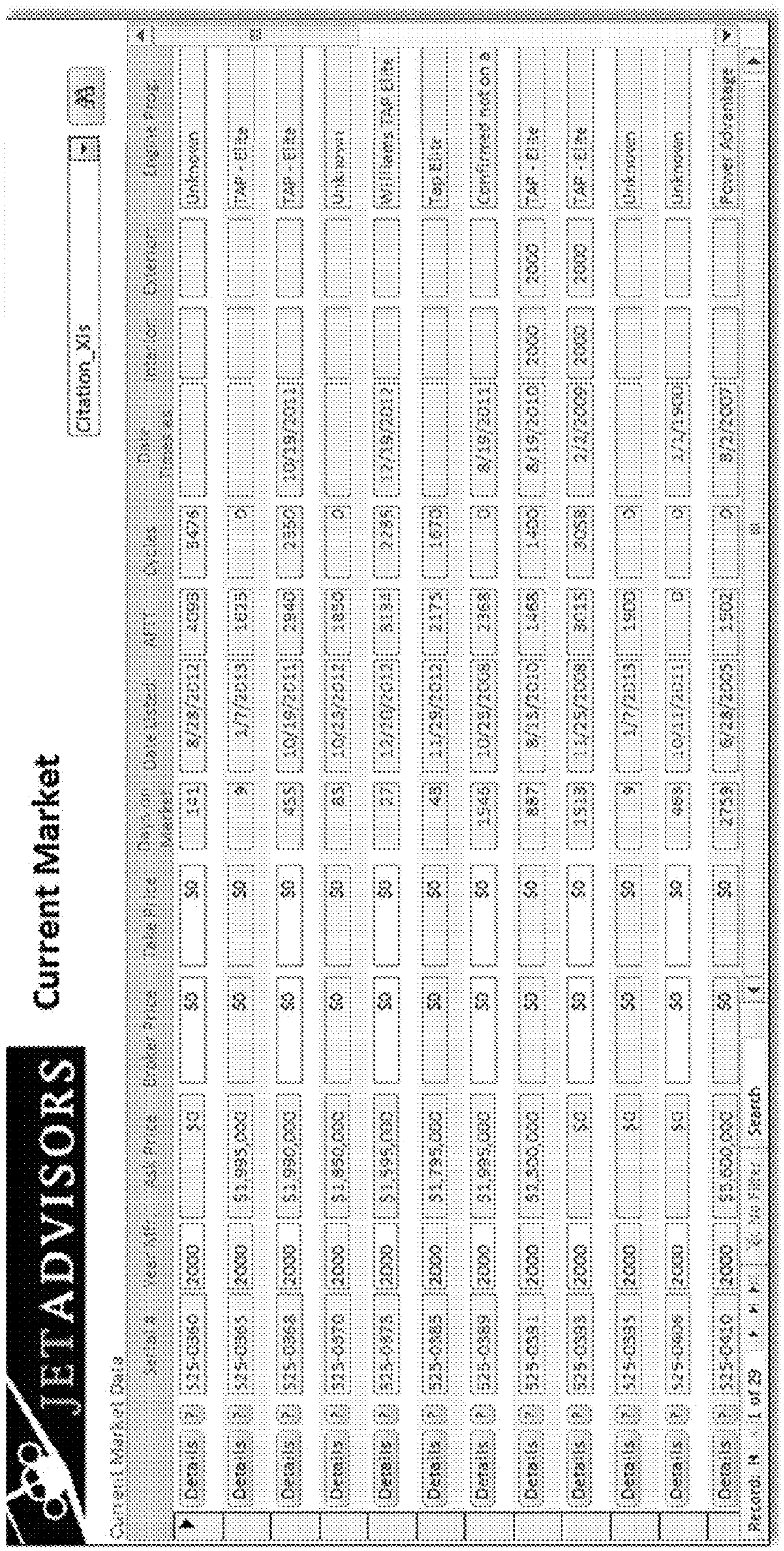
Figure 55:
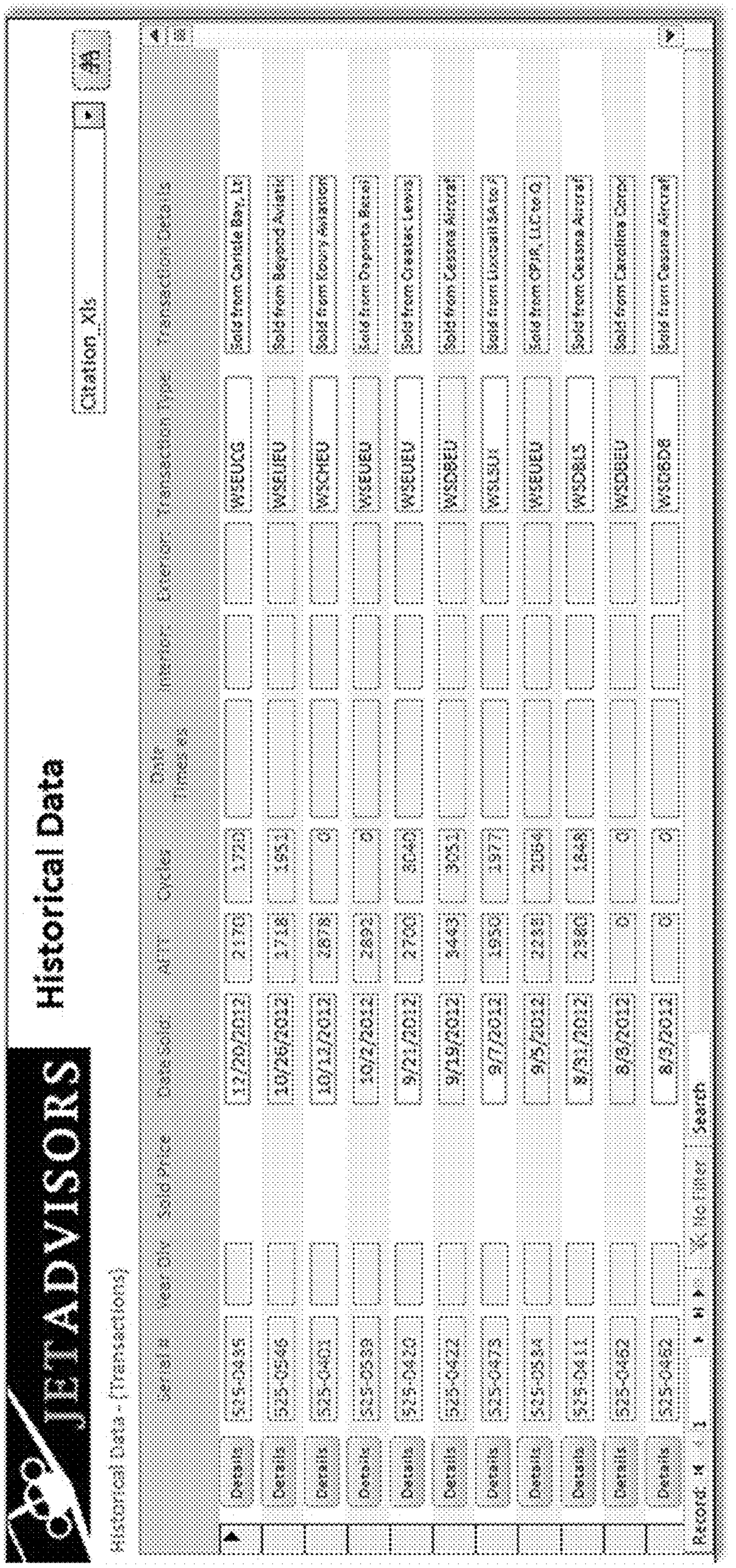
Figure 59:
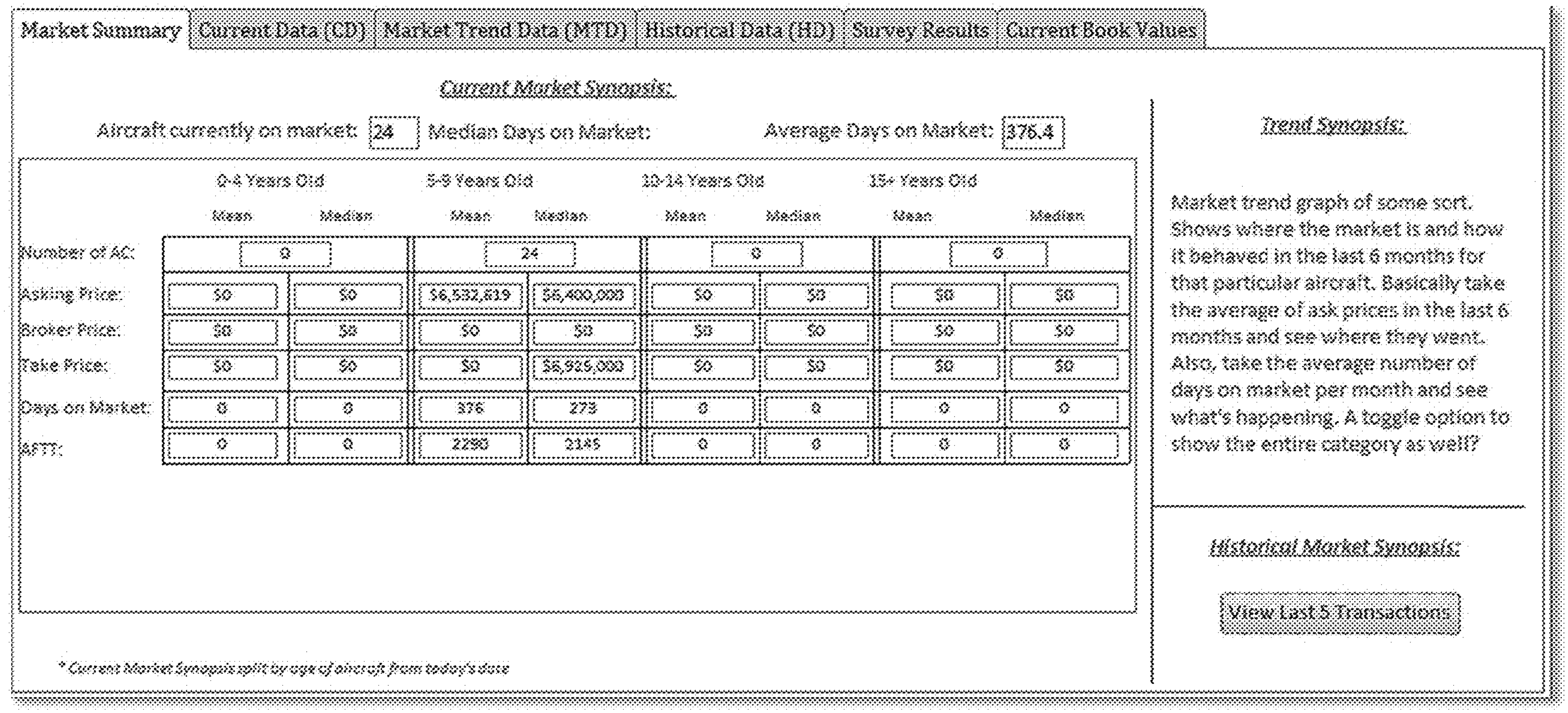
Figure 60:
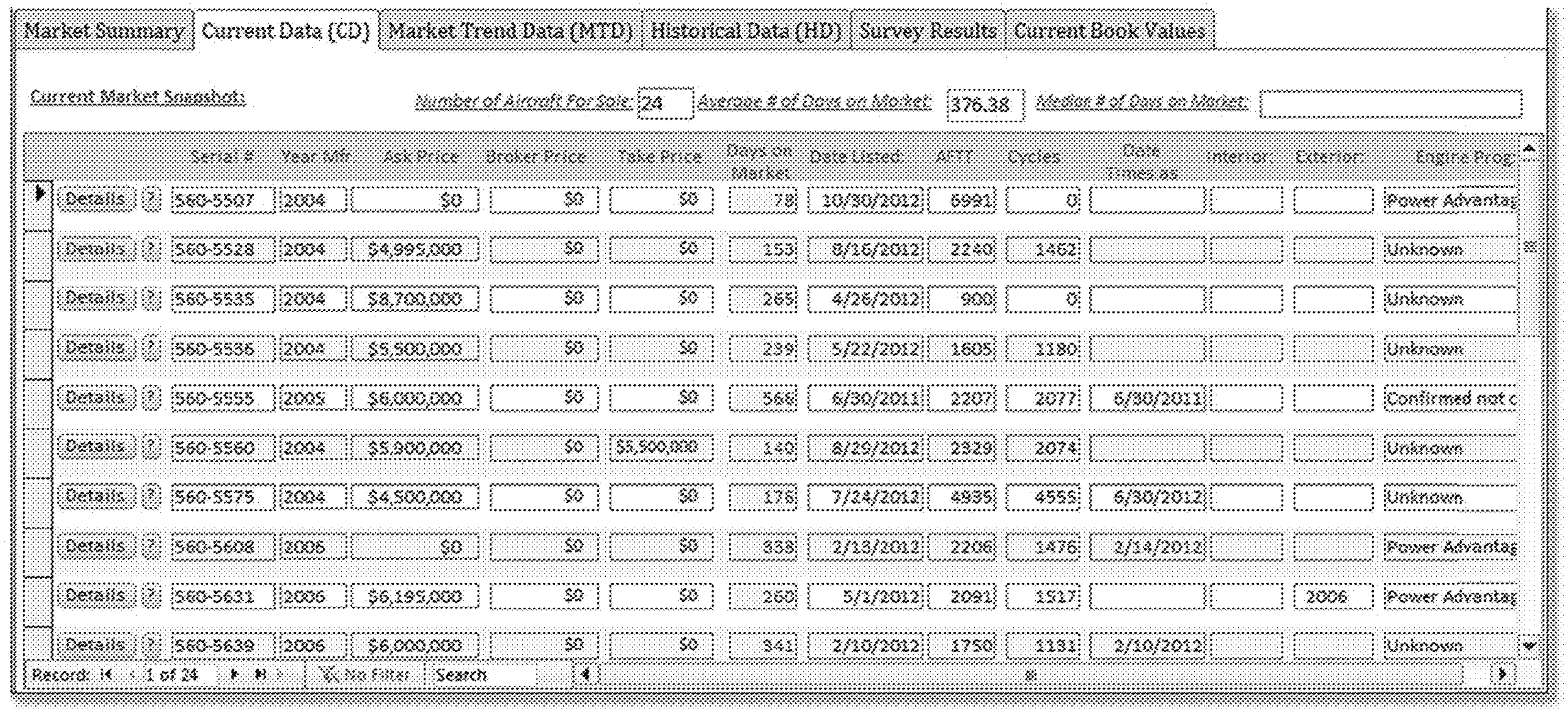
Figure 61:
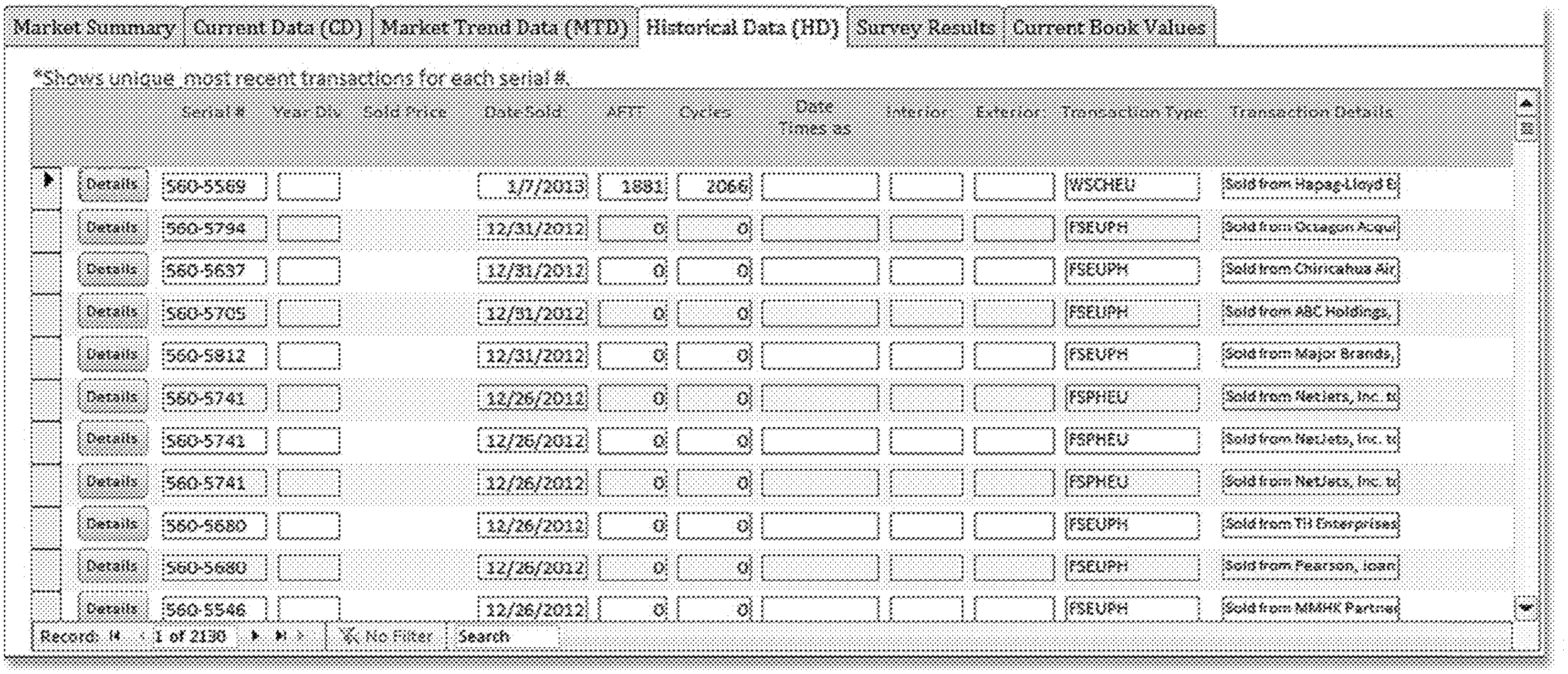

JA then looks at the flight graphically to analyze their flight patterns further. See FIG. 35 showing a graphical display of flights looking for patterns. The following steps are then performed:

- JA (through its one or more employees using the example PJI system) uses the PJI to start to identify the most likely candidate aircraft to consider for purchase, see FIG. 36;
- JA use the PJI to analyze the maintenance costs of the different aircraft, see FIG. 37.
- JA uses the PJI to explore where the aircraft are being operated throughout the world to look for patterns, see FIG. 38;
- JA uses the PJI to look at airframe statistics and safety data to identify appropriate aircraft, see FIG. 39;
- JA uses the PJI to understand the market activity and length of ownership, see FIG. 40;
- JA uses the PJI to identify historical uses for the aircraft in the USA. Aldo difficult airport performance is analyzed more closely to see how the potential aircraft perform, see FIG. 41;
- JA uses the PJI to look at the attributes of the prospective aircraft, see FIG. 42;
- JA uses the PJI to analyze the footprint of the aircraft for hangar rent or storage considerations, see FIG. 43;
- JA uses the PJI to analyze the height for the hangar door clearance and wheel base to look for taxi capabilities, see FIG. 44;
- JA uses the PJI to understand the distance from the main landing gear to the nose wheel to estimate maneuverability around the airport, see FIG. 45;
- JA used the PJI to understand the cabin clearances for the passengers travelling in the aircraft, see FIG. 46;
- JA uses the PJI to understand the block fuel used and the block time for client trips, see FIG. 47;
- JA uses the PJI to understand the runway required for different trips, see FIG. 48;
- JA uses the PJI to estimate take-off and landing distances required for the different aircraft, see FIG. 49;
- JA uses the PJI to analyze flight envelope information about the different aircraft options, see FIG. 50;
- JA uses the PJI to understand the range and how it is offset by payload for the different aircraft, see FIG. 51;

- JA uses the PJI to understand the fuel capacity, fueling procedures, tire pressures and electrical service of each aircraft type, see FIG. 52;
- JA uses the PJI to understand the rental rates for the aircraft to complete the financial analysis, see FIG. 53;
- JA uses the PJI to look at the different aircraft currently for sale, see FIG. 54;
- JA uses the PJI to look at recent transactions and understand the selling prices, see FIG. 55;
- JA uses the PJI to look at the past history by quarter of the transactions for each aircraft to understand historic demand for the aircraft since production began, see FIG. 56;
- JA uses the PJI to analyze the market penetration of aircraft enrolled in different engine programs, see FIG. 57;
- JA uses the PJI to analyze the lifecycle of different aircraft to understand how long they should expect to be in service, see FIG. 58;
- JA uses the PJI to gain a quick market synopsis for the mean and median for important statistics for each aircraft, see FIGS. 59-61 (showing market summaries, current data, and historical data, respectively); and
- Finally, the JA uses all the information above to narrow the number of acceptable aircraft to a subset list of aircraft that best meets the needs of the customer. JA uses the PJI to provide and output for the competitive scoring and ranking or different jets based on the parameters measured and weighting applied, as shown in Table 2, provided below, showing scores for the four aircraft that best meets the customer needs. The PJI analyzes all of the available data to forecast the residual value of the acceptable aircraft and to index each aircraft. The index for each aircraft is then weighted for the customer needs and balanced by the industry needs. Once weighted a final index is produced which will identify the optimum aircraft type to select for purchase by scoring the aircraft (again, as shown in Table 2, below for this example).

TABLE 2

| Aircraft Scoring Competitive SCORES: | |
|---|---|
| CHALLENGER_300 | 6.93 |
| FALCON_50EX | 1.78 |
| GULFSTREAM_G-200 | (2.80) |
| CITATION_X | (5.91) |

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method for supporting aircraft brokerage services using a server system coupled to a centralized database said method comprising the steps of:

the server system executing instructions directing the server system to store information about a plurality of aircraft within the database, including information regarding the performance of each of the plurality of aircraft, the market data of each of the plurality of aircraft, the satisfaction of operators of each of the plurality of aircraft, the safety record of each of the plurality of aircraft, cost information about various features of the aircraft, and attributes of each of the plurality of aircraft;

the server system executing instructions directing the server system to receive flight data about the plurality of aircraft from an external server system connected to the server system via a communication network, said received flight data being stored in the database:

said server system executing instructions for providing instructions to a user terminal to provide user access to the information about a plurality of aircraft via the user terminal connected to said server system via a communication network;

the server system executing instructions directing the server system to provide an interface to the server system configured for receiving aircraft trip information, performance information, and cost information of a potential aircraft purchaser into the server system as an indication of needs of the purchaser;

said server system executing instructions determining a listing of one or more of the plurality of aircraft that best meet the needs of said potential purchaser by comparing the information about the plurality of aircraft with the needs of the potential aircraft purchaser;

the server system executing instructions directing the server system to display on an output device connected to the server system said listing of the one or more of the aircraft to said user for providing an aircraft purchase recommendation to the potential purchaser;

the server system executing instructions to provide an interface to accept from an input device of the user terminal communicating with the server system a selection of one of the one or more aircraft displayed on the output device;

the server system executing instructions to display on a display of the user terminal information about the selected one of the one or more aircraft by generating an aircraft dashboard comprising a plurality of tabs on the display of the user terminal, said aircraft dashboard generated by said server system utilizing at least one database form stored in the database specific to the selected one of the plurality of aircraft, the at least one database form comprised of a plurality of fields, wherein generation of said aircraft dashboard comprising the plurality of tabs is performed such that the plurality of fields are split amongst corresponding tabs of the aircraft dashboard, each tab having a link corresponding to a database form stored in said database;

the server system executing instructions to provide an interface on the user terminal for providing the user with an option to select an update to the selected one or more aircraft, such that in response to selecting the update of the selected one of the one or more aircraft, information that is displayed in the aircraft dashboard on the display is updated to display aircraft information about the selected updated aircraft.

2. The method of claim 1, wherein said determining utilizes stored information about each one of the plurality of aircraft including: performance information, actual deployment history information, operating costs information, safety record information, residual value retained information, owner satisfaction information, future demand estimates information, world supply & demand information, sales transaction history information, current market data information, and economic indicators information.

3. The method of claim 1, wherein said server further forecasts future values of the aircraft in said listing.

4. The method of claim 1, wherein said determining a listing is performed using statistical operations.

5. The method of claim 4, wherein said statistical operations include using one of the techniques including mean, median, standard deviation, weighting, factor analysis, path analysis, regression or a combination thereof.

6. The method of claim 1, wherein said listing displays parameters of aircraft performance, costs, and market data while simultaneously showing an ordinal ranking of each aircraft within an aircraft category for each parameter.

7. The method of claim 1, wherein said database stores information about asking price ranges and recent market trends which are utilized for determining the listing.

8. The method of claim 1, wherein said database stores market information about mean and median of asking prices, broker prices, take prices, days on market, airframe total time and the number of aircraft available for each category grouped by the age of the aircraft from a current date.

9. The method of claim 8, wherein said market information are utilized for determining the listing.

10. The method of claim 1, wherein said server system sends information to the user terminal for displaying a drop down menu providing the listing of aircraft for display on the user terminal which, when selected by the user, causes the system to provide information stored in the database for that particular aircraft type to the user terminal for display to the user in an organized manner.

11. A method for supporting aircraft brokerage services using a server system coupled to a centralized database said method comprising the steps of:

the server system executing instructions directing the server system to store information about a plurality of aircraft within the database, including information regarding the performance of each of the plurality of aircraft, the market data of each of the plurality of aircraft, the satisfaction of operators of each of the plurality of aircraft, the safety record of each of the plurality of aircraft, and attributes of each of the plurality of aircraft;

the server system executing instructions directing the server system to receive flight data about the plurality of aircraft from an external server system connected to the server system via a communication network, said received flight data being stored in the database;

said server system executing instructions for providing instructions to a user terminal to provide user access to the information about a plurality of aircraft via the user terminal connected to said server system via a communication network;

the server system executing instructions directing the server system to provide an interface to the server system configured for receiving aircraft trip information, performance information, and cost information of a potential aircraft purchaser into the server system as an indication of needs of the purchaser;

said server system executing instructions determining a first subset of aircraft from said plurality of aircraft meeting a first set of criteria obtained from the needs of the potential aircraft purchaser, wherein said first set of criteria includes aircraft performance requirements;

the server system executing instructions directing the server system to provide user access to information about said first subset of aircraft via the user terminal;

said server system executing instructions to determine a listing of one or more of the subset of aircraft that best meet the needs of said potential purchaser by comparing the information about the plurality of aircraft with the needs of the potential aircraft purchaser; and the server system executing instructions to display on a display of the user terminal information about the selected one of the one or more aircraft by generating an aircraft dashboard comprising a plurality of tabs on the display of the user terminal, said aircraft dashboard generated by said server system utilizing at least one database form stored in the database specific to the selected one of the plurality of aircraft, the at least one database form comprised of a plurality of fields, wherein generation of said aircraft dashboard comprising the plurality of tabs is performed such that the plurality of fields are split amongst corresponding tabs of the aircraft dashboard, each tab having a link corresponding to a database form stored in said database.

12. The method of claim 11, wherein said information regarding the performance of each of the plurality of aircraft includes aircraft capacity capabilities, and wherein said aircraft performance requirements include requirements for aircraft capacity.

13. The method of claim 11, wherein said information regarding the performance of each of the plurality of aircraft includes aircraft range capabilities, and wherein said aircraft performance requirements include requirements for aircraft range.

14. The method of claim 11, wherein said server further forecasts future values of the aircraft in said listing.

15. The method of claim 14, wherein said listing is determined using data mining, text mining, and/or structural equation models.

16. The method of claim 11, wherein said listing is determined using statistical operations.

17. The method of claim 16, wherein said statistical operations include using mean, median, standard deviation, weighting, factor analysis, path analysis, regression.

18. The method of claim 11, wherein said listing displays parameters of aircraft performance, costs, and market data while simultaneously showing an ordinal ranking of each aircraft within an aircraft category for each parameter.

19. The method of claim 11, wherein said database stores information about asking price ranges and recent market trends which are utilized for determining the listing.

20. The method of claim 11, wherein said database stores market information about mean and median of asking prices, broker prices, take prices, days on market, airframe total time and the number of aircraft available for each category grouped by the age of the aircraft from a current date.

21. The method of claim 20, wherein said market information are utilized for determining the listing.

22. The method of claim 11, wherein said server system sends information to the user terminal for displaying a drop down menu providing the listing of aircraft for display on the user terminal which, when selected by the user, causes the system to provide information stored in the database for that particular aircraft type to the user terminal for display to the user in an organized manner.

23. A method for supporting aircraft brokerage services using a server system coupled to a centralized database said method comprising the steps of:

the server system executing instructions directing the server system to store information about a plurality of aircraft within the database, including information regarding the performance of each of the plurality of aircraft, the market data of each of the plurality of aircraft, the satisfaction of operators of each of the plurality of aircraft, the safety record of each of the plurality of aircraft, and attributes of each of the plurality of aircraft;

the server system executing instructions directing the server system to receive flight data about the plurality of aircraft from an external server system connected to the server system via a communication network, said received flight data being stored in the database;

said server system executing instructions for providing instructions to a user terminal to provide user access to the information about a plurality of aircraft via the user terminal connected to said server system;

the server system executing instructions directing the server system to provide an interface to the server system configured for receiving aircraft trip information, performance information, and cost information as an indication of the needs of a potential aircraft purchaser into the server system;

said server system executing instructions determining a first subset of aircraft from said plurality of aircraft meeting a first set of criteria obtained from the aircraft trip information of the potential aircraft purchaser, wherein said first set of criteria includes aircraft performance requirements;

the server system executing instructions directing the server system to provide user access to information about said first subset of aircraft via the user terminal;

said server system executing software instructions determining a listing of a plurality of the subset of aircraft that best match the needs of said potential purchaser; and the server system executing instructions to display on a display of the user terminal information about the selected one of the one or more aircraft by generating an aircraft dashboard comprising a plurality of tabs on the display of the user terminal, said aircraft dashboard generated by said server system utilizing at least one database form stored in the database specific to the selected one of the plurality of aircraft, the at least one database form comprised of a plurality of fields, wherein generation of said aircraft dashboard comprising the plurality of tabs is performed such that the plurality of fields are split amongst corresponding tabs of the aircraft dashboard, each tab having a link corresponding to a database form stored in said database.

24. A method for supporting aircraft brokerage services using a server system coupled to a centralized database said method comprising the steps of:

the server system executing instructions directing the server system to connect to the external server systems of a plurality of aircraft manufacturers each connected to the server system via a communication network;

collecting aircraft information about a plurality of aircraft manufactured by the aircraft manufacturers via the connection to the external server systems;

the server system executing instructions directing the server system to store said aircraft information within the database, said aircraft information including information regarding:

the performance specifications of each of the plurality of aircraft, the market and pricing information of each of the plurality of aircraft, the satisfaction of operators of each of the plurality of aircraft, the safety record of each of the plurality of aircraft, one or more images of an exterior of each one of the plurality of aircraft, information about internal dimensions of each one of the aircraft, one or more images of an interior of each one of the plurality of aircraft;

information about external dimensions of each one of the aircraft, information about costs for each one of the aircraft, and historical information about each one of the aircraft;

inputting aircraft trip information, performance information, and cost information as an indication of needs of a potential aircraft purchaser into the server system;

responsive to the inputting, displaying a list of aircraft for selection using a user interface of the user computer and receiving a selection of at least one of said aircraft from the list of aircraft;

said server system sending instructions over a communication interface to the user computer for generating an aircraft dashboard comprising a plurality of tabs configured to display formatted aircraft information about the chosen one of said plurality of aircraft on a display of the user computer, said aircraft dashboard generated utilizing at least one database form stored in the database specific to the chosen one of the plurality of aircraft, the at least one database form comprised of a plurality of fields, wherein generation of said aircraft dashboard comprising the plurality of tabs is performed such that the plurality of fields are split amongst corresponding tabs of the aircraft dashboard, each tab having a link corresponding to a database form stored in said database;

said server system executing instructions directing the server system to send instructions to the user computer for causing said user computer to display on a display of the user computer the aircraft dashboard comprising the plurality of tabs configured to display formatted aircraft information about the chosen one of said plurality of aircraft, said formatted aircraft information associated with at least one database form comprised of a plurality of fields stored in the database, said formatted aircraft information provided by said aircraft dashboard including: pricing information about the chosen one of said plurality of aircraft, said pricing information including market trends, and performance information about the chosen one of said plurality of aircraft, wherein said formatted aircraft information is organized for presenting on said user computer by allowing user selection of any one of a plurality of tabs provided by the aircraft dashboard, such that for any chosen one of said plurality of tabs, different formatted aircraft information is displayed;

said server system executing instructions directing the server system to provide additional information to the user computer for providing the user with an option to select an update of the chosen one of said aircraft via the user interface, such that in response to selecting the update of the chosen one of the aircraft, the information that is displayed by said aircraft dashboard from any selected one of said tabs is updated to display aircraft information about the selected updated chosen one of said aircraft; and the server system executing instructions to configure the user interface of the user computer to accept input from the user via the user interface, said input including information regarding aircraft trip information that represents specific needs of the potential purchaser; and said server system executing instructions determining a listing of one or more of the plurality of aircraft that best meet the input needs of said potential purchaser by comparing the information about the plurality of aircraft with the specific needs of the potential aircraft purchaser; and the server system executing instructions for directing the server system to display on the display of the user computer said listing of the one or more of the aircraft to said user for providing an aircraft purchase recommendation to the potential purchaser.

25. A method for supporting aircraft brokerage services using a server system coupled to a centralized database said method comprising the steps of:

the server system executing instructions directing the server system to connect to external server systems of each one of a plurality of aircraft manufacturers, said external server systems being connected to the server system via a communication network;

collecting aircraft information about a plurality of aircraft manufactured by each one of the manufacturers, including aircraft manufacturing data from each one of the manufacturers obtained via said connection;

the server system executing instructions directing the server system to store said aircraft information within the database, said aircraft information including information regarding:

the performance specifications of each of the plurality of aircraft, the market and pricing information of each of the plurality of aircraft, the satisfaction of operators of each of the plurality of aircraft, the safety record of each of the plurality of aircraft, one or more images of an exterior of each one of the plurality of aircraft, information about internal dimensions of each one of the aircraft, one or more images of an interior of each one of the plurality of aircraft, information about external dimensions of each one of the aircraft, information about costs for each one of the aircraft, and historical information about each one of the aircraft;

providing an interface to the server system configured for receiving aircraft trip information, performance information, and cost information as an indication of needs of a potential aircraft purchaser into the server system;

said server system executing instructions directing the server system to serve information to a user computer for causing said user computer to display on a user display an aircraft dashboard displaying a list of aircraft for selecting one of said aircraft using a user interface of the user computer, said aircraft dashboard comprising a plurality of tabs configured to display formatted aircraft information about a chosen one of said plurality of aircraft, said aircraft dashboard generated utilizing at least one database form stored in the database specific to the chosen one of the plurality of aircraft, the at least one database form comprised of a plurality of fields, wherein generation of said aircraft dashboard comprising the plurality of tabs is performed such that the plurality of fields are split amongst corresponding tabs of the aircraft dashboard, each tab having a link corresponding to a database form stored in said database;

said formatted aircraft information including:

pricing information about the chosen one of said plurality of aircraft, said pricing information including market trends, and performance information about the chosen one of said plurality of aircraft, wherein said formatted aircraft information is organized for presenting on said user computer by allowing user selection of any one of the plurality of tabs, such that for any chosen one of said plurality of tabs, different formatted aircraft information is displayed;

said server system executing instructions directing the server system to provide additional information to the user computer for providing the user with an option to select an update of the chosen one of said aircraft, such that in response to selecting the update of the chosen one of the aircraft, the information that is displayed from any selected one of said tabs is updated to display aircraft information about the selected updated chosen one of said aircraft; and the server system executing instructions to configure the user interface to accept input from the user regarding aircraft trip information representing specific needs of the potential purchaser, wherein said specific needs of the purchaser include a first set of criteria and a second set of criteria different than the first set of criteria; and said server system executing instructions determining a subset of aircraft from said plurality of aircraft meeting the first set of criteria;

the server system executing instructions directing the server system to provide user access to information about said first subset of aircraft;

said server system executing instructions determining a listing of one or more of the subset of aircraft that best meet the needs of said potential purchaser by comparing the information about the plurality of aircraft with the needs of the potential aircraft purchaser; and the server system executing instructions for directing the server system to display said listing of the one or more of the aircraft to said user such that said user can select any one of said aircraft from said list to display aircraft information about the selected one of said aircraft for providing an aircraft purchase recommendation to the potential purchaser.

* * * * *